United States Patent
Day

(10) Patent No.: US 12,020,314 B1
(45) Date of Patent: *Jun. 25, 2024

(54) GENERATING DETECTION PARAMETERS FOR RENTAL PROPERTY MONITORING SOLUTION USING COMPUTER VISION AND AUDIO ANALYTICS FROM A RENTAL AGREEMENT

(71) Applicant: Ambarella International LP, Santa Clara, CA (US)

(72) Inventor: Christopher N Day, Los Gatos, CA (US)

(73) Assignee: Ambarella International LP, Santa Clara, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/102,972

(22) Filed: Jan. 30, 2023

Related U.S. Application Data

(63) Continuation of application No. 15/931,942, filed on May 14, 2020, now Pat. No. 11,645,706, which is a continuation-in-part of application No. 16/858,230, filed on Apr. 24, 2020, now Pat. No. 11,651,456.

(60) Provisional application No. 62/971,706, filed on Feb. 7, 2020, provisional application No. 62/949,049, filed on Dec. 17, 2019.

(51) Int. Cl.
| | | |
|---|---|---|
| *G06V 40/10* | (2022.01) | |
| *G06F 40/56* | (2020.01) | |
| *G06Q 30/0645* | (2023.01) | |
| *G06V 20/40* | (2022.01) | |
| *G06V 20/52* | (2022.01) | |

(52) U.S. Cl.
CPC ......... *G06Q 30/0645* (2013.01); *G06F 40/56* (2020.01); *G06V 20/46* (2022.01); *G06V 20/53* (2022.01); *G06V 40/10* (2022.01); *G06V 20/44* (2022.01)

(58) Field of Classification Search
CPC .... G06Q 30/0645; G06F 40/56; G06V 20/46; G06V 40/10; G06V 20/53; G06V 20/44
See application file for complete search history.

(56) References Cited

U.S. PATENT DOCUMENTS

| | | | |
|---|---|---|---|
| 2011/0040692 A1* | 2/2011 | Ahroon | G06Q 99/00 705/500 |
| 2018/0005143 A1* | 1/2018 | Camargo | H04W 12/06 |
| 2018/0053227 A1* | 2/2018 | Camhi | G06Q 30/0281 |

* cited by examiner

*Primary Examiner* — Syed Haider
(74) *Attorney, Agent, or Firm* — Maiorana Patent Law, PA

(57) ABSTRACT

A system comprising a server and a camera. The server may be configured to receive a rental offer for a location from a first user, receive a rental request for the location from a second user, generate a rental agreement comprising conditions in response to the rental offer and the rental request and generate a feature set based on the conditions. The camera may be configured to receive the feature set from the server, convert the feature set to parameters for the camera, generate a plurality of video frames of the location, perform video operations to detect objects in the video frames, extract data about the objects using the video operations, compare the data to the parameters and generate a notification in response to the data matching the parameters. The video frames may be discarded after performing the video operations. The video operations may be performed locally by the camera.

18 Claims, 15 Drawing Sheets

GENERATING DETECTION PARAMETERS FOR RENTAL PROPERTY MONITORING SOLUTION USING COMPUTER VISION AND AUDIO ANALYTICS FROM A RENTAL AGREEMENT

This application relates to U.S. patent application Ser. No. 15/931,942, filed on May 14, 2020, which relates to U.S. Provisional Application No. 62/971,706, filed Feb. 7, 2020. U.S. patent application Ser. No. 15/931,942 also relates to U.S. patent application Ser. No. 16/858,230, filed Apr. 24, 2020, which relates to U.S. Provisional Application No. 62/949,049, filed Dec. 17, 2019. Each of the above mentioned applications are hereby incorporated by reference in its entirety.

FIELD OF THE INVENTION

The invention relates to security cameras generally and, more particularly, to a method and/or apparatus for generating detection parameters for a rental property monitoring solution using computer vision and audio analytics from a rental agreement.

BACKGROUND

With the popularity of services like AirBNB, renting property is becoming increasingly popular and has less oversight. Rentals can be set up without the property owner and the renter(s) ever meeting in person. Property owners face the problem of how to protect themselves against renters holding unauthorized parties at rental properties. In addition to online rental services, property owners in areas that have colleges or universities have long had problems with renters involving large parties, loud noises, drugs and alcohol (i.e., keg parties). Additionally, some property owners want to protect themselves against renters bringing pets to the property. Large parties and renters not using a rental property as intended can result in damage to the property, liability issues for the property owner and/or late night angry calls from neighbors.

Property owners cannot always be physically present to watch the rental property. The use of existing video cameras to monitor properties to check on the compliance of renters is problematic because of privacy issues. Renters do not want video of themselves being viewed remotely, voice conversations being listened to, or any recordings, video or audio, being made.

Not all property owners have the time or technical knowledge necessary to configure the sensing camera to make sure that the renters are abiding by the terms of the rental agreement (i.e., number of people, pets, music/noise level etc.). Configuration settings for computer vision and audio analysis can provide an overwhelming number of options. Property owners and renters do not have a way to easily create a human-legible rental agreement that can be applied to a sensing camera to ensure that the rental agreement is properly being followed.

It would be desirable to implement generating detection parameters for a rental property monitoring solution using computer vision and audio analytics from a rental agreement.

SUMMARY

The invention concerns a system comprising a server computer and a camera system. The server computer may comprise a memory configured to store computer readable instructions and a processor configured to execute the computer readable instructions. The computer readable instructions may be configured to receive a rental offer for a location from a first user, receive a rental request for the location from a second user, generate a rental agreement comprising conditions in response to the rental offer and the rental request and generate a feature set based on the conditions, if the first user and the second user agree to the rental agreement. The camera system may be configured to receive the feature set from the server computer, convert the feature set to detection parameters for the camera system, generate a plurality of video frames of the location, perform video operations to detect objects in the video frames, extract data about the objects based on characteristics of the objects determined using the video operations, compare the data to the detection parameters and generate a notification in response to the data matching the detection parameters. The camera system may be implemented at the location. The video frames may be discarded after performing the video operations. The video operations may be performed locally by the camera system.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
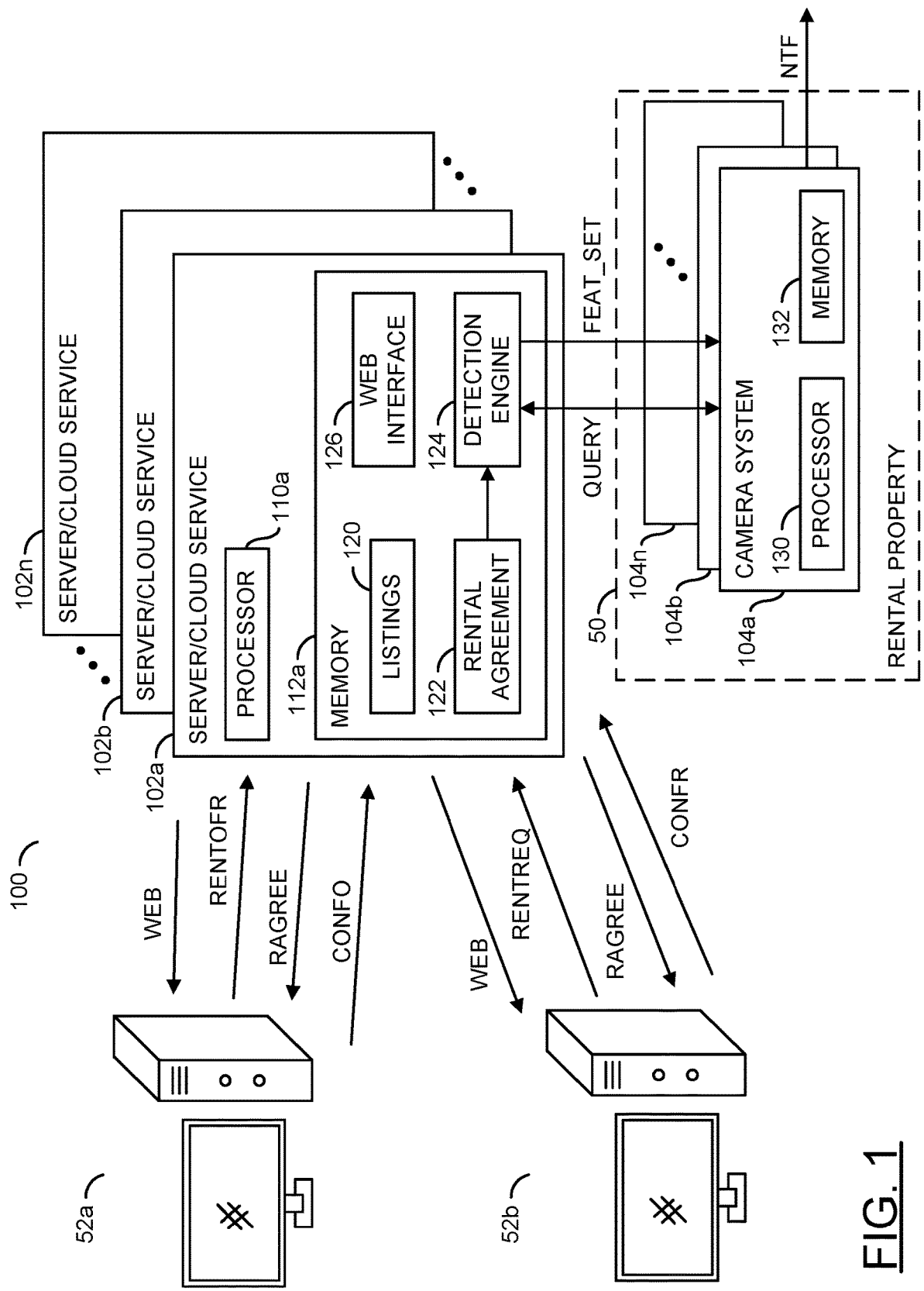
FIG. 1 is a diagram illustrating an example embodiment of the present invention.

Embodiments of the present invention include generating detection parameters for a rental property monitoring solution using computer vision and audio analytics from a rental agreement that may (i) perform video analytics locally, (ii) perform audio analytics locally, (iii) discard data after processing, (iv) perform video analytics without storing video data, (v) detect restricted activities, (vi) count a number of people at a location, (vii) detect an audio level at a location, (viii) provide a notification when a restricted activity is detected, (ix) provide a web interface for users to enter a rental agreement, (x) provide video and/or audio detection parameters to a camera system based on the rental agreement, (xi) preserve privacy of people at a rental property and/or (xii) be implemented as one or more integrated circuits.

Embodiments of the present invention may be configured to monitor a location (e.g., a property) and notify a property owner in the event of a restricted activity being detected. In an example, the restricted activity may be a party being held and/or the presence of a pet. Using camera technology and/or computer vision, data (e.g., parameters and statistics) may be extracted from captured images and/or sound. The data may be used to make decisions. The decisions may be determined based on the video data and/or the audio data. However, the video data and/or the audio data may not need to be stored and/or communicated. For example, after the decision has been determined, the video data and/or the audio data may be discarded. Discarding the video data and/or the audio data may preserve privacy.

The detection of restricted activities may be determined based on various search parameters performed using computer vision and/or audio analytics. In one example, whether a party is detected may be determined based on using computer vision to detect people and counting the number of people present at the location. In another example, analytics may be implemented to detect a sound level at the location (e.g., detect whether loud music is being played). The computer vision operations may be configured to detect and/or classify objects. In an example, the computer vision operations may be configured to detect animals.

Embodiments of the present invention may be configured to provide a notification to the property owner. The notification may comprise a warning notice. The warning notice may indicate that a restricted activity has been detected. In an example, the notification may be presented from a cloud service to a user device such as a smart phone. The cloud service may be configured to receive the decisions made in response to analysis of video data and/or audio data, but may not receive the video data and/or the audio data.

Embodiments of the present invention may enable use of a web-based application to facilitate generating an agreement to rent a property. The property owner may enter details about the rules for renting the property (e.g., number of people that will be present, whether loud music/movies are allowed, whether there will be a pet allowed, etc.). Based on the information submitted by the property owner, a web-based application may list the property as available for rent. Similarly, a prospective renter may enter details about a desired rental property into the web-based application.

The web-based application may automatically check the requirements of the renter against the rules defined by the property owner. For example, the owner may specify the maximum number of people allowed, whether a pet is allowed, and whether loud music is allowed to be played. If the requirements of the renter fall within the rules of the owner, then a rental booking may be made. The sensing camera may be automatically configured to monitor the property on the specific days rented according to the rules of the rental agreement. For example, the sensing camera may check for the number of people, pets, music etc. as defined by the on-line rental application contract completed by the renter and the property owner. The rental agreement may be used as a basis for setting various search and/or detection parameters for the computer vision and/or audio analytics performed by the sensing camera system.

Referring to FIG. 1, a diagram illustrating an example embodiment of the present invention is shown. A system 100 is shown. The system 100 may comprise one or more server computers 102a-102n and/or one or more camera systems 104a-104n. A number of user devices 52a-52n may be connected to the system 100. The camera systems 104a-104n are shown at a location 50. In an example, the location 50 may be a rental property. The server computers 102a-102n may comprise a number of computing devices configured to operate as a scalable cloud service. For example, the server computers 102a-102n may provide processing and/or storage that may be configured to scale based on demand. The server computers may be referred to generally as the server 102, but may be implemented using a number of computing devices 102a-102n configured to operate together. The system 100 may comprise other components and/or interconnections between the components. The arrangement of the system 100 may be varied according to the design criteria of a particular implementation.

Generally, the server computer(s) 102a-102n and the camera systems 104a-104 may be implemented at different locations. For example, the server computers 102a-102n may be implemented at a centralized location, and the camera systems 104a-104n may be implemented at the rental property 50. While multiple camera systems 104a-104n are shown at the location 50, in some embodiments one of the camera systems 104a-104n may be implemented at the location 50. While multiple camera systems 104a-104n are shown at the location 50, in some embodiments the server computers 102a-102n may be configured to communicate with multiple camera systems 104a-104n that may be located at the same and/or different properties. For example, the system 100 may comprise the server computers 102a-102n and a plurality of camera systems 104a-104n that may be implemented at one or multiple locations.

In the example shown, the user devices 52a-52n may be desktop computers. However, the user devices 52a-52n may be implemented as any type of computing device configured to connect to the internet, receive user input and/or provide a graphical display (e.g., a desktop computer, a laptop computer, a netbook, a tablet computing device, a smartphone, a phablet, a wearable headset, a patient monitor, etc.). Generally, the remote devices 52a-52n may enable communication to/from the servers 102a-102n and/or the camera systems 104a-104n.

Each of the server computers 102a-102n may comprise a respective processor 110a-110n and/or a respective memory 112a-112n. In the example shown, the processor 110a and the memory 112a of the server computer 102a are shown as a representative example. The processors 110a-110n may be configured to execute computer readable instructions. The memory 112a-112n may be configured to store the computer readable instructions.

The processors 110a-110n may be configured to receive input from the user devices 52a-52n, operate on the input according to the computer readable instructions and generate output for the user devices 52a-52n. The processors 110a-110n may be configured to receive input from the camera systems 104a-104n, operate on the input according to the computer readable instructions and generate output for the camera systems 104a-104n. The processors 110a-110n may operate in parallel with each other to collectively perform computational tasks.

The memory 112a-112n may comprise a block 120, a block 122, a block 124 and/or a block 126. The block 120 may comprise storage of rental listings. The block 122 may comprise storage of rental agreements. The block 124 may comprise a detection engine. The block 126 may comprise data for a web interface. The memory 112a-112n may comprise other components (not shown). The memory 112a-112n may comprise hard disk drives, cache memory, RAM and/or flash-based memory. The type of storage, the type of information stored and/or the arrangement of the data stored by the memory 112a-112n may be varied according to the design criteria of a particular implementation.

The server computers 102a-102n may be configured to provide the web interface 126 to the computing devices 52a-52b. The web interface 126 may be generated by the processors 110a-110n in response to the computer readable instructions. For example, the computer readable instructions may comprise web design languages such as HTML, PHP, Javascript, CSS, etc. The data used to generate the web interface 126 may be generated from the listings 120 and/or the detection engine 124. The web interface 126 may be configured to receive input from users. For example, the web interface 126 may enable users to list properties for rent, request a rental property, select terms and/or conditions for a rental agreement, agree to a rental agreement, modify terms of a rental agreement, etc. The listings and rental agreements generated from the web interface 126 may be listings 120 and the rental agreements 122 stored in the memory 112a-112n.

In the example shown, one of the user devices 52a-52b (e.g., the user device 52a) may be used by a rental property owner and the other of the user devices 52a-52b (e.g., the user device 52b) may be used by a prospective renter. The property owner user device 52a is shown receiving a signal (e.g., WEB), generating a signal (e.g., RENTOFR), receiving a signal (e.g., RAGREE) and generating a signal (e.g., CONFO). The signal RENTOFR and the signal CONFO may be communicated to the server computers 102a-102n by the property owner user device 52a. The renter user device 52b is shown receiving the signal WEB, generating a signal (e.g., RENTREQ), receiving the signal RAGREE and generating a signal (e.g., CONFR). The signal RENTREQ and the signal CONFR may be communicated to the server computers 102a-102n by the renter user device 52b. The signal WEB and the signal RAGREE may be communicated by the server computers 102a-102n to the user devices 52a-52b.

The signal WEB may represent the communication of the web interface 126 to the user devices 52a-52b. The rental property owner may use the web interface 126 to provide a rental offer. For example, the signal WEB may be configured to provide a listing form interface for the web application 126. The rental offer may be communicated to the server computers 102a-102n as the signal RENTOFR. The rental offer may list terms and/or conditions that the property owner has for the rental property 50. The server computers 102a-102n may store the rental offers as the listings 120. For example, the listings 120 may be generated based on the rental offers provided by various property owners. Details of the rental listing web interface 126 may be described in association with FIG. 8.

The signal WEB may be provided to the renter user device 52b to enable browsing the listings 120. The property renter may use the web interface 126 to request a rental property. For example, the signal WEB may be configured to provide a rental request form interface for the web application 126. A rental request may be communicated to the server computers 102a-102n as the signal RENTREQ. The rental request signal RENTREQ may provide a list attributes that the renter is seeking in a rental property. Details of the rental request web interface 126 may be described in association with FIG. 9.

The server computers 102a-102n may be configured to list rental properties based on the rental offers. For example, the servers 102a-102n may be configured to receive rental property offers from one or more property owners to provide the rental listings 120 that prospective renters may use to search using the signal RENTREQ. The server computers 102a-102n may provide the rental listings 120 (e.g., as the signal WEB) that prospective renters may browse through and/or may use the input signal RENTREQ from the rental request to find properties that closest match what the prospective renter is searching for according to the parameters entered into the web interface 126. For example, the server computers 102a-102n may be configured to filter the available listings 120 based on the data provided in the signal RENTREQ (e.g., at a specific location, available at particular times, allows a particular number of guests, allows pets, etc.). For example, the server computers 102a-102n may provide a match-making service to enable property owners to find suitable renters and to enable prospective renters to find a suitable rental property.

Based on the rental offer signal RENTOFR and/or the rental request signal RENTREQ, the server computers 102a-102n may generate the rental agreement 122. The rental agreement 122 may be communicated to both the property owner and the prospective renter as the signal RAGREE. The rental agreement 122 presented as the signal RAGREE may be a human-readable (e.g., text-based) contract that the property owner and renter may review and/or agree to. The rental agreement 122 may be generated from the selections made using the web interface 126 (e.g., based on the input from both the property owner and the prospective renter). Generally, the terms of the rental agreement 122 may be determined from the input of the property owner (e.g., using the signal RENTOFR). In some embodiments, the prospective renter may negotiate changes to the terms provided in the rental offer using the signal RENTREQ. Details of the rental agreement web interface 126 may be described in association with FIG. 10.

The property owner and the prospective renter may agree to the terms of the rental agreement 122. The web interface 126 may enable the property renter to agree to the rental agreement 122 and the property owner user device 52a may communicate the signal CONFO to confirm and/or accept the rental agreement 122. The web interface 126 may enable the prospective renter to agree to the rental agreement 122 and the renter user device 52b may communicate the signal CONFR to confirm and/or accept the rental agreement 122. If the server computers 102a-102n receive the signal CONFO and the signal CONFR (e.g., both parties agree to the rental agreement 122), then the rental agreement 122 may be stored in the memory 112a-112n and the rental agreement 122 may be parsed by the detection engine 124. If the server computers 102a-102n do not receive both the signal CONFO and the signal CONFR (e.g., at least one party does not confirm the rental agreement), then the rental agreement 122 may be discarded by the server computers 102a-102n.

When the rental agreement 122 is agreed to, the server computers 102a-102n may be configured to generate a feature set for the camera systems 104a-104n. The detection engine 124 may be configured to parse the conditions of the rental agreement 122. Based on the information from the rental agreement 122, the detection engine 124 may generate a feature set for the particular camera(s) 104a-104n at the rental property 50 covered by the rental agreement 122. The feature set may comprise the text of the rental agreement 122, and/or information that the camera systems 104a-104n may use to generate parameters for performing object detection according to the rental agreement 122. The feature set may be generated based on the conditions of the rental agreement 122. In an example, the feature set may be a machine readable version (e.g., computer readable data) of the rental agreement 122 that may enable the camera systems 104a-104n to detect breaches of the rental agreement 122 using computer vision analysis and/or audio analysis.

The server computers 102a-102n may generate a signal (e.g., FEAT_SET). The signal FEAT_SET may provide the feature set to the camera systems 104a-104n. The feature set may be generated by the detection engine 124 in response to parsing the rental agreement 122. The camera systems 104a-104n may operate (e.g., perform computer vision operations and/or audio analysis) based on the data in the signal FEAT_SET. For example, the signal FEAT_SET may provide parameters such as a number of people to detect, types of pets to detect, a maximum audio level, a time to search for particular features (e.g., additional guests may be allowed at particular times), a time range that the rental agreement 122 applies to, which features to ignore (e.g., do not detect faces to ensure privacy protection), etc. The type of information in the signal FEAT_SET may be varied according to the design criteria of a particular implementation.

The camera systems 104a-104n are shown comprising a block (or circuit) 130 and/or a block (or circuit) 132. The circuit 130 may implement a processor. The circuit 132 may implement a memory. Each of the camera systems 104a-104n may implement the processor 130 and the memory 132. The camera systems 104a-104n may each comprise other components (not shown). Details of the components of the camera systems 104a-104n may be described in association with FIG. 4.

The processor may receive the feature set from the server computers 102a-102n. The processor 130 may convert the feature set into detection parameters that may be used to perform the video and/or audio analysis. The detection parameters may be stored by the memory 132. The detection parameters may provide criteria about what the camera systems 104a-104n should look for when analyzing video frames (e.g., number of people detected, detecting pets, detecting a noise level, etc.).

The camera systems 104a-104 may be configured to perform video surveillance during a normal (or default) mode of operation. In some embodiments, the camera systems 104a-104n may be configured to record (or store) video data and/or communicate video data when in the default mode of operation. For example, when the camera systems 104a-104n are not operating according to the feature set provided by the servers 102a-102n (e.g., the rental agreement 122 is not in effect), then the camera systems 104a-104n may operate in the default mode of operation.

When the camera systems 104a-104n are operating according to the feature set (e.g., during a time range that is covered by the rental agreement 122), the camera systems 104a-104n may not record the video/audio data capture and may not communicate the video/audio data. The video data and/or audio data may not leave (e.g., be communicated by) the camera systems 104a-104n to ensure privacy of the renter. The camera systems 104a-104n may perform the computer vision operations to extract data about the video frames (e.g., how many people are detected in a video frame, the type of pet detected, a current audio level, etc.). Once the data is extracted, the video frames and/or audio data may be discarded (or deleted, or overwritten, etc.).

The processor 130 may analyze the extracted data. The extracted data may be compared to the detection parameters from the feature set for the active rental agreement 122. If the processor 130 detects a match of the data to the detection parameters (e.g., detects a scenario that is a breach of the rental agreement 122), the camera systems 104a-104n may generate a notification. A signal (e.g., NTF) is shown. The signal NTF may represent the notification generated by the camera systems 104a-104n. The notification NTF may be sent to the property owner and/or the renter. The notification NTF may indicate that the rental agreement 122 has been breached and/or the type of breach that has been detected. The notification may not provide the video frames and/or audio data that corresponds to the breach of the rental agreement 122 because the video frames and/or audio data may already be unavailable (e.g., deleted) to protect the privacy of the renter(s).

In the example shown, one feature set signal FEAT_SET is provided to each of the camera systems 104a-104n. However, in some embodiments, a different feature set may be generated for each camera system 104a-104n. For example, the feature set may be generated according to the specifications and/or detection capabilities of each camera system 104a-104n (e.g., different makes/models of cameras may be required to have a feature set in a different format). In another example, the feature set may be different based on particular rooms at the location 50 (e.g., the main living room may be allowed to have 10 guests and the camera system 104a in the main living room may receive a feature set to detect up to 10 guests, while a bedroom may be off limits to everyone and the camera system 104b in the bedroom may receive a feature set to detect a breach when any guest is detected). In yet another example, the feature set may be different for each of the camera systems 104a-104n based on the position of the camera systems 104a-104n in a room and/or a size of the room. For example, feature sets may be generated based on training data for small rooms and/or large rooms, depending on the height of the camera in the room, etc. In some embodiments, different pre-defined sets of data on the server computers 102a-102n may be downloaded into the camera systems 104a-104n based on the specifications of the camera systems 104a-104n and/or the characteristics of the room and/or mounting location of the camera systems 104a-104n. The variety of feature sets that may be provided to the camera systems 104a-104n may be defined by the rental agreement 122.

The server computers 102a-102n may be configured to generate and/or receive a signal (e.g., QUERY). The signal QUERY may be communicated to/from the camera systems 102a-102n. The signal QUERY may be communicated to enable the servers 102a-102n to determine the capabilities, features and/or limitations of the camera systems 104a-104n. The signal QUERY may be communicated to enable the servers 102a-102n to determine the characteristics of the room and/or environment that the camera systems 104a-104n are located in. In an example, the capabilities, features and/or limitations of the camera systems 104a-104n may comprise the type, number, and/or details of the object detection of the camera systems 104a-104n (e.g., how many objects may be detected, the types of objects that may be detected, the level of detail of the detection, whether a microphone is connected to receive audio, a height and/or distance from the objects to be detected, etc.). The capabilities of the camera systems 104a-104n may be used to determine what type of entries (e.g., terms and conditions) for the rental agreement 122 may be detectable by the camera systems 104a-104n at the location 50 and/or the types of feature sets to provide to the camera systems 104a-104n.

The signal QUERY may be analyzed by the detection engine 124. For example, the signal QUERY may comprise technical specifications, a make/model, etc. of the camera systems 104a-104n. The detection engine 124 may be configured to parse the technical specifications to determine what the camera systems 104a-104n may be capable of detecting. In some embodiments, the detection engine 124 may be configured to generate input fields for the web interface 126 in response to the signal QUERY. For example, if the camera systems 104a-104n are capable of detecting a type of pet using computer vision operations, then the detection engine 124 may generate an input field for the web interface 126 that enables input of a type of pet. Similarly, if the camera systems 104a-104n are not capable of detecting a type of pet using computer vision operations, then the input field for a type of pet may not be available on the web interface 126.

Figure 2:
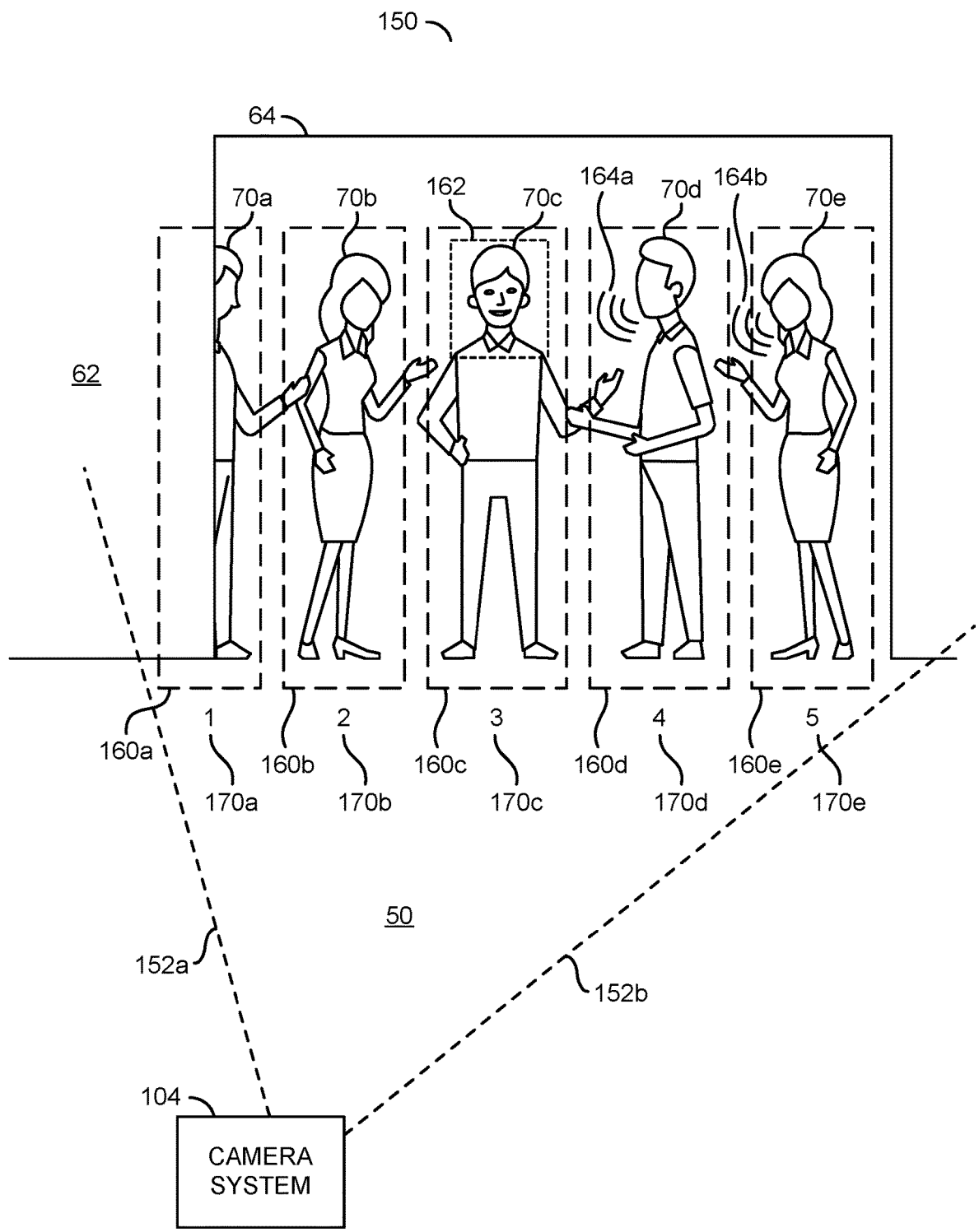
FIG. 2 is a diagram illustrating an example embodiment of the camera system at the rental location.

Referring to FIG. 2, a diagram illustrating an example embodiment of the present invention is shown. An example rental scenario 150 is shown. The example rental scenario 150 may be at the location 50. In an example, the location 50 may be a rental property in the listings 120. In the example shown, the location 50 may be an interior location. In another example, the location 50 may be an outdoor location. In yet another example, the location 50 may be a combination of an indoor and outdoor location comprising multiple rooms of a building and/or multiple floors of a building. The type of location 50 may be varied according to the design criteria of a particular implementation.

In the example shown, the location 50 may comprise an interior wall 62. An opening 64 is shown in the wall 62 (e.g., a doorway to another room). A number of people 70a-70e are shown. The person 70a is shown partially obscured by the wall 62. The people 70b-70e may be visible in the opening 64.

The camera system 104 is shown as a representative example of the camera systems 104a-104n. The camera system 104 may be configured to capture video data, capture audio data, perform computer vision operations and/or perform audio analytics. In an example, the camera system 104 may be configured to implement a rental property monitoring system using computer vision and audio analytics to detect parties and pets while preserving renter privacy.

Lines 152a-152b are shown. The lines 152a-152b may represent a field of view of the camera system 104. The camera system 104 may capture video frames of the area within the field of view 152a-152b. In the example shown, the lines 152a-152b may provide an illustrative example of the field of view of the camera system 104. In some embodiments, the camera system 104 may comprise one single 360-degree camera (e.g., capturing a 360-degree field of view). In some embodiments, the camera system 104 may comprise two back-to-back 180-degree cameras for capturing two 180-degree fields of view (e.g., in front and behind the camera system 104). In some embodiments, the camera system 104 may implement a fisheye lens providing a wide-angle field of view. The types of lenses used and/or the field of view captured by the camera system 104 may be varied according to the design criteria of a particular implementation.

In the example location 50, the people 70a-70e may be within the field of view 152a-152b of the camera system 104. In the example shown, the people 70a-70e may be visible in video frames captured by the camera system 104. Dotted boxes 160a-160e are shown. The dotted boxes 160a-160e may represent objects detected by the camera system 104. The dotted boxes 160a-160e are shown around the people 70a-70e. In the example shown, the camera system 104 may be configured to detect the people 70a-70e as the objects 160a-160e. While the people 70a-70e are shown as the detected objects 160a-160e in the example shown in association with FIG. 2, the detected objects 160a-160e may be animals and/or inanimate objects (e.g., furniture, electronics, structures, etc.). While five people 70a-70e are shown as the detected objects 160a-160e, the camera system 104 may be configured to detect any number of objects (e.g., detect the people 70a-70n as the objects 160a-160n). The number and/or types of objects 160a-160n detected by the camera system 104 may be varied according to the design criteria of a particular implementation.

A dotted box 162 is shown around the head of the person 70c. The dotted box 162 may represent the camera system 104 detecting characteristics of the object 160c. While the characteristics 162 are shown corresponding to the object 160c, the camera system 104 may be configured to detect the characteristics of each of the objects 160a-160n. The camera system 104 may be configured to analyze the characteristics 162 of the objects 160a-160n to determine what the objects 160a-160n are (e.g., classification), determine what the objects 160a-160n are doing (e.g., behavior analysis) and/or to distinguish one object from another object. The types of characteristics 162 detected and/or analyzed and/or the inferences made based on detecting the characteristics 162 may be varied according to the design criteria of a particular implementation.

The characteristics 162 may comprise descriptive and/or identifying attributes of the objects 160a-160n. In one example, the characteristics 162 may comprise clothing worn (e.g., style of clothing, a color of the clothing, the color of the pants, whether pants or shorts are worn, brand of pants worn, etc.). The characteristics 162 may comprise physical characteristics about the detected objects 160a-160n. In an example, the characteristics 162 may comprise a height, estimated weight, body type, hair color, skin color, gait, etc. The types of characteristics 162 detected may be used to distinguish one of the people 70a-70n from another of the people 70a-70n (e.g., to ensure that the number of people are counted without double-counting a person). The types of the characteristics 162 detected may be varied according to the design criteria of a particular implementation.

Waves 164a-164b are shown. The waves 164a-164b may represent audio detected by the camera system 104. In the example shown, the waves 164a-164b may represent people talking. For example, the waves 164a may be an illustrative representation of the person 70d talking and the waves 164b may be an illustrative representation of the person 70e talking. The camera system 104 may be configured to determine an audio level (e.g., amplitude) of the audio 164a-164b. In the example shown, the audio 164a-164b may be generated from the people 70a-70e. The camera system 104 may be configured to determine an audio level of the location 50. The audio level may comprise audio from the people 70a-70e (e.g., talking), televisions, music devices, objects breaking, etc. The type of audio detected may be varied according to the design criteria of a particular implementation.

The computer vision operations performed by the camera system 104 may be configured to extract data from the video frames and/or the audio captured. The extracted data may comprise parameters and/or statistics about the content of the video frames and/or audio captured. Extracted data 170a-170e is shown. In the example shown, the extracted data 170a-170e may represent a person count corresponding to the people 70a-70e in the location 50. The extracted data 170a-170e may be used by the camera system 104 to make decisions. In one example, the decisions made by the camera system 104 based on the extracted data 170a-170e may comprise determining whether terms of the rental agreement 122 have been breached. After the extracted data 170a-170e has been generated from the video frames and/or the audio captured, the camera system 104 may discard the video frames and/or the audio captured (e.g., additional information from the video frames and/or the audio captured may be needed to make decisions).

In some embodiments, the computer vision operations performed by the camera system 104 may be configured to count a number of people at the location 50. In the example shown, numbers 1-5 (e.g., the extracted data 170a-170e) are shown below a corresponding one of the detected objects 160a-160e. The camera system 104 may be configured to distinguish between the detected objects 160a-160n based on the characteristics 162 of each of the detected objects 160a-160n. For example, the camera system 104 may be configured to determine that the person 70b is one person and the person 70c is another person. In another example, the characteristics 162 may be used to prevent the people 70a-70e from being counted multiple times (e.g., distinguishing a reflection of a person from the actual person).

In the example shown, the person 70a is shown partially obscured behind the wall 62. The camera system 104 may be configured to determine that the characteristics 162 of the visible portion of the person 70a corresponds to one person. For example, the camera system 104 may be configured to infer that a person has been detected based on a partial view. In the example shown, the hand of the person 70d is shown in front of the arm of the person 70c. The camera system 104 may be configured to determine that more than one person is present when one person is partially in front of another person.

In some embodiments, the camera system 104 may be configured to determine a behavior of the objects 160a-160n. Inferences may be made about the behavior of the objects 160a-160n based on the characteristics 162 detected. In an example, a person that is standing still and using arm gestures may be determined to be talking. In another example, regular or rhythmic body movement may be determined to be dancing. The body movement may be compared to the audio data (e.g., music) to determine whether the behavior indicates dancing. In one example, the camera system 104 may make an inference that there is a party at the location 50 based on the people 70a-70n dancing. In yet another example, the characteristics 162 may indicate that the people 70a-70n are holding drinks, which may indicate alcohol is being consumed at the location 50. For example, optical character recognition (OCR) may be implemented to read labels (e.g., to detect beer, liquor, wine, etc.).

In the example shown, the characteristics 162 may correspond to a face of the person 70c (e.g., the detected object 160c). The characteristics 162 may be determined for each of the detected objects 160a-160e (e.g., the people 70a-70e, items held by the people 70a-70e, other items in the location 50, etc.). The characteristics 162 may comprise a color of the detected objects 160a-160e (e.g., color of clothing worn). The characteristics 162 may comprise the size of objects (e.g., a height of a person). The characteristics 162 may comprise a classification of the detected objects 160a-160e (e.g., recognizing the people 70a-70e as distinct people, identifying an item as a television, recognizing an animal, etc.). In some embodiments, the characteristics 162 may be used by the camera system 104 to distinguish between the detected objects 160a-160e.

The extracted data 170a-170e about the number of guests may be compared to the detection parameters converted by the processor 130 from the signal FEAT_SET. For example, the rental agreement 122 may indicate a limitation on the number of guests allowed at the rental property 50. The detection engine 124 may convert the machine readable version of the rental agreement 122 into detection parameters that may be usable by the camera system 104 at the rental property 50 shown. The detection parameters may provide computer readable instructions about what types of objects and/or scenarios that the camera system 104 should detect at the rental property 50.

For example, the rental agreement 122 may indicate a maximum of six guests, the detection engine 124 may query the camera system 104 to determine a format of the feature set for the camera system 104, the detection engine 124 may convert the guest limitation from the rental agreement 122 into the feature set, and the processor 130 of the camera system 104 may convert the feature set into detection parameters used to perform the computer vision operations. If six guests is one of the detection parameters, then the camera system 104 may analyze video frames generated to count the number of the guests 70a-70n to determine if the number of guests is less than, equal to or greater than six guests. In the example shown, the extracted data 170a-170e about the number of the guests 70a-70e may indicate five guests are at the rental property 50. Since the number of guests is less than the amount in the detection parameters, then the camera system 104 may not indicate a breach has been detected. If more than six guests were detected, then the camera system 104 may generate the notification signal NTF to indicate that a breach of the rental agreement 122 has been detected.

Generally, the feature set and/or conditions generated from the rental agreement 122 may comprise activities of the renter of the property 50. In some embodiments, the detection parameters may comprise duties and/or requirements of the property owner. For example, when the property owner is preparing the property 50 for the renter, the camera system 104 may provide a check that the property has provided all the amenities agreed to in the rental agreement 122 (e.g., left out clean towels and clean bedsheets, left out toiletries, etc.). In some embodiments, the camera system 104 may be configured to detect particular events that the property owner has agreed to respond to in the rental agreement 122 (e.g., fixing a water leak, replacing a broken appliance, etc.).

In some embodiments, the computer vision operations may detect the type of activities being performed. For example, the rental agreement 122 may provide restriction on how the property 50 is allowed to be used. For example, if the property 50 has a pool and the rental agreement 122 does not permit usage of the pool, the camera system 104 may be configured to detect if the renter(s) are using the pool in breach of the rental agreement 122.

Figure 3:
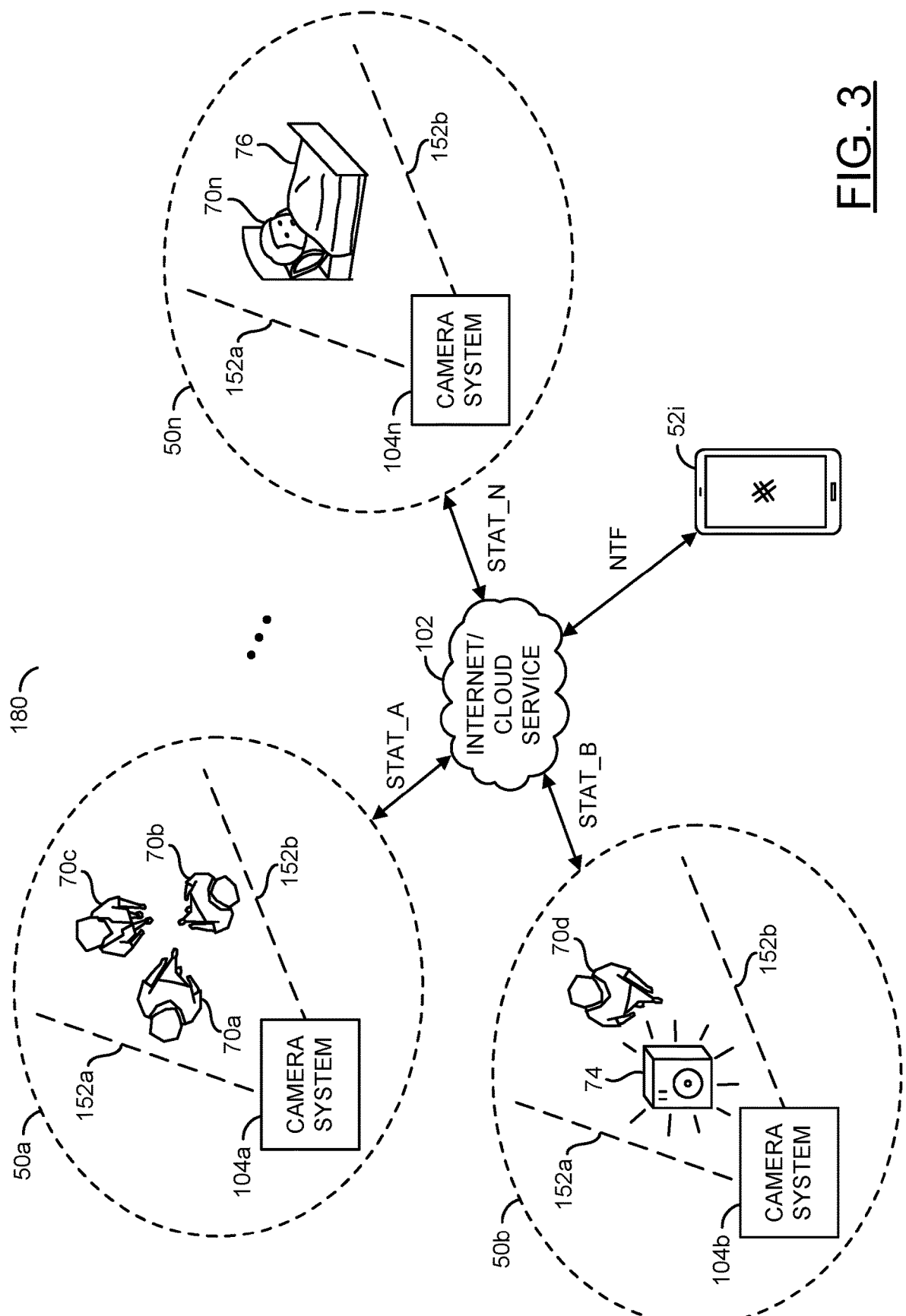
FIG. 3 is a diagram illustrating monitoring rental properties using computer vision and/or audio analytics.

Referring to FIG. 3, a diagram illustrating monitoring rental properties using computer vision and/or audio analytics is shown. An example scenario 180 is shown. The example scenario 180 may comprise a number of locations 50a-50n, the network/cloud service 102 and/or the remote device 52i. In some embodiments, the locations 50a-50n may be remote locations (e.g., different geographic locations such as different cities, different countries, different areas within the same city, etc.). In some embodiments, the locations 50a-50n may be different locations within the same building (e.g., different rooms of a rental property, an interior and an exterior of a rental property, etc.). Each of the locations 50a-50n are shown implementing a respective camera system 104 (e.g., the camera systems 104a-104n). For example, each of the camera systems 104a-104n may be configured to operate independently of each other (e.g., video data and/or audio data may not be shared). However, the parameters and statistics generated by the camera systems 104a-104n may be shared. Generally, each of the camera systems 104a-104n may be configured to monitor the respective locations 50a-50n similar to the camera system 104 monitoring the location 50 described in association with FIG. 2.

The network 102 may be implemented as part of a cloud computing platform (e.g., distributed computing). In an example, the network 102 may be implemented as a group of cloud-based, scalable server computers. By implementing a number of scalable servers, additional resources (e.g., power, processing capability, memory, etc.) may be available to process and/or store variable amounts of data. For example, the network 102 may be configured to scale (e.g., provision resources) based on demand. The network 102 may implement scalable computing (e.g., cloud computing). The scalable computing may be available as a service to allow access to processing and/or storage resources without having to build infrastructure. In some embodiments, the network 102 may be configured to provide resources such as training data and/or a database of feature maps (e.g., feature maps of recognized objects to perform object recognition and/or classification). For example, the training data and/or feature maps may be communicated to the camera systems 104a-104n by the network 102 based on the contents of the rental agreement 122.

In the example shown, the remote device 52i may be implemented as a smartphone. In the example shown, one remote device 52i is shown. However, the example scenario 180 may be implemented having multiple remote devices (e.g., remote devices 52a-52n, not shown). In an example, the smartphone 52a may be used by the landlord and the smartphone 52b may be used by the renter.

The remote device 52i may be configured to receive notifications from the camera systems 104a-104n. The camera systems 104a-104n may not communicate the video data and/or the audio data. For example, the camera systems 104a-104n may discard video data and/or audio data after performing the analysis. Discarding the video data and/or audio data may ensure the privacy of the people 70a-70n. The notification may provide information that corresponds to the determinations made by the camera systems 104a-104n in response to performing the analysis of the video data and/or audio data (e.g., based on the statistic and parameters).

In the example shown, the remote device 52i is shown at a location other than the locations 50a-50n. For example, the notification may provide the rental property owner information about the locations 50a-50n from a remote geographic location. In some embodiments, the remote device 52i may be located at or near one of the locations 50a-50n. For example, to further protect privacy of the people 70a-70n, the information about the analysis performed by the camera systems 104a-104n may be stored on-site at the locations 50a-50n and the rental property owner may access the information on-site.

The locations 50a-50n may each comprise a respective one of the camera systems 104a-104n. Each of the camera systems 104a-104n are shown having the field of view 152a-152b. In the example shown, the locations 50a-50n may be the subject of the monitoring.

The rental property owner may provide the people 70a-70n with the rental agreement 122. The rental agreement 122 may comprise a list of restrictions. The restrictions may comprise various entries that may comprise a number of people, disallowed animals, noise levels and/or behaviors. The camera systems 104a-104n may be configured to perform the analysis of the video data and/or the audio data to determine whether the data detected matches any entries on the list of restrictions. For example, the list of restrictions may be converted to parameters that may be used by the computer vision operations and/or the audio analytics to perform the detection. If the data detected by the camera systems 104a-104n matches any of the entries on the list of restrictions, the camera system 104 may generate a notification. The notification may be a warning to the people 70a-70n to cure the cause of the warning. The notification may be provided to the rental property owner.

Status signals (e.g., STAT_A-STAT_N) are shown presented to the network 102. The status signals STAT_A-STAT_N may be generated by the camera systems 104a-104n. The status signals STAT_A-STAT_N may represent the notifications generated by the camera systems 104a-104n. In some embodiments, the status signals STAT_A-STAT_N may provide continual updates (e.g., provided even if the camera system 104a-104n does not detect any of the entries of the list of restrictions). For example, the signals STAT_A-STAT_N may provide continual updates about the extracted data 170a-170e (e.g., the number of the people 70a-70n at the rental property) generated by the camera systems 104a-104n.

In the example shown, the signals STAT_A-STAT_N are shown communicated from the camera systems 104a-104n to the network 102. In some embodiments, the signals STAT_A-STAT_N may be shared between the camera systems 104a-104n. For example, the breach of the rental agreement 122 may be based on a total number of people detected. If the locations 50a-50n are multiple rooms in a single rental property, one of the camera systems 104a-104n alone may not be capable of counting all the people at once. By sharing the parameters and statistics in the signals STAT_A-STAT_N, the cameras 104a-104n may determine the total number of people.

The signal NTF is shown. The signal NTF may be presented to the remote device 52i in response to one or more of the status signals STAT_A-STAT_N. The signal NTF may be provided in a format readable by the remote device 52i. For example, an application may be provided for the rental property owner to use on the remote device 52i and the application may be compatible with an API of the network 102 and/or the camera systems 104a-104n.

In the example shown, the notification signal NTF is shown provided by the network 102 to the remote device 52i. In some embodiments, the camera systems 104a-104n may be configured to generate the notification locally. For example, the camera systems 104a-104n may comprise a speaker configured to provide an audio warning to the renters when a breach has been detected (e.g., "The terms of the rental agreement 122 have been breached. Ten people have been detected and only 4 are allowed. Please ask 6 people to leave.").

In the location 50*a*, three of the people 70*a*-70*c* are shown. The camera system 104*a* may be configured to count the number of people at the location 50*a* using the computer vision operations. The computer vision operations performed by the camera system 104*a* may detect three people. The example shown in association with the location 50*a* may represent detecting more people than are allowed by the list of restrictions. For example, the rental agreement 122 may provide a restriction of two people. In an example, when three people are detected by the camera system 104*a*, the camera system 104*a* may generate the signal STAT_A. In another example, the camera system 104*a* may provide regular updates about the number of people using the signal STAT_A (e.g., the camera system 104*a* may indicate that two people are at the location 50*a*, then update at regular intervals and when the third person arrives the number of people will be updated). The signal NTF may be presented by the network 102 to the remote device 52*i* in response to the signal STAT_A. In an example, the notification may indicate that the entry on the list of restrictions for number of people has been violated.

In the location 50*b*, the person 70*d* and a speaker 74 are shown. The camera system 104*b* may be configured to count the number of people at the location 50*a* using the computer vision operations. In an example, the computer vision operations performed by the camera system 104*b* may detect one person, which may be in compliance with the list of restrictions. The example shown in association with the location 50*b* may represent detecting a higher audio level than is allowed by the list of restrictions. For example, the rental agreement 122 may provide a restriction on noise level. In the example shown, the speaker 74 may be set to eleven (e.g., too loud compared to the noise level threshold from the list of restrictions). The camera system 104*b* may perform the analysis of the audio from the speaker 74 and determine whether the amplitude of the audio detected matches (or is greater than) the audio amplitude limitation level entry on the list of restrictions. In one example, when the camera system 104*b* detects that the audio level is greater than allowed by the list of restrictions, the camera system 104*b* may generate the signal STAT_B. In another example, the camera system 104*b* may provide regular updates about the detected audio level using the signal STAT_B (e.g., the camera system 104*b* may indicate the audio level in decibels and then update at regular intervals). The signal NTF may be presented by the network 102 to the remote device 52*i* in response to the signal STAT_B. In an example, the notification may indicate that the entry on the list of restrictions for noise level has been violated.

In the location 50*n*, the person 70*n* and a bed 76 are shown. The camera system 104*n* may be configured to count the number of people at the location 50*n* using the computer vision operations. In an example, the computer vision operations performed by the camera system 104*n* may detect one person, which may be in compliance with the list of restrictions. The camera system 104*n* may further perform the audio analysis to detect the noise level. In the example shown, the person 70*n* may be sleeping and not making noise. Since the person 70*n* may be in compliance with the list of restrictions, the camera system 104*n* may not send the signal STAT_N. In some embodiments, the camera system 104*n* may send the signal STAT_N that shows the number of people and the audio level is in compliance with the list of restrictions.

In some embodiments, the signals STAT_A-STAT_N may not provide details of the behavior of the people 70*a*-70*n* to preserve privacy. For example, the signal STAT_N may not indicate that the person 70*n* is sleeping in the bed 76. The signals STAT_A-STAT_N may merely provide sufficient information to indicate whether or not the renters (e.g., the people 70*a*-70*n*) are in compliance with the list of restrictions. For example, the signal STAT_N may provide information that the number of people detected and the noise level was less than the threshold indicated by the list of restrictions in the rental agreement 122.

In some embodiments, the camera systems 104*a*-104*n* may be configured to share data. The data shared between the camera systems 104*a*-104*n* may enable additional information to be aggregated for inferences to be made by the camera systems 104*a*-104*n*. For example, if the camera systems 104*a*-104*n* provide video data and audio data from multiple rooms of the same rental property, the camera systems 104*a*-104*n* may share the number of people (e.g., the extracted data 170*a*-170*e*) counted in each room to determine a total number of people at the rental property. To ensure privacy, the camera systems 104*a*-104*n* may not share the video data and/or the audio data. To ensure privacy, the camera systems 104*a*-104*n* may share the results determined by the computer vision operations and/or the audio analysis. For example, each camera system 104*a*-104*n* may perform the computer vision operations to determine the number count 170*a*-170*e* of people and share the number count 170*a*-170*e* to determine a total number of occupants at the rental property. The results shared may be limited to ensure privacy while providing enough information to make a determination about whether the terms of the rental agreement 122 have been breached. For example, the number count 170*a*-170*e* may be shared if the number of people is an entry of the rental agreement 122, but may not be shared if the number of people is not an entry of the rental agreement 122.

The camera systems 104*a*-104*n* may be configured to apply various types of audio analysis (e.g., sound levels, frequency analysis, artificial intelligence for detecting words and/or phrases, etc.). In an example, the camera systems 104*a*-104*n* may be configured to determine a sound level of the audio and/or detect the type of audio (e.g., determine whether the detected audio is loud music, a loud animal, loud voices, etc.). In some embodiments, the camera systems 104*a*-104*n* may be configured to combine the audio analysis with video analysis (e.g., perform the computer vision analysis to determine the body movements to determine that the people 70*a*-70*n* are dancing and perform the audio analysis to determine that there is loud music). The type of analysis performed may be based on the list of restrictions. For example, merely playing music too loudly may be an issue and the notification may be sent based on the sound level without performing the behavioral analysis to determine that the people 70*a*-70*n* are dancing (e.g., the sound level may be an issue regardless of what the people 70*a*-70*n* are doing).

In some embodiments, the camera systems 104*a*-104*n* may be implemented as small, discreet cameras that may be hidden from view. Hiding the camera systems 104*a*-104*n* may prevent renters from attempting to obscure the lens. In some embodiments, the camera systems 104*a*-104*n* may be implemented in plain view and/or highlighted to bring attention to the camera systems 104*a*-104*n*. The camera systems 104*a*-104*n* may be configured to detect when the field of view 152*a*-152*n* has been obscured (e.g., detect all black video frames, detect if more than a threshold percentage of the video frame is dark, etc.). For an example of a rental property, the camera systems 104a-104n may be explicitly described in the rental agreement 122, along with the locations of the camera systems 104a-104n and the list of restrictions. Implementing the camera systems 104a-104n such that the camera systems 104a-104n are visible may act as a deterrent to those seeking to rent accommodation and hold parties. In an example, when the renter fills out the rental application form there may be a request to acknowledge that the camera systems 104a-104n are installed and state how many people will be present and whether there will be any pets.

The camera systems 104a-104n may maintain the privacy of the renter. No video data and/or audio data may be streamed or recorded. The computer vision operations may be configured to detect a crowd and/or count people. The camera systems 104a-104n may be configured to detect if the field of view 152a-152n has been obscured in any way. In some embodiments, the camera systems 104a-104n may not make determinations based on sex, race, other physical features, etc. In one example, the camera systems 104a-104n may be configured to detect when each of the people 70a-70n first arrive and then compare the people count 170a-170e to a threshold (e.g., based on the entry in the list of restrictions). For example, the camera systems 104a-104n may determine whether a party is being held at the rental property based on various parameters (e.g., people count, loud noises, music, etc.).

The camera systems 104a-104n may be configured to detect loud sounds (e.g., identifying music, breaking glass, smoke alarms, etc.). The camera systems 104a-104n may be configured to detect pets (e.g., cats, dogs, birds, ferrets, snakes, gerbils, etc.). The camera systems 104a-104n may be configured to count people to determine if more people are detected than the threshold number of people that may be set by the landlord. The list of restrictions may be provided to the renters in the rental agreement 122. The list of restrictions may be converted to threshold parameters that may be readable by the camera systems 104a-104n. The types of conditions that the camera systems 104a-104n may search for using the computer vision operations and/or the audio analytics may be determined based on the threshold parameters. In an example, if the landlord does not list pets as an entry on the list of restrictions, the computer vision operations may not search for pets. The method of converting the list of restrictions to the threshold parameters may be varied according to the design criteria of a particular implementation.

In some embodiments, the camera systems 104a-104n may be configured to implement computer vision acceleration hardware to perform the computer vision operations. In some embodiments, the camera systems 104a-104n may be configured to perform cropping and/or zooming techniques as part of the computer vision operations to assist in the person and pet detection.

In some embodiments, the camera systems 104a-104n may be configured to implement facial recognition. Facial recognition may represent a trade-off between available types of detections that may be made for the list of restrictions and privacy concerns. In an example, the camera systems 104a-104n may be configured to perform the facial recognition locally (e.g., comparing feature maps from the faces of previously detected people to the features maps currently detected on the people 70a-70n in the location 50). However, a database of feature maps to compare against may comprise a large amount of data (e.g., typically stored using services such as the cloud services 102). Sending the currently detected feature maps for facial recognition may be a potential privacy concern since the data detected by the camera systems 104a-104n would not all be kept locally and then discarded. In some embodiments, depending on the storage capacity available to the camera systems 104a-104n a number of feature maps for faces may be stored locally. In an example, parents may want a limited number of people restricted (e.g., detect a boyfriend/girlfriend when the parents are not home). In some embodiments, particular characteristics 162 may be detected (e.g., hair color, color of clothing, type of clothing worn, etc.). In some embodiments, the processor 130 of the camera systems 104a-104n may be capable of performing facial recognition, but may not be configured to perform the facial recognition. In an example, in the default mode of operation (e.g., when the rental agreement 122 is not active), the facial recognition may be performed, and facial recognition may be deactivated when the rental agreement 122 is active.

The signal NTF may be customizable by the landlord. In an example, the landlord may receive a notification on the smartphone 52i when music is detected above the threshold level set by the list of restrictions. In some embodiments, the renter may also receive the notification. For example, if the renter also receives the notification, the renter may have an opportunity to correct the issue (e.g., turn down the music) before the landlord has to intervene. In some embodiments, the notification may provide details of the entry on the list of restrictions that has been violated (e.g., "five people have been detected but only two people are allowed on the property"). Providing a detailed notification may enable the renter to take action to ensure that the property is protected according to the list of restrictions. In some embodiments, the notification may be configured to protect privacy by not indicating the particular entry on the list of restrictions that has been violated. For example, the notification may provide the list of restrictions and indicate that a violation has been detected. In some embodiments, the renter may be able to respond to the notification. The response to the notification may be sent to the landlord (e.g., to acknowledge the notification and confirm they have taken action to correct the violation).

The camera systems 104a-104n may be configured to discard the video data after performing the computer vision operations. The video data may not be stored long term. The video data may not be streamed to a remote location. In an example, to perform the computer vision operations, the camera systems 104a-104n may perform the video analysis on a single video frame. Some additional information from data in a buffer may be used. The camera systems 104a-104n may generate the data (e.g., conclusions, inferences, the number of people 70a-70e, etc.), and the video data may be discarded. The data may be updated as new data is extracted from incoming video frames. However, previous video data is unavailable after being discarded. The previously determined data may be used and/or stored but the video data and/or audio data that the data was extracted from may be discarded. In an example, a history of the data may be stored. For example, the noise level may be recorded along with a time stamp of when the noise level was determined. The history of the data may be compared with complaints. For example, if a neighbor calls in a noise complaint with the police, the camera systems 104a-104n may provide the timestamped noise level to determine whether the neighbor has provided a legitimate complaint.

Figure 4:
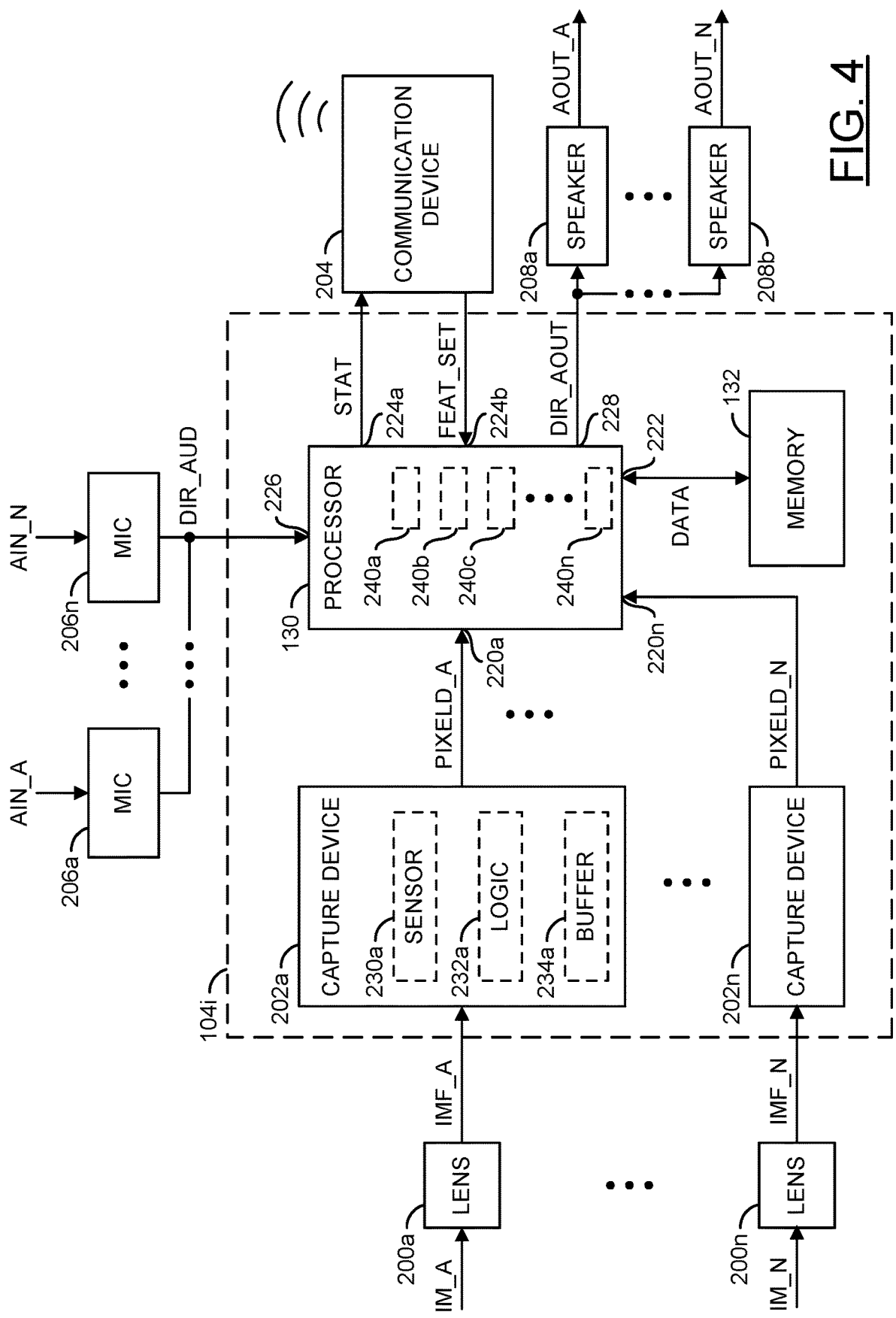
FIG. 4 is a block diagram illustrating an example embodiment of the camera system.

Referring to FIG. 4, a block diagram illustrating an example embodiment of the camera system is shown. A block diagram of the camera system 104i is shown. The camera system 104*i* may be a representative example of the camera system 104*a*-104*n* shown in association with FIGS. 1-3. The camera system 104*i* generally comprises the processor 130, the memory 132, blocks (or circuits) 200*a*-200*n*, blocks (or circuits) 202*a*-202*n*, a block (or circuit) 204, blocks (or circuits) 206*a*-206*n* and/or blocks (or circuits) 208*a*-208*n*. The blocks 200*a*-200*n* may implement lenses. The circuits 202*a*-202*n* may implement capture devices. The circuit 204 may implement a communication device. The circuits 206*a*-206*n* may implement microphones (e.g., audio capture devices). The circuits 208*a*-208*n* may implement audio output devices (e.g., speakers). The camera system 104*i* may comprise other components (not shown). In the example shown, some of the components 200-208 are shown external to the camera system 104*i*. However, the components 200-208 may be implemented within and/or attached to the camera system 104*i* (e.g., the speakers 208*a*-208*n* may provide better functionality if not located inside a housing of the camera system 104*i*). The number, type and/or arrangement of the components of the camera system 104*i* may be varied according to the design criteria of a particular implementation.

In an example implementation, the circuit 130 may be implemented as a video processor. The processor 130 may comprise inputs 220*a*-220*n* and/or other inputs. The processor 130 may comprise an input/output 222. The processor 130 may comprise an output 224*a* and an input 224*b*. The processor 130 may comprise an input 226. The processor 130 may comprise an output 228 and/or other outputs. The number of inputs, outputs and/or bi-directional ports implemented by the processor 130 may be varied according to the design criteria of a particular implementation.

In the embodiment shown, the capture devices 202*a*-202*n* may be components of the camera system 104*i*. In some embodiments, the capture devices 202*a*-202*n* may be separate devices (e.g., remotely connected to the camera system 104*i*, such as a drone, a robot and/or a system of security cameras configured capture video data) configured to send data to the camera system 104*i*. In one example, the capture devices 202*a*-202*n* may be implemented as part of an autonomous robot configured to patrol particular paths such as hallways. Similarly, in the example shown, the wireless communication device 204, the microphones 206*a*-206*n* and/or the speakers 208*a*-208*n* are shown external to the camera system 104*i* but in some embodiments may be a component of (e.g., within) the camera system 104*i*.

The camera system 104*i* may receive one or more signals (e.g., IMF_A-IMF_N), the signal FEAT_SET and/or one or more signals (e.g., DIR_AUD). The camera system 104*i* may present the signal STAT (e.g., one of the signals STAT_A-STAT_N shown in association with FIG. 3) and/or a signal (e.g., DIR_AOUT). The capture devices 202*a*-202*n* may receive the signals IMF_A-IMF_N from the corresponding lenses 200*a*-200*n*. The processor 130 may receive the signal DIR_AUD from the microphones 206*a*-206*n*. The processor 130 may present the signal STAT to the communication device 204 and receive the signal FEAT_SET from the communication device 204. For example, the wireless communication device 204 may be a radio-frequency (RF) transmitter. In another example, the communication device 204 may be a Wi-Fi module. In another example, the communication device 204 may be a device capable of implementing RF transmission, Wi-Fi, Bluetooth and/or other wireless communication protocols. The processor 130 may present the signal DIR_AOUT to the speakers 208*a*-208*n*.

The lenses 200*a*-200*n* may capture signals (e.g., IM_A-IM_N). The signals IM_A-IM_N may be an image (e.g., an analog image) of the environment near the camera system 104*i* presented by the lenses 200*a*-200*n* to the capture devices 202*a*-202*n* as the signals IMF_A-IMF_N. The lenses 200*a*-200*n* may be implemented as an optical lens. The lenses 200*a*-200*n* may provide a zooming feature and/or a focusing feature. The capture devices 202*a*-202*n* and/or the lenses 200*a*-200*n* may be implemented, in one example, as a single lens assembly. In another example, the lenses 200*a*-200*n* may be a separate implementation from the capture devices 202*a*-202*n*. The capture devices 202*a*-202*n* are shown within the circuit 104*i*. In an example implementation, the capture devices 202*a*-202*n* may be implemented outside of the circuit 104*i* (e.g., along with the lenses 200*a*-200*n* as part of a lens/capture device assembly).

The capture devices 202*a*-202*n* may be configured to capture image data for video (e.g., the signals IMF_A-IMF_N from the lenses 200*a*-200*n*). In some embodiments, the capture devices 202*a*-202*n* may be video capturing devices such as cameras. The capture devices 202*a*-202*n* may capture data received through the lenses 200*a*-200*n* to generate raw pixel data. In some embodiments, the capture devices 202*a*-202*n* may capture data received through the lenses 200*a*-200*n* to generate bitstreams (e.g., generate video frames). For example, the capture devices 202*a*-202*n* may receive focused light from the lenses 200*a*-200*n*. The lenses 200*a*-200*n* may be directed, tilted, panned, zoomed and/or rotated to provide a targeted view from the camera system 104*i* (e.g., to provide coverage for a panoramic field of view such as the field of view 152*a*-152*b*). The capture devices 202*a*-202*n* may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 220*a*-220*n* of the processor 130.

The capture devices 202*a*-202*n* may transform the received focused light signals IMF_A-IMF_N into digital data (e.g., bitstreams). In some embodiments, the capture devices 202*a*-202*n* may perform an analog to digital conversion. For example, the capture devices 202*a*-202*n* may perform a photoelectric conversion of the focused light received by the lenses 200*a*-200*n*. The capture devices 202*a*-202*n* may transform the bitstreams into pixel data, images and/or video frames. In some embodiments, the pixel data generated by the capture devices 202*a*-202*n* may be uncompressed and/or raw data generated in response to the focused light from the lenses 200*a*-200*n*. In some embodiments, the output of the capture devices 202*a*-202*n* may be digital video signals.

The communication device 204 may send and/or receive data to/from the camera system 104*i*. In some embodiments, the communication device 204 may be implemented as a wireless communications module. In some embodiments, the communication device 204 may be implemented as a satellite connection to a proprietary system. In one example, the communication device 204 may be a hard-wired data port (e.g., a USB port, a mini-USB port, a USB-C connector, HDMI port, an Ethernet port, a DisplayPort interface, a Lightning port, etc.). In another example, the communication device 204 may be a wireless data interface (e.g., Wi-Fi, Bluetooth, ZigBee, cellular, etc.).

The communication device 204 may be configured to receive the signal FEAT_SET from the network 102. The signal FEAT_SET may comprise a feature set that corresponds to the rental agreement 122. The feature set information may comprise instructions for the processor 130 for determining a breach of the rental agreement 122. Details of the feature set information may be described in association with FIG. 5.

The processor 130 may receive the signals PIXELD_A-PIXELD_N from the capture devices 202*a*-202*n* at the inputs 220*a*-220*n*. The processor 130 may send/receive a signal (e.g., DATA) to/from the memory 132 at the input/output 222. The processor 130 may send the signal STAT to the communication device 204 via the output port 224*a*. In some embodiments, the port 224*a* may be an input/output port and the processor 130 may receive one of the signals STAT_A-STAT_N from the other camera systems 104*a*-104*n*. The processor 130 may receive the signal FEAT_SET from the communication device 204 via the input port 224*b*. The processor 130 may receive the signal DIR_AUD from the microphones 206*a*-206*n* at the port 226. The processor 130 may send the signal DIR_AOUT to the speakers 208*a*-208*n* via the port 228. In an example, the processor 130 may be connected through a bi-directional interface (or connection) to the capture devices 202*a*-202*n*, the communication device 204, the memory 132, the microphones 206*a*-206*n* and/or the speakers 208*a*-208*n*. The processor 130 may store and/or retrieve data from the memory 132. The memory 132 may be configured to store computer readable/executable instructions (or firmware). The instructions, when executed by the processor 130, may perform a number of steps. The signal PIXELD_A-PIXELD_N may comprise raw pixel data providing a field of view captured by the lenses 200*a*-200*n*. The processor 130 may be configured to generate video frames from the pixel data PIXELD_A-PIXELD_N. The video frames generated by the processor 130 may be used internal to the processor 130. In some embodiments, the video frames may be communicated to the memory 132 for temporary storage. Generally, the video frames generated by the processor 130 may not leave the processor 130. The processor 130 may be configured to discard the video frames generated.

The processor 130 may be configured to make decisions based on analysis of the video frames generated from the signals PIXELD_A-PIXELD_N. The processor 130 may generate the signal STAT, the signal DATA, the signal DIR_AOUT and/or other signals (not shown). The signal STAT, the signal DATA and/or the signal DIR_AOUT may each be generated (in part) based on one or more decisions made and/or functions performed by the processor 130. The decisions made and/or functions performed by the processor 130 may be determined based on data received by the processor 130 at the inputs 220*a*-220*n* (e.g., the signals PIXELD_A-PIXELD_N), the input 222, the input 224*b*, the input 226 and/or other inputs.

The inputs 220*a*-220*n*, the input/output 222, the output 224*a*, the input 224*b*, the input 226, the output 220 and/or other inputs/outputs may implement an interface. The interface may be implemented to transfer data to/from the processor 130, the communication device 204, the capture devices 202*a*-202*n*, the memory 132, the microphones 206*a*-206*n*, the speakers 208*a*-208*n* and/or other components of the camera system 104*i*. In one example, the interface may be configured to receive (e.g., via the inputs 220*a*-220*n*) the pixel data signals PIXELD_A-PIXELD_N each from a respective one of the capture devices 202*a*-202*n*. In another example, the interface may be configured to receive (e.g., via the input 226) the directional audio DIR_AUD. In yet another example, the interface may be configured to transmit parameters and/or statistics about the video frames (e.g., the signal STAT) and/or the converted data determined based on the computer vision operations to the communication device 204. In still another example, the interface may be configured to receive the feature set information FEAT_SET (e.g., via the input port 224*b*) from the communication device 204. In another example, the interface may be configured to transmit directional audio output (e.g., the signal DIR_ROUT) to each of the speakers 208*a*-208*n*. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal STAT may be presented to the communication device 204. In some embodiments, the signal STAT may comprise parameters and/or statistics determined by the processor 130 about the video frames. The signal STAT may be generated in response to the computer vision operations performed. The video frames may be encoded, cropped, stitched and/or enhanced versions of the pixel data received from the signals PIXELD_A-PIXELD_N. In an example, the video frames may be a high resolution, digital, encoded, de-warped, stabilized, cropped, blended, stitched and/or rolling shutter effect corrected version of the signals PIXELD_A-PIXELD_N.

In some embodiments, the signal STAT may be a text message (e.g., a string of human readable characters). In some embodiments, the signal STAT may be a symbol that indicates an event or status (e.g., sound symbol indicating loud noise has been detected, an animal symbol indicating a pet has been detected, a symbol of a group of people to indicate that too many people have been detected at the location 50, etc.). The signal STAT may be generated based on video analytics (e.g., computer vision operations) performed by the processor 130 on the video frames generated from the pixel data PIXELD_A-PIXELD_N. The processor 130 may be configured to perform the computer vision operations to detect objects and/or events in the video frames and then convert the detected objects and/or events into statistics and/or parameters. The data determined by the computer vision operations may be converted to the human-readable format by the processor 130. The data from the computer vision operations that has been converted to the human-readable format may be communicated as the signal STAT.

In some embodiments, the signal STAT may be data generated by the processor 130 (e.g., video analysis results, audio/speech analysis results, etc.) that may be communicated to a cloud computing service in order to aggregate information and/or provide training data for machine learning (e.g., to improve object detection, to improve audio detection, etc.). The type of information communicated by the signal STAT may be varied according to the design criteria of a particular implementation.

The circuit 104*i* may implement a camera system. In some embodiments, the camera system 104*i* may be implemented as a drop-in solution (e.g., installed as one component). In an example, the camera system 104*i* may be a device that may be installed as an after-market product (e.g., a retro-fit for a drone, a retro-fit for a security system, etc.). In some embodiments, the camera system 104*i* may be a component of a security system. The number and/or types of signals and/or components implemented by the camera system 104*i* may be varied according to the design criteria of a particular implementation.

The video data of the targeted view captured in the field of view 152a-152b may be generated from the signals/bitstreams/data PIXELD_A-PIXELD_N. The capture devices 202a-202n may present the signals PIXELD_A-PIXELD_N to the inputs 220a-220n of the processor 130. The signals PIXELD_A-PIXELD_N may be used by the processor 130 to generate the video frames/video data. In some embodiments, the signals PIXELD_A-PIXELD_N may be video streams captured by the capture devices 202a-202n. In some embodiments, the capture devices 202a-202n may be implemented in the camera system 104i. In some embodiments, the capture devices 202a-202n may be configured to add to existing functionality to the camera system 104i.

Each of the capture devices 202a-202n may comprise a block (or circuit) 230, a block (or circuit) 232, and/or a block (or circuit) 234. The circuit 230 may implement a camera sensor (e.g., a complementary metal-oxide-semiconductor (CMOS) sensor). The circuit 232 may implement a camera processor/logic. The circuit 234 may implement a memory buffer. As a representative example, the capture device 202a is shown comprising the sensor 230a, the logic block 232a and the buffer 234a. Similarly, the capture devices 202b-202n may comprise the camera sensors 230b-230n, the logic blocks 232b-232n and the buffers 234b-234n. The sensors 230a-230n may each be configured to receive light from the corresponding one of the lenses 200a-200n and transform the light into digital data (e.g., the bitstreams).

In one example, the sensor 230a of the capture device 202a may receive light from the lens 200a. The camera sensor 230a of the capture device 202a may perform a photoelectric conversion of the light from the lens 200a. In some embodiments, the sensor 230a may be an oversampled binary image sensor. The logic 232a may transform the bitstream into a human-legible content (e.g., pixel data and/or video data). For example, the logic 232a may receive pure (e.g., raw) data from the camera sensor 230a and generate pixel data based on the raw data (e.g., the bitstream). The memory buffer 234a may store the raw data and/or the processed bitstream. For example, the frame memory and/or buffer 234a may store (e.g., provide temporary storage and/or cache) the pixel data and/or one or more of the video frames (e.g., the video signal).

The microphones 206a-206n may be configured to capture incoming audio and/or provide directional information about the incoming audio. Each of the microphones 206a-206n may receive a respective signal (e.g., AIN_A-AIN_N). The signals AIN_A-AIN_N may be audio signals from the environment 50 near the camera system 104i. For example, the signals AIN_A-AIN_N may be ambient noise in the environment 50 and/or the audio 164a-164n from the subjects 70a-70n. The microphones 206a-206n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 206a-206n may provide the signal DIR_AUD to the interface 226. The camera system 104i may comprise the interface 226 configured to receive data (e.g., the signal DIR_AUD) from one or more of the microphones 206a-206n. In one example, data from the signal DIR_AUD presented to the interface 226 may be used by the processor 130 to determine the location of the source of the audio 164a-164n. In another example, the microphones 206a-206n may be configured to determine the location of the audio 164a-164n and present the location to the interface 226 as the signal DIR_AUD.

The number of microphones 206a-206n may be varied according to the design criteria of a particular implementation. The number of microphones 206a-206n may be selected to provide sufficient directional information about the incoming audio (e.g., the number of microphones 206a-206n implemented may be varied based on the accuracy and/or resolution of directional information acquired). In an example, 2 to 6 of the microphones 206a-206n may be implemented. In some embodiments, an audio processing component may be implemented with the microphones 206a-206n to process and/or encode the incoming audio signals AIN_A-AIN_N. In some embodiments, the processor 130 may be configured with on-chip audio processing to encode the incoming audio signals AIN_A-AIN_N. The microphones 206a-206n may capture audio of the environment 50. The camera system 104i may be configured to synchronize the audio captured with the images captured by the capture devices 202a-202n.

The processor 130 may be configured to execute computer readable code and/or process information. The processor 130 may be configured to receive input and/or present output to the memory 132. The processor 130 may be configured to present and/or receive other signals (not shown). The number and/or types of inputs and/or outputs of the processor 130 may be varied according to the design criteria of a particular implementation.

The processor 130 may receive the signals PIXELD_A-PIXELD_N, the signal DIR AUDIO and/or the signal DATA. The processor 130 may make a decision based on data received at the inputs 220a-220n, the input 222, the input 224b, the input 226 and/or other input. For example, other inputs may comprise external signals generated in response to user input, external signals generated by the microphones 206a-206n and/or internally generated signals such as signals generated by the processor 130 in response to analysis of the video frames and/or objects detected in the video frames. The processor 130 may adjust the video data (e.g., crop, digitally move, physically move the camera sensors 230a-230n, etc.) of the video frames. The processor 130 may generate the signal STAT and/or the signal DIR_AOUT in response to data received by the inputs 220a-220n, the input 222, the input 224b, the input 226 and/or the decisions made in response to the data received by the inputs 220a-220n, the input 222, the input 224b and/or the input 226.

The signal STAT and/or the signal DIR_AOUT may be generated to provide an output in response to the captured video frames and the video analytics performed by the processor 130. For example, the video analytics may be performed by the processor 130 in real-time and/or near real-time (e.g., with minimal delay).

The cropping, downscaling, blending, stabilization, packetization, encoding, compression and/or conversion performed by the processor 130 may be varied according to the design criteria of a particular implementation. For example, the video frames generated by the processor 130 may be a processed version of the signals PIXELD_A-PIXELD_N configured to enable detection of the objects 160a-160n and/or determination of the characteristics 162. In some embodiments, the video data may be encoded at a high bitrate. For example, the signal may be generated using a lossless compression and/or with a low amount of lossiness.

In some embodiments, the video frames may be some view (or derivative of some view) captured by the capture devices 202a-202n. For example, the video frames may comprise a portion of the panoramic video captured by the capture devices 202a-202n. In another example, the video frames may comprise a region of interest selected and/or cropped from the panoramic video frame by the processor 130 (e.g., upscaled, oversampled and/or digitally zoomed) to enable a high precision of object detection. In some embodiments, the video frames may provide a series of cropped and/or enhanced panoramic video frames that improve upon the view from the perspective of the camera system 104i (e.g., provides night vision, provides High Dynamic Range (HDR) imaging, provides more viewing area, highlights detected objects, provides additional data such as a numerical distance to detected objects, etc.) to enable the processor 130 to see the location 50 better than a person would be capable of with human vision.

The memory 132 may store data. The memory 132 may be implemented as a cache, flash memory, DRAM memory, etc. The type and/or size of the memory 132 may be varied according to the design criteria of a particular implementation. The data stored in the memory 132 may correspond to a video file, user profiles, user permissions, the rental agreement 122, the terms and/or entries of the rental agreement 122, contact information for the renter/landlord, etc.

The lenses 200a-200n (e.g., camera lenses) may be directed to provide a panoramic view from the camera system 104i. The lenses 200a-200n may be aimed to capture environmental data (e.g., light). The lens 200a-200n may be configured to capture and/or focus the light for the capture devices 202a-202n. Generally, the camera sensors 230a-230n may be located behind each of the respective lenses 200a-200n. Based on the captured light from the lenses 200a-200n, the capture devices 202a-202n may generate a bitstream and/or raw pixel data.

Embodiments of the processor 130 may perform video stitching operations on the signals PIXELD_A-PIXELD_N. In one example, each of the pixel data signals PIXELD_A-PIXELD_N may provide a portion of a panoramic view and the processor 130 may crop, blend, synchronize and/or align the pixel data from the signals PIXELD_A-PIXELD_N to generate the panoramic video frames. In some embodiments, the processor 130 may be configured to perform electronic image stabilization (EIS). The processor 130 may perform de-warping on the video frames. The processor 130 may perform intelligent video analytics on the de-warped video frames. The processor 130 discard the video frames after the video analytics and/or computer vision has been performed.

The encoded video frames may be processed locally and discarded. In one example, the encoded, panoramic video may be stored locally by the memory 132 to enable the processor 130 to facilitate the computer vision analysis and then discarded. The processor 130 may discard the video frames as soon as possible after the video frames are no longer needed. Generally, after the processor 130 determines the parameters and/or statistics 170a-170n, the video frames are no longer needed.

The processor 130 may receive an input to generate the video frames (e.g., the signals PIXELD_A-PIXELD_N) from the CMOS sensor(s) 230a-230n. The pixel data signals PIXELD_A-PIXELD_N may be enhanced by the processor 130 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view 152a-152b captured by the camera system 104i may be used to generate panoramic video such as a spherical video, a hemispherical video, a 360 degree video, a wide angle video, a video having less than a 360 field of view, etc.

Panoramic videos may comprise a view of the environment near the camera system 104i. In one example, the entire field of view 152a-152b of the panoramic video may be captured at generally the same time (e.g., each portion of the panoramic video represents the view from the camera system 104i at one particular moment in time). In some embodiments (e.g., when the camera system 104i implements a rolling shutter sensor), a small amount of time difference may be present between some portions of the panoramic video. Generally, each video frame of the panoramic video comprises one exposure of the sensor (or the multiple sensors 230a-230n) capturing the environment near the camera system 104i.

In some embodiments, the field of view 152a-152b may provide coverage for a full 360 degree field of view. In some embodiments, less than a 360 degree view may be captured by the camera system 104i (e.g., a 270 degree field of view, a 180 degree field of view, etc.). In some embodiments, the panoramic video may comprise a spherical field of view (e.g., capture video above and below the camera system 104i). For example, the camera system 104i may be mounted on a ceiling and capture a spherical field of view of the area below the camera system 104i. In some embodiments, the panoramic video may comprise a field of view that is less than a spherical field of view (e.g., the camera system 104i may be configured to capture the ground below and the areas to the sides of the camera system 104i but nothing directly above). The implementation of the camera system 104i and/or the captured field of view 152a-152b may be varied according to the design criteria of a particular implementation.

In embodiments implementing multiple lenses, each of the lenses 200a-200n may be directed towards one particular direction to provide coverage for a full 360 degree field of view. In embodiments implementing a single wide angle lens (e.g., the lens 200a), the lens 200a may be located to provide coverage for the full 360 degree field of view (e.g., on the bottom of the camera system 104i in a ceiling mounted embodiment, on the bottom of a drone camera, etc.). In some embodiments, less than a 360 degree view may be captured by the lenses 200a-200n (e.g., a 270 degree field of view, a 180 degree field of view, etc.). In some embodiments, the lenses 200a-200n may move (e.g., the direction of the capture devices may be controllable). In some embodiments, one or more of the lenses 200a-200n may be configured to implement an optical zoom (e.g., the lenses 200a-200n may zoom in/out independent of each other).

In some embodiments, the camera system 104i may be implemented as a system on chip (SoC). For example, the camera system 104i may be implemented as a printed circuit board comprising one or more components (e.g., the capture devices 202a-202n, the processor 130, the communication device 204, the memory 132, etc.). The camera system 104i may be configured to perform intelligent video analysis on the video frames of the de-warped, panoramic video. The camera system 104i may be configured to crop and/or enhance the panoramic video.

In some embodiments, the processor 130 may be configured to perform sensor fusion operations. The sensor fusion operations performed by the processor 130 may be configured to analyze information from multiple sources (e.g., the capture devices 202a-202n and the microphones 206a-206n). By analyzing various data from disparate sources, the sensor fusion operations may be capable of making inferences about the data that may not be possible from one of the data sources alone. For example, the sensor fusion operations implemented by the processor 130 may analyze video data (e.g., mouth movements of the subjects 70a-70n) as well as the speech patterns from the directional audio DIR_AUD. The disparate sources may be used to develop a model of a scenario to support decision making. For example, the processor 130 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 130 may implement convolutional neural network capabilities. The convolutional neural network capabilities may implement computer vision using deep learning techniques. The convolutional neural network capabilities may be configured to implement pattern and/or image recognition using a training process through multiple layers of feature-detection.

The signal DIR_AOUT may be an audio output. For example, the processor 130 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message informing the people 70a-70n that the rental agreement 122 has been breached. In some embodiments, the signal DIR_AOUT may not be generated until an event has been detected by the processor 130 using the computer vision operations.

The signal DIR_AOUT may comprise directional and/or positional audio output information for the speakers 208a-208n. The speakers 208a-208n may receive the signal DIR_AOUT, process the directional and/or positional information and determine which speakers and/or which channels will play back particular audio portions of the signal DIR_AOUT. The speakers 208a-208n may generate the signals AOUT_A-AOUT_N in response to the signal DIR_AOUT. The signals AOUT_A-AOUT_N may be the audio message played to the people 70a-70n. For example, the speakers 208a-208n may emit a pre-recorded message in response to a detected event. The signal DIR_AOUT may be a signal generated in a format that provides directional information for the signals AOUT_A-AOUT_N.

The number of speakers 208a-208n may be varied according to the design criteria of a particular implementation. The number of speakers 208a-208n may be selected to provide sufficient directional channels for the outgoing audio (e.g., the number of speakers 208a-208n implemented may be varied based on the accuracy and/or resolution of directional audio output). In an example, 1 to 6 of the speakers 208a-208n may be implemented. In some embodiments, an audio processing component may be implemented by the speakers 208a-208n to process and/or decode the output audio signals DIR_AOUT. In some embodiments, the processor 130 may be configured with on-chip audio processing. In some embodiments, the signal DIR_AOUT may playback audio received from the remote devices 52a-52n in order to implement a 2-way real-time audio communication.

The video pipeline of the processor 130 may be configured to perform de-warping, cropping, enhancements, rolling shutter corrections, stabilizing, downscaling, packetizing, compression, conversion, blending, synchronizing and/or other video operations. The architecture of the video pipeline of the processor 130 may enable the video operations to be performed on high resolution video and/or high bitrate video data in real-time and/or near real-time. The video pipeline of the processor 130 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding. Since the video frames generated by the processor 130 may be discarded after the data is extracted, encoding operations of the processor 130 may not be necessary. For example, while the processor 130 may be capable of performing the encoding operations, in the implementation of the camera systems 104a-104n, the encoding may not need to be performed. The type of video operations and/or the type of video data operated on by the processor 130 may be varied according to the design criteria of a particular implementation.

The sensors 230a-230n may each implement a high-resolution sensor. Using the high resolution sensors 230a-230n, the processor 130 may combine over-sampling of the image sensors 230a-230n with digital zooming within a cropped area. The over-sampling and digital zooming may each be one of the video operations performed by the processor 130. The over-sampling and digital zooming may be implemented to deliver higher resolution images within the total size constraints of a cropped area.

In some embodiments, one or more of the lenses 200a-200n may implement a fisheye lens. One of the video operations implemented by the processor 130 may be a dewarping operation. The processor 130 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 130 may be configured to crop (e.g., trim to) a region of interest from a full video frame (e.g., generate the region of interest video frames). The processor 130 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 130 may update the selected region of interest coordinates and dynamically update the cropped section (e.g., the directional microphones 106a-106n may dynamically update the location based on the directional audio captured). The cropped section may correspond to the area of interest selected. As the area of interest changes, the cropped portion may change. For example, the selected coordinates for the area of interest may change from frame to frame, and the processor 130 may be configured to crop the selected region in each frame.

The processor 130 may be configured to over-sample the image sensors 230a-230n. The over-sampling of the image sensors 230a-230n may result in a higher resolution image.

The processor 130 may be configured to digitally zoom into an area of a video frame. For example, the processor 130 may digitally zoom into the cropped area of interest. For example, the processor 130 may establish the area of interest based on the directional audio, crop the area of interest, and then digitally zoom into the cropped region of interest video frame.

The dewarping operations performed by the processor 130 may adjust the visual content of the video data. The adjustments performed by the processor 130 may cause the visual content to appear natural (e.g., appear as seen by a person viewing the location corresponding to the field of view of the capture devices 202a-202n). In an example, the dewarping may alter the video data to generate a rectilinear video frame (e.g., correct artifacts caused by the lens characteristics of the lenses 200a-200n). The dewarping operations may be implemented to correct the distortion caused by the lenses 200a-200n. The adjusted visual content may be generated to enable more accurate and/or reliable object detection.

Various features (e.g., dewarping, digitally zooming, cropping, etc.) may be implemented in the processor 130 as hardware modules. Implementing hardware modules may increase the video processing speed of the processor 130 (e.g., faster than a software implementation). The hardware implementation may enable the video to be processed while reducing an amount of delay. The hardware components used may be varied according to the design criteria of a particular implementation.

The processor 130 is shown comprising a number of blocks (or circuits) 240a-240n. The blocks 240a-240n may implement various hardware modules implemented by the processor 130. The hardware modules 240a-240n may be configured to provide various hardware components to implement a video processing pipeline. The circuits 240a-240n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 130 may not necessarily utilize all the features of the hardware modules 240a-240n. The features and/or functionality of the hardware modules 240a-240n may be varied according to the design criteria of a particular implementation. Details of the hardware modules 240a-240n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 240a-240n may be implemented as dedicated hardware modules. Implementing various functionality of the processor 130 using the dedicated hardware modules 240a-240n may enable the processor 130 to be highly optimized and/or customized to limit power consumption, reduce heat generation and/or increase processing speed compared to software implementations. The hardware modules 240a-240n may be customizable and/or programmable to implement multiple types of operations. Implementing the dedicated hardware modules 240a-240n may enable the hardware used to perform each type of calculation to be optimized for speed and/or efficiency. For example, the hardware modules 240a-240n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 240a-240n (e.g., 240a) may implement a scheduler circuit. The scheduler circuit 240a may be configured to store a directed acyclic graph (DAG). In an example, the scheduler circuit 240a may be configured to generate and store the directed acyclic graph in response to the feature set information received in the signal FEAT_SET. The directed acyclic graph may define the video operations to perform for extracting the data 170a-170n from the video frames. For example, the directed acyclic graph may define various mathematical weighting to apply when performing computer vision operations to classify various groups of pixels as particular objects.

The scheduler circuit 240a may be configured to parse the acyclic graph to generate various operators. The operators may be scheduled by the scheduler circuit 240a in one or more of the other hardware modules 240a-240n. For example, one or more of the hardware modules 240a-240n may implement hardware engines configured to perform specific tasks (e.g., hardware engines designed to perform particular mathematical operations that are repeatedly used to perform computer vision operations). The scheduler circuit 240a may schedule the operators based on when the operators may be ready to be processed by the hardware engines 240a-240n.

The scheduler circuit 240a may time multiplex the tasks to the hardware modules 240a-240n based on the availability of the hardware modules 240a-240n to perform the work. The scheduler circuit 240a may parse the directed acyclic graph into one or more data flows. Each data flow may include one or more operators. Once the directed acyclic graph is parsed, the scheduler circuit 240a may allocate the data flows/operators to the hardware engines 240a-240n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 240a-240n (e.g., 240b) may implement a convolutional neural network (CNN) module. The CNN module 240b may be configured to perform the computer vision operations on the video frames. The CNN module 240b may be configured to implement recognition of the objects 160a-160n through multiple layers of feature detection. The CNN module 240b may be configured to calculate descriptors based on the feature detection performed. The descriptors may enable the processor 130 to determine a likelihood that pixels of the video frames correspond to particular objects (e.g., the people 70a-70n, pets, items, etc.).

The CNN module 240b may be configured to implement convolutional neural network capabilities. The CNN module 240b may be configured to implement computer vision using deep learning techniques. The CNN module 240b may be configured to implement pattern and/or image recognition using a training process through multiple layers of feature-detection. The CNN module 240b may be configured to conduct inferences against a machine learning model.

The CNN module 240b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 240b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 240b using dedicated hardware circuitry may enable calculating descriptor matching distances in real time.

The CNN module 240b may be a dedicated hardware module configured to perform feature detection of the video frames. The features detected by the CNN module 240b may be used to calculate descriptors. The CNN module 240b may determine a likelihood that pixels in the video frames belong to a particular object and/or objects in response to the descriptors. For example, using the descriptors, the CNN module 240b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 240b as a dedicated hardware module of the processor 130 may enable the camera system 104i to perform the computer vision operations locally (e.g., on-chip) without relying on processing capabilities of a remote device (e.g., communicating data to a cloud computing service).

The computer vision operations performed by the CNN module 240b may be configured to perform the feature detection on the video frames in order to generate the descriptors. The CNN module 240b may perform the object detection to determine regions of the video frame that have a high likelihood of matching the particular object. In one example, the types of object to match against (e.g., reference objects) may be customized using an open operand stack (enabling programmability of the processor 130 to implement various directed acyclic graphs each providing instructions for performing various types of object detection). The CNN module 240b may be configured to perform local masking to the region with the high likelihood of matching the particular object(s) to detect the object.

In some embodiments, the CNN module 240b may determine the position (e.g., 3D coordinates and/or location coordinates) of various features (e.g., the characteristics 162) of the detected objects 160a-160n. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 200a-200n may represent one coordinate (e.g., a location coordinate on a third axis) for a depth location of the body part in 3D space. Using the location of various body parts in 3D space, the processor 130 may determine body position, and/or body characteristics of the people 70a-70n.

The CNN module 240b may be pre-trained (e.g., configured to perform computer vision to detect objects based on the training data received to train the CNN module 240b). For example, the results of training data (e.g., a machine learning model) may be pre-programmed and/or loaded into the processor 130. The CNN module 240b may conduct inferences against the machine learning model (e.g., to perform object detection). The training may comprise determining weight values for each of the layers. For example, weight values may be determined for each of the layers for feature extraction (e.g., a convolutional layer) and/or for classification (e.g., a fully connected layer). The weight values learned by the CNN module 240b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 240b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels, the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 240b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 240b to extract features from the training data may be varied according to the design criteria of a particular implementation.

Each of the hardware modules 240a-240n may implement a processing resource (or hardware resource or hardware engine). The hardware engines 240a-240n may be operational to perform specific processing tasks. In some configurations, the hardware engines 240a-240n may operate in parallel and independent of each other. In other configurations, the hardware engines 240a-240n may operate collectively among each other to perform allocated tasks. One or more of the hardware engines 240a-240n may be homogenous processing resources (all circuits 240a-240n may have the same capabilities) or heterogeneous processing resources (two or more circuits 240a-240n may have different capabilities).

Figure 5:
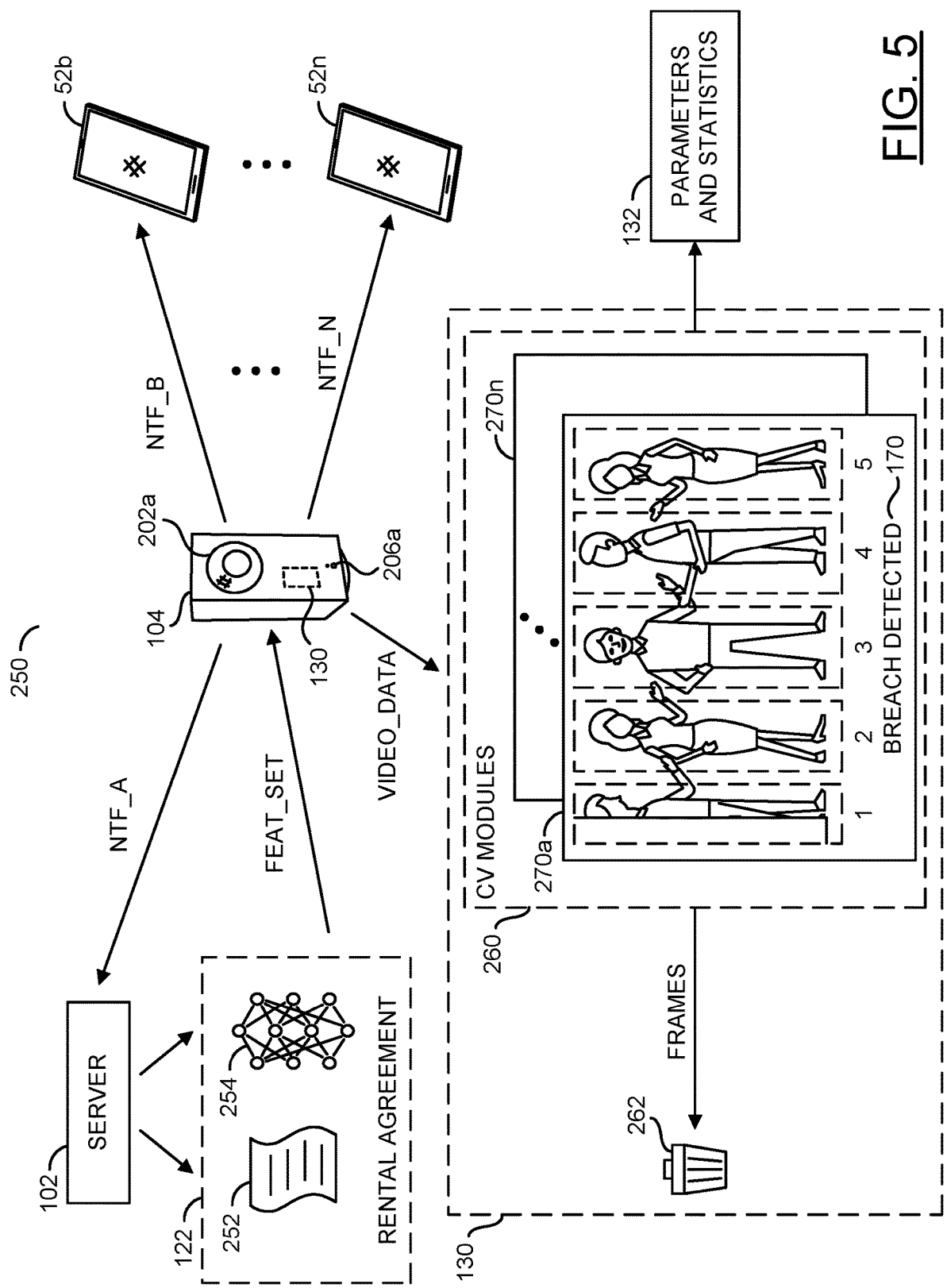
FIG. 5 is a diagram illustrating detecting a breach of a rental agreement.

Referring to FIG. 5, a diagram illustrating detecting a breach of a rental property agreement is shown. An example scenario 250 is shown. The example scenario 250 may comprise the server 102, remote devices 52b-52n and/or the camera system 104. The capture device 202a and the microphone 206a are shown on the camera system 104. The processor 130 is shown within the camera system 104. The example scenario 250 may further comprise a visualization of the memory 132, the processor 130 and/or a rental agreement 122.

The server 102 may be configured to generate the rental agreement 122. The rental agreement 122 may comprise a text (e.g., human-readable) version 252 and a machine readable version 254. The text version 252 of the rental agreement 122 may be used to enable both the property owner and the renter to view and understand the terms and conditions of the rental agreement 122. The machine readable version 254 may comprise a neural network and/or computer readable instructions that define the terms and conditions of the rental agreement 122 that may be readable by the processor 130 of the camera system 104 in order to generate the detection parameters. For example, the machine readable version 254 may be generated according to an API (e.g., a format) compatible with the camera system 104. The machine readable version 254 of the rental agreement 122 may comprise one or more neural networks (e.g., each neural network may correspond to various types of objects to detect based on the terms and conditions of the rental agreement 122). The text version 252 and/or the machine readable version 254 of the rental agreement may be provided to the camera system 104 in the signal FEAT_SET.

The text version 252 and/or the machine readable version 254 of the rental agreement 122 may define what may be considered a breach of the rental agreement 122 at the location 50. The renter and the landlord may refer to the text version 252 of the rental agreement 122 to determine what is acceptable usage of the location 50 and what may not be acceptable usage of the location 50. The camera system 104 may analyze the video frames based on the machine readable version 254. The machine readable version 254 may correspond to the text version 252. In an example, if one of the terms of the rental agreement is that only four people are allowed at the location 50, then the text version 252 may comprise an entry (e.g., "Number of guests allowed: 4") and the machine readable version 254 may comprise instructions for the processor 130 to search the video frames to determine the number of people 70a-70n detected and determine whether more than four guests have been detected. The type of data and/or the format of the text version 252 and/or the machine readable version 254 may be varied according to the design criteria of a particular implementation.

The camera system 104 is shown receiving the signal FEAT_SET based on the rental agreement 122 from the server 102. The camera system 104 is shown generating the signals NTF_A-NTF_N. In the example shown, the signal NTF_A may be communicated to the server 102 and the signals NTF_B-NTF_N may be communicated to the remote devices 52b-52n. In some embodiments, the camera system 104 may communicate the signal STAT (as shown in association with FIG. 4) to the server 102 and the server 102 may communicate the signal(s) NTF_A-NTF_N to the remote devices 52a-52n. In an example, the server 102 may securely store the contact information for the owners of the smartphones 52a-52n (e.g., the renters and/or the landlords).

The camera system 104 may receive the signal FEAT_SET from the server 102. The processor 130 may convert the feature set information in the signal FEAT_SET to detection parameters. The camera system 104 may capture pixel data of the rental property location 50 and generate the video frames from the pixel data PIXELD_A-PIXELD_N. The camera system 104 is shown generating a signal (e.g., VIDEO_DATA). The signal VIDEO_DATA may comprise the video frames generated by the processor 130. The signal VIDEO_DATA may comprise data used internally by the processor 130. In an example, the signal VIDEO_DATA may never be communicated from the camera system 104.

In the example scenario 250, the video frames VIDEO_DATA are shown being used by the processor 130. In an example, the video frames may be operated on using a video processing pipeline implemented by processor 130 of the camera system 104. The processor 130 may comprise a block (or circuit) 260 and/or a block (or circuit) 262. The block 260 may implement computer vision modules. The block 262 may represent a discard location of the processor 130. The computer vision modules 260 and/or the discard location 262 may comprise components of the video processing pipeline of the processor 130. The processor 130 may comprise other components (not shown). The number, type and/or arrangement of the components of the processor 130 may be varied according to the design criteria of a particular implementation.

Video frames 270a-270n are shown being operated on by the computer vision modules 260. The video frames 270a-270n may be the data in the signal VIDEO FRAMES. The video frames 270a-270n may be generated by the processor 130 in response to the pixel data PIXELD_A-PIXELD_N received from the capture devices 202a-202n. In the example shown, the video frame 270a may generally correspond to the location 50 shown in association with FIG. 2. The computer vision modules 260 of the processor 130 may perform the video operations (e.g., the analytics using computer vision) locally (e.g., the video frames 270a-270n may not leave the apparatus 104).

The feature set information in the signal FEAT_SET may comprise instructions that may be compatible with the computer vision modules 260 of the processor 130. In an example, the signal FEAT_SET may be configured to provide the machine readable version 254 of the rental agreement 122 in a format that may be compatible with the camera system 104. The feature set information may provide the parameters that the computer vision modules 260 may use to analyze the video frames 270a-270n. The parameters may define the criteria that the computer vision modules 260 use to determine whether there has been a breach of the rental agreement 122. The signal FEAT_SET may comprise parameters for video (e.g., pet detection, types of pets allowed, behavior allowed, number of guests allowed, locations of particular items, etc.). The signal FEAT_SET may further comprise parameters for audio (e.g., a maximum audio level, frequencies allowed, times of day that particular audio levels are allowed, etc.). Generally, the computer vision modules 260 may compare the characteristics 162 detected in the video frames 270a-270n with the rental agreement 122 by using the parameters defined by the feature set information. The information provided in the feature set information may be varied according to the design criteria of a particular implementation.

Part of the video processing pipeline of the processor 130 may comprise the computer vision modules 260. The computer vision modules 260 may be configured to perform object detection, classify objects, and/or extract data from the video frames 270a-270n. The computer vision modules 260 may be configured to detect the objects 160a-160n in the video frames 270a-270n and/or generate the extracted data 170a-170n about the detected objects 160a-160n based on the characteristics 162 of the objects 160a-160n. In the example diagram shown, the video frames 270a-270n (e.g., the signal VIDEO_DATA) may be presented to computer vision modules 260 of the video processing pipeline. The processor 130 may compare the data extracted with the detection parameters (e.g., the feature set information) of the signal FEAT_SET according to the machine readable version 254 of the rental agreement 122 to determine whether or not there has been a breach of the conditions of the rental agreement 122.

After the video frames 270a-270n have been analyzed by the computer vision operations performed by the processor 130, the video frames 270a-270n may be discarded. In the example shown, the garbage can 262 may represent the processor 130 implementing a discarding method for the camera system 104. The video frames 270a-270n may be passed from the video processing pipeline to the deletion function 262 to make the video frames 270a-270n unavailable (e.g., flushed from cache, flagged to be overwritten, redirected to /dev/null, etc.). To ensure that privacy of the renter (or other people) is protected, no images or audio may ever leave the camera system 104. The video data and/or audio data may be eliminated after processing and may be unavailable for communication beyond the camera system 104 (e.g., not be stored to long-term memory, not communicated to another device, etc.).

In the example shown, the video processing pipeline of the processor 130 may detect a breach in the terms of the rental agreement 122 (e.g., too many people have been detected at the rental property 50). For example, the feature set may provide instructions for counting the number of people in the video frames 270a-270n, and the computer vision modules 260 may detect a greater number of visitors (e.g., 5) than the maximum allowable number of visitors in the rental agreement 122 (e.g., 3). The computer vision modules 260 may extract the data 170 that indicates the number of people in the video frames 270a-270n (and additional data according to the other detection parameters). In the example shown, the extracted data 170 may indicate a breach of the rental agreement 122.

Data that does not correspond to the detection parameters may be ignored. In one example, if pets are not part of the rental agreement 122 (e.g., the rental agreement does not restrict having pets at the location 50), then the computer vision modules 260 may not search for pets in video frames 270a-270n. In another example, if pets are not part of the rental agreement 122, the computer vision modules 260 may still perform a search for pets as part of the general computer vision operations performed, but the information about the pets may not be included as part of the extracted data 170 (e.g., any information not defined by the rental agreement may be discarded along with the video frames 270a-270n).

The extracted data 170 may be stored by the camera system 104, but the video frames and/or the audio that corresponds to the data extracted may be deleted. The extracted data 170 is shown stored as the parameters and statistics in the memory 132. The extracted data 170 (e.g., the parameters and statistics) may be used by the processor 130 to determine whether there has been a breach of the rental agreement 122.

When the computer vision modules 260 detect that the extracted data 170 matches the detection parameters of the machine readable version 254, the breach of the rental agreement 122 may be detected. In an example, the feature set signal FEAT_SET may provide instructions to detect whether there are more than three visitors at the rental property 50 and the camera system 104 may use the detection parameters to monitor whether more than three visitors have been detected in the video frames 270a-270n. In some embodiments, the computer vision modules 260 and/or audio analytics modules may determine when the breach of the rental agreement 122 has been detected. In some embodiments, the processor 130 may analyze the parameters and statistics 170 stored in the memory 132 after the video frames 270a-270n have been discarded to determine whether a breach of the rental agreement 122 has been detected.

In response to the breach of the rental agreement 122, the camera system 104 may generate a notification. In the example shown, multiple notifications NTF_A-NTF_N may be generated. In some embodiments, the camera system 104 may not receive contact information about the renter or the property owner. The camera system 104 may provide a notification signal (e.g., NTF_A) to the server 102, and then the server 102 may contact the property owner and/or the renter (e.g., the server 102 may store the contact information of the users). In some embodiments, the signal FEAT_SET may comprise the contact information of the users and the camera system 104 may use the communications device 204 to contact the property owner and/or the renter. For example, a signal (e.g., NTF_B) may be communicated to the smartphone (or other computing device) 52b of the property owner and a signal (e.g., NTF_N) may be communicated to the smartphones (or other computer devices) 52n of the renter. The camera system 104 may be configured to provide the notification to other parties as defined in the rental agreement 122. The notification may indicate that there has been a breach of the terms of the rental agreement 122. The notification may not comprise the video and/or audio associated with the breach of the rental agreement (e.g., the video and/or audio may no longer be available).

In some embodiments, the camera system 104 may provide the signal STAT to the server 102. The signal STAT may comprise the extracted data 170. The server 102 may use the extracted data 170 (e.g., the parameters and statistics) to determine whether there has been a breach of the rental agreement 122 and/or generate the notification signals NTF_A-NTF_N.

Figure 6:
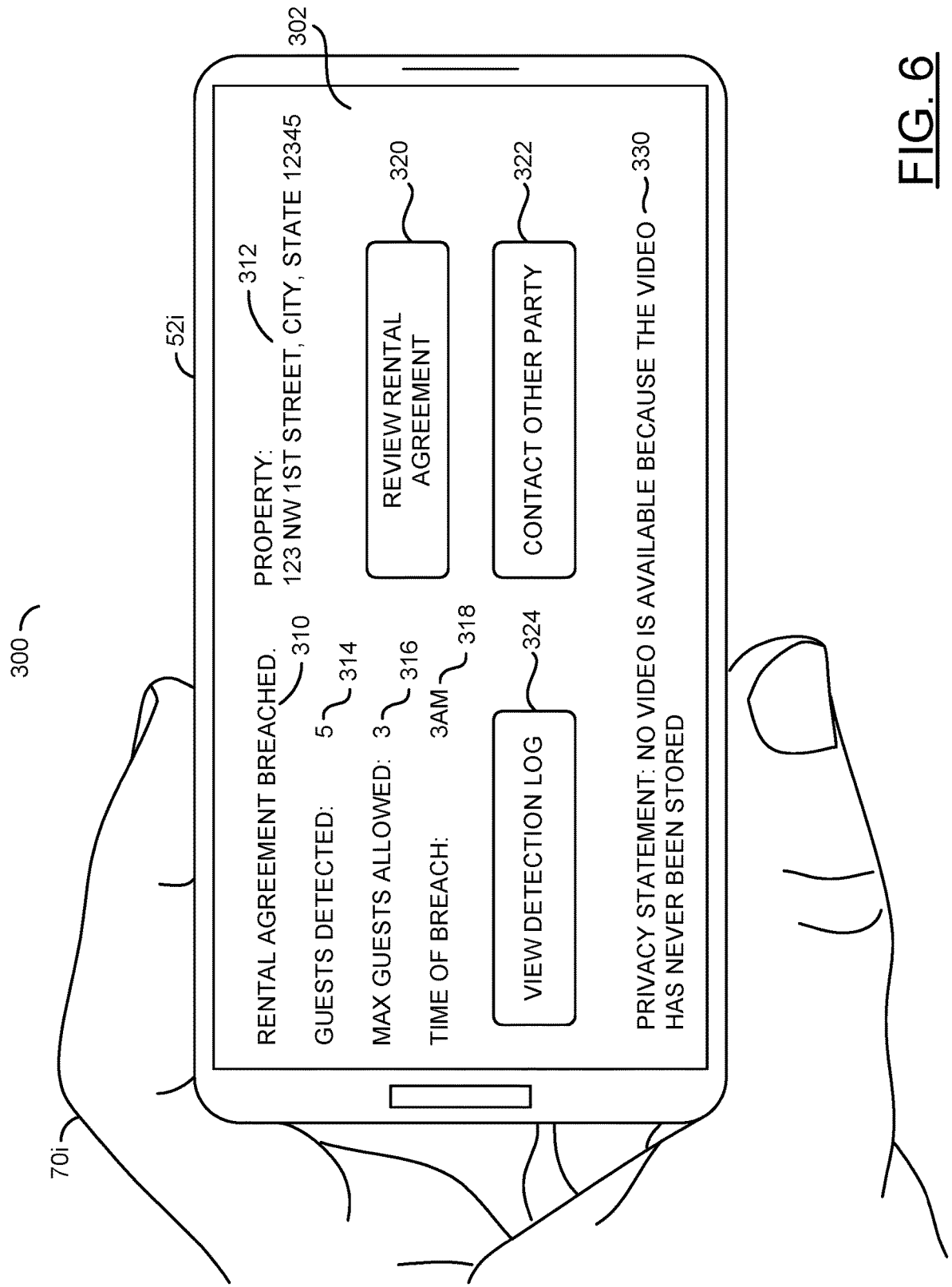
FIG. 6 is a diagram illustrating an example notification for a breach of a rental agreement.

Referring to FIG. 6, a diagram illustrating an example notification for a breach of a rental agreement is shown. An example scenario 400 is shown. The example scenario 400 may comprise a hand 70*i* holding the smartphone 52*i*. The hand 70*i* may be a hand of the renter or a hand of the property owner. The smartphone 52*i* is shown displaying the companion app 302. The companion app 302 may be configured to display the notification of a breach of the terms of the rental agreement 122.

The notification shown by the companion app 302 may be generated in response to one of the notification signals NTF_A-NTF_N. In the example shown, the notification may be displayed by the companion app 302. However, the notification may be communicated by other means. In one example, the notification may be provided by a text message (e.g., SMS). In another example, the notification may be provided by a phone call (e.g., an automated voice message). In yet another example, the notification may be provided via email. The format of the notification may be varied according to the design criteria of a particular implementation.

An example notification is shown displayed on the smartphone 52*i*. The notification may comprise a message 310. The message 310 may indicate that a breach of the rental agreement 122 has been detected. Additional information about the breach of the rental agreement 122 may be displayed. A property address 312 is shown as part of the notification. The property address 312 may indicate the address of the rental property that corresponds to the detected breach. In an example, the property owner may rent out multiple properties and the property address 312 may provide clarity about which property has the detected breach of the rental property agreement 122.

In the example shown, the breach to the rental agreement 122 may be the number of guests detected by the camera system 104. The notification may provide details 314-318 about the breach of the rental agreement 122. The details 314-318 may comprise the detection 314, the condition 316 and/or a timestamp 318 of the breach detected based on the statistics and parameters 170*a*-170*n* detected by the processor 130.

For the example of a breach detected for the maximum number of allowable guests, the detection 314 may indicate the number of guests detected by the camera system 104. In the example shown (as shown in association with FIG. 2), the number of detected guests 314 may be five. The corresponding condition 316 may be the maximum number of allowed guests according to the rental agreement 122. In the example shown, the maximum number of guests 316 according to the rental agreement 122 may be three. The timestamp 318 may comprise the time that the breach was detected. In the example shown, the detection 314 of five guests may have been detected by the camera system 104 at three in the morning. Other information may be provided based on the extracted data 170*a*-170*n* that corresponds to the breach of the rental agreement 122. For example, if a different breach of the agreement 122 was detected (e.g., audio level), the details 314-318 may comprise alternate data types (e.g., maximum sound level of the rental agreement 122, the sound level detected, etc.).

A button 320, a button 322 and a button 324 are shown as part of the example notification. The button 320 may enable the end user to access the text version 252 of the rental agreement 122. For example, the end user may want to review the terms of the rental agreement 122.

The button 322 may enable the end user to contact the other party in the rental agreement 122. The contact other party button 322 may enable the property owner and the renter to communicate. For example, if the notification is provided to the property owner, then the property owner may contact the renter to inform the renter that the extra guests should leave and if they do not leave then the authorities will be contacted. In another example, if the notification is provided to the renter, then the renter may contact the property owner to inform them that the extra guests have left. The contact other party button 322 may be implemented to enable the parties to remedy the detected breach.

The button 324 may enable the users to view a data transparency log. The data transparency log may provide access to all the data stored by the servers 102*a*-102*n* and/or the camera systems 104*a*-104*n* about the users. The users may access the data transparency log to ensure the accuracy of any data collected about the users. In one example, the data transparency log may record the number of people that were detected at the location 50 and at what time. The data transparency log may be used to help resolve a dispute between the landlord and the renter. In an example, the data transparency log may be referenced as feedback (e.g., whether the detections by the camera systems 104*a*-104*n* are detecting the terms of the rental agreement 122 accurately) and/or as proof of a violation. In another example, the users may access the data transparency log to verify what the camera systems 104*a*-104*n* have extracted (e.g., view the extracted data 170*a*-170*n*) to see data corresponding to the entries 370*a*-370*n* may be stored (e.g., the number of guests was recorded), but there were no identifiers of a particular person and no video/audio stored.

The notification may provide a privacy statement 330. The privacy statement 330 may inform the recipient of the notification that the video (e.g., the video frames 270*a*-270*n*) and/or audio (e.g., the signals AIN_A-AIN_N) is not available because the video and/or audio has never been stored. Since the video frames 270*a*-270*n* and/or audio captured may be discarded after the processor 130 analyzes the video and/or audio, the video frames 270*a*-270*n* and/or the captured audio may be unavailable for communication. The privacy statement 330 may further indicate that the determination of the breach of the rental agreement 122 may be based on the extracted statistics and parameters 170*a*-170*n*.

Figure 7:
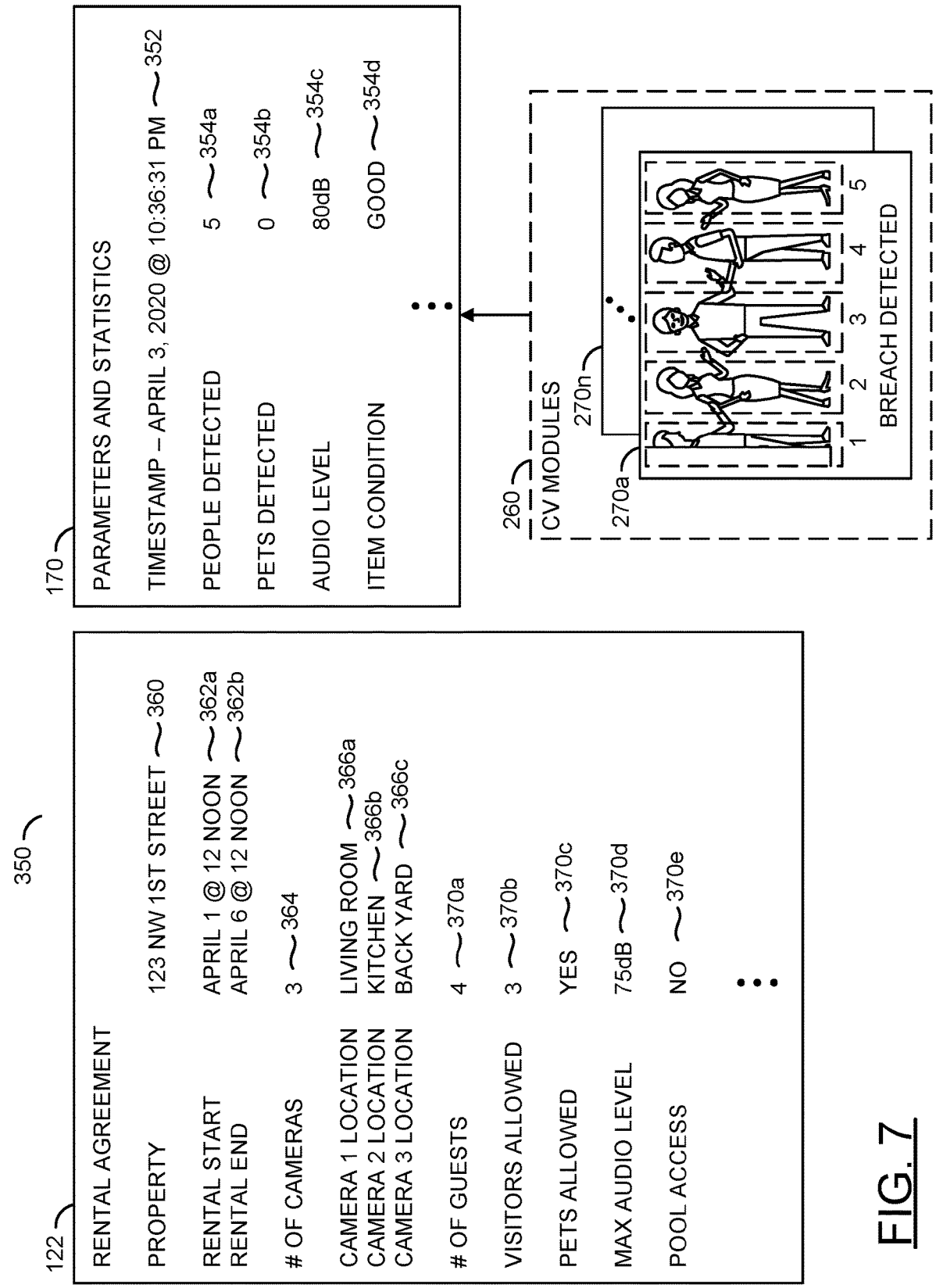
FIG. 7 is a diagram illustrating an example of comparing statistics and parameters extracted from video and/or audio data to entries of a rental agreement.

Referring to FIG. 7, a diagram illustrating an example of comparing statistics and parameters extracted from video and/or audio data to entries of a rental agreement is shown. An example comparison 350 of the rental agreement 122 and the detected parameters and statistics 170 are shown.

The CV modules 260 are shown extracting data from the video frames 270*a*-270*n*. The CV modules 260 may extract the data to generate the parameters and statistics 170. As the parameters and statistics 170 are generated from the video frames 270*a*-270*n*, the video frames 270*a*-270*n* may be discarded. In an example, after the processor 130 extracts the data from the video frame 270*a*, the video frame 270*a* may be discarded. One or more of the video frames 270*a*-270*n* may be processed in parallel and/or may be operated on at different sections of the video processing pipeline. Once all the parameters and statistics 170 are generated from one video frame, that video frame may be discarded. The other video frames 270*a*-270*n* may continue to be passed through the video processing pipeline of the processor 130.

Examples of the parameters and statistics 170 are shown. The parameters and statistics 170 may comprise a timestamp 352. The timestamp 352 may indicate the time that the video frame 270*a*-270*n* corresponding to the extracted data 170 was recorded. In an example, the timestamp 352 may be used to generate the time of breach notification 318 shown in association with FIG. 6. In some embodiments, some of the entries of the rental agreement 122 may be time sensitive (e.g., before 10 pm ten guests may be allowed, but after 10 pm only 3 guests may be allowed). The timestamp 352 may provide a temporal reference for when the parameters 170 were extracted.

The parameters 170 may comprise detections 354a-354n. The detections 354a-354n may be the information that may be determined based on the parameters and statistics 170. Generally, the detections 354a-354n may correspond to the entries of the rental agreement 122. For example, in order to protect the privacy of the renters, the amount of data collected may be limited. For example, if the rental agreement 122 does not provide a limitation on the number of guests, then the detections 354a-354n may not comprise information about the number of guests.

The detection 354a may be the number of people detected. In the example shown, the number of people detected may be five. The detection 354b may be the number of pets detected. In the example shown, no pets may be detected. If a pet was detected, further detections 354a-354n may be extracted (e.g., the type of pet, where the pet was kept on the property, etc.). The detection 354c may be the audio level detected. In the example shown, the detected audio level may be 80 dB. The detection 354d may be an item condition. In the example shown, the condition of the item (e.g., a TV) may be good (e.g., undamaged, not moved, not used, etc.). The detections 354a-354n may comprise data extracted from both the video frames 270a-270n and the captured audio AIN_A-AIN_N. The detections 354a-354n made by the camera system 104 may be performed in response to the machine readable version 254 of the rental agreement 122. The types of detections extracted in the parameters and statistics 170 may be varied according to the design criteria of a particular implementation.

The rental agreement 122 is shown. For illustrative purposes, the text version 252 of the rental agreement 122 is shown. The rental agreement 122 may comprise a property address 360. In an example, the property address 360 may correspond to the property address 312 shown in association with the notification shown in FIG. 6.

The address 360 may define the location 50. The rental agreement 122 may comprise a time period 362a-362b. The time period 362a-362b may comprise a rental start time 362a and a rental end time 362b. The rental time period 362a-362b may define the time that the rental agreement 122 is active. The rental time period 362a-362b may indicate at which times the camera system 104 may use the feature set defined in the machine readable version 254 of the rental agreement 122. For example, when the current time is outside of the time period 362a-362b, then the camera system 104 may not use the machine readable version 254 of the rental agreement 122 to extract the data from the video frames 270a-270n.

The rental agreement 122 may further define a number of cameras 364 and/or a location of cameras 366a-366c. The number of cameras 364 may indicate how many of the camera systems 104a-104n are implemented at the rental property 50. The location of cameras 366a-366c may define where the camera systems 104a-104n are located. Defining the number of cameras 364 and/or the location of cameras 366a-366c may provide transparency for the renters (e.g., to inform the renters that cameras are detecting behavior and/or watching for breaches to the rental agreement 122). Defining the number of cameras 364 and/or the location of cameras 366a-366c may further ensure that the renters know where the camera systems 104a-104n are located to prevent accidental damage and/or accidentally obscuring the camera systems 104a-104n.

Entries 370a-370e are shown. The entries 370a-370e may define the terms of the rental agreement 122. The entries 370a-370e may define the machine readable instructions 254 to be used by the camera systems 104a-104n. In some embodiments, the entries 370a-370e may be pre-defined types of detections that may be performed by the camera systems 104a-104n. The renter and the property owner may agree on the criteria for the pre-defined types of detections. While five entries 370a-370e are shown in the example 350. Any number of entries 370a-370n may be defined in the rental agreement 122. In some embodiments, the entries 370a-370n available and/or criteria limitations for the entries 370a-370n may be limited by the detection capabilities of the camera systems 104a-104n. The number and/or types of the entries 370a-370n may be varied according to the design criteria of a particular implementation.

The entry 370a may be the number of guests allowed on the rental property 50. In the example shown, the number of guests allowed 370a may be four. The entry 370b may be the number of visitors allowed. In the example shown, the number of guests allowed 370b may be three. For example, the number of guests allowed 370a may define how many people may be allowed at any time, while the number of visitors 370b may define how many additional people may be allowed at particular times (e.g., visitors may be allowed before midnight).

The entry 370c may be whether pets are allowed. In the example shown, the pets entry 370c may be that pets are allowed. The entry 370d may be a maximum audio level. For example, the maximum audio level may be defined as described in association with U.S. patent application Ser. No. 16/858,230, filed on Apr. 24, 2020, appropriate portions of which are hereby incorporated by reference. In the example shown, the maximum audio level 370d may be 75 dB. The entry 370e may be whether pool access is allowed. In some embodiments, the property owner may not want renters using certain areas of the rental property (e.g., not allowed to use the pool, not allowed in a particular bedroom, etc.). In the example shown, the pool access entry 370e may be that pool access is not allowed.

The processor 130 and/or the server 102 may compare the entries 370a-370n of the rental agreement 122 to the detections 354a-354n extracted from the video data and/or audio data by the camera system 104. The comparison may determine whether there has been a breach of the terms of the rental agreement 122.

In the example shown, the people detected 354a may be five. Comparing to the number of guests entry 370a (e.g., four), more than four guests have been detected. However, the timestamp 352 may be before midnight. Since the visitor entry 370b provides for three guests before midnight, then the people detected 354a may not breach the rental agreement 122.

In the example shown, the pets detected 354b may be zero. Since the pets entry 370c of the rental agreement 122 allows for pets, the pets detected 354b may not breach the rental agreement. The detected audio level 354c may be 80 dB. Since the maximum audio level entry 370d may be 75 dB, the audio level detected 354c may breach the terms of the rental agreement. The server 102 and/or the camera system 104 may generate the signal NTF to provide a notification to the renter and/or the property owner that the maximum audio level entry 370d of the rental agreement 122 has been breached.

Figure 8:
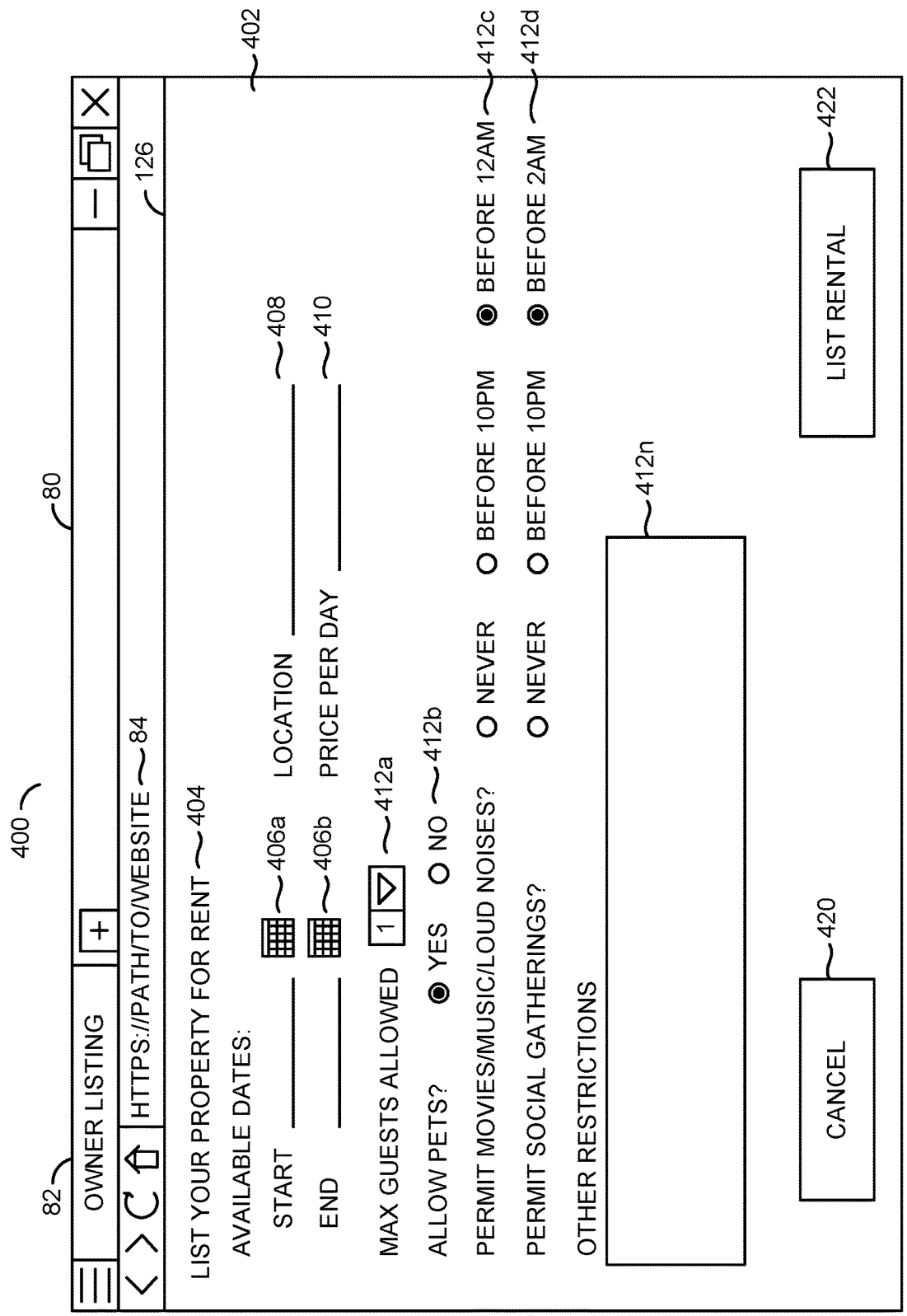
FIG. 8 is a diagram illustrating an example interface for a rental offer.

Referring to FIG. 8, a diagram illustrating an example interface for a rental offer is shown. An example scenario 400 is shown. The example scenario 400 may comprise a view of a web browser 80. The web browser 80 may comprise various interface features (e.g., tabs, address bar, navigation buttons, etc.). A tab 82 of the web browser 80 is shown. The tab 82 may comprise a website title indicating an Owner Listing. A URL 84 is shown in the web browser 80. In an example, the URL 84 may be a web address that points to the servers 102*a*-102*n*. The browser 80 is shown displaying a web page. The web page displayed by the browser 80 may be the web interface 126. In an example, the property owner user device 52*a* may access the servers 102*a*-102*n* using the web browser 80. The servers 102*a*-102*n* may generate the signal WEB to present the web interface 126 to the property owner user device 52*a*.

The web interface 126 generated by the servers 102*a*-102*n* shown may be a property listing form interface 402. For example, the data from the web interface 126 stored by the servers 102*a*-102*n* may be used to provide data that the browser 80 may use to output the property listing form interface 402. The property listing form interface 402 may be an example website shown to the property owner. The property listing form interface 402 may enable the property owner to list the property 50 for rent.

The property listing form interface 402 may provide various fields to accept input from the property owner. The fields may correspond to terms and/or conditions that may be used to create the entries 370*a*-370*n* of the rental agreement 122. The fields may be generated in response to the signal QUERY. For example, the servers 102*a*-102*n* may communicate with the camera systems 104*a*-104*n* to determine the capabilities of the computer vision operations (e.g., determine what types of objects 160*a*-160*n* and/or characteristics 162 may be detected). The detection engine 124 may convert the type of objects 160*a*-160*n* and/or characteristics 162 that may be detected by the camera systems 104*a*-104*n* into fields that may be stored as part of the data for the web interface 126. When the property owner wants to list the property 50, the servers 102*a*-102*n* may generate fields for the property listing form interface 402 that may be specific to the capabilities of the camera systems 104*a*-104*n* used by the property owner and/or the characteristics of the room/mounting location of the camera systems 104*a*-104*n*.

The property listing form interface 402 may comprise a heading 404, date fields 406*a*-406*b*, a location field 408, a price field 410, a number of restriction fields 412*a*-412*n*, a button 420 and/or a button 422. The heading 404 may indicate that the property owner may list the property 50 for rent using the property listing form interface 402. The various input fields 406*a*-412*n* may accept input from the user that may be converted to both the text version 252 and/or the machine readable version 254 of the rental agreement 122. The machine readable version 254 may be communicated to the camera systems 104*a*-104*n* as the signal FEAT_SET. The property listing form interface 402 shown may be a representative example and the style, layout and/or available input fields may be varied according to the design criteria of a particular implementation.

The date input fields 406*a*-406*b* may comprise a start and end time for the rental of the property 50 (e.g., a time range for the rental offer). For example, the date input fields 406*a*-406*b* may be used to enter the time period 362*a*-362*b* of the rental agreement 122 shown in association with FIG. 7. The location input field 408 may accept a location (e.g., an address) of the property 50. For example, the location input field 408 may be used to enter the address 360 of the rental agreement 122 shown in association with FIG. 7. The price input field 410 may accept a price for renting the location 50. In the example shown, the price input field 410 may be on a per day basis. Other price options may be available (e.g., flat rate, per week, per month, etc.).

In some embodiments, the location input field 408 may also comprise input fields for the property owner to input data (e.g., technical specifications, room/mounting location characteristics and/or an identification number) for the camera systems 104*a*-104*n*. In some embodiments, the property listing form interface 402 may be modified based on the capabilities of the camera systems 104*a*-104*n* used by the property owner. As advancements are made to the computer vision detection capabilities of the camera systems 104*a*-104*n*, the property owner may have more options available (e.g., more input fields 412*a*-412*n* may be accessible). In an example, when the user inputs an address into the location field 408, the servers 102*a*-102*n* may generate the signal QUERY to the camera systems 104*a*-104*n* at the location 50 to determine the capabilities of the camera systems 104*a*-104*n* and then update the property listing form interface 402 (e.g., based on the available parameters, features and/or types of detection that may be performed by the camera systems 104*a*-104*n*). For example, the signal QUERY may be used to determine the number of cameras 364 and/or the camera locations 366*a*-366*c* of the rental agreement 122 shown in association with FIG. 7.

The restriction input fields 412*a*-412*n* may enable the property owner to define the terms of the rental agreement 122. In an example, the restriction input fields 412*a*-412*n* may be used as data for the entries 370*a*-370*n* of the rental agreement 122 shown in association with FIG. 7. In some embodiments, the number and/or types of the restriction input fields 412*a*-412*n* may be determined based on data generated by the detection engine 124 in response to the signal QUERY and/or the neural networks available in the detection engine 124. The number, type and/or format of the input used for the restriction input fields 412*a*-412*n* may be varied according to the design criteria of a particular implementation.

In the example shown, the restriction input field 412*a* may comprise a maximum number of guests allowed. The property owner may restrict the number of people allowed on the property 50, then signal FEAT_SET may provide the camera systems 104*a*-104*n* the maximum number of people that may be detected before a breach is determined to occur. For example, the restriction input field 412*a* may correspond to the entry 370*a* shown in association with FIG. 7. In response to the data input in the restriction input field 412*a*, the computer vision operations may be performed by the camera systems 104*a*-104*n* when the rental agreement 122 is active to detect if more than the maximum number of people have been detected.

In the example shown, the restriction input field 412*b* may be whether pets are allowed on the property 50. In the example shown, the restriction input field 412*b* may be a binary choice (e.g., to allow pets or not). In some embodiments, the restriction input field 412*b* may enable the property owner to define how many pets are allowed and/or the type(s) of pets allowed. For example, a property owner that is allergic to cats may allow dogs in the rental agreement 122 but not cats. In an example, the restriction input field 412*b* may correspond to the entry 370*c* shown in association with FIG. 7.

In the example shown, the restriction input field 412*c* may comprise whether loud noises (e.g., music, movies, live performances, party guests, etc.) are allowed at the property 50. In the example shown, the restriction input field 412*c* may comprise radio buttons for selecting particular times when loud noises may be allowed. For example, loud noises may be permitted before particular times to avoid noise complaints and/or avoid disturbing neighbors. However, any type of time input may be implemented by the rental listing web interface 402. In an example, the restriction input field 412c may correspond to the maximum audio level entry 370d shown in association with FIG. 7. For example, the maximum audio level may not be applied before midnight based on the selection chosen for the restriction input field 412c. In some embodiments, an audio maximum audio level may be defined to indicate what audio level may be considered a loud noise.

In the example shown, the restriction input field 412d may comprise whether social gatherings are permitted. For example, the renter may be permitted to allow guests (e.g., have a party) but only during particular times periods. For example, the maximum number of guests may limit how many people are allowed overnight or past a particular time, but during other times more people may be allowed on the property 50. In an example, the restriction input field 412d may correspond to the number of visitors allowed entry 370b shown in association with FIG. 7. The social gatherings may be defined as the number of extra guests that may be allowed at particular times.

In the example shown, the restriction input field 412n may comprise a free-form text field. The restriction input field 412n may enable the property owner to enter various other terms and/or conditions for renting the property 50. In some embodiments, the restriction input field 412n may be further populated in response to the signal QUERY.

The types of restriction input fields 412a-412n available may be varied according to the design criteria of a particular implementation. For example, the property owner may provide restrictions on whether alcohol is allowed on the property 50. In another example, the property owner may restrict access to particular locations on the property 50 (e.g., bedrooms, pool access, etc.). In yet another example, the property owner may define whether fireworks are allowed on the property 50, whether only men or only women are allowed on the property 50, the types of events allowed on the property 50, etc.

The button 420 may provide a cancel function (e.g., to delete the data entered in the fields 406a-412n and/or leave the property listing form interface 402). The button 422 may provide a submit function to enable the property owner to use the data entered on the property listing form interface 402. For example, when the property owner interacts with the list rental button 422 (e.g., clicks, taps, etc.) the user device 52a may communicate the signal RENTOFR to the servers 102a-102n. The processors 110a-110n of the servers 102a-102n may generate the listings 120 based on the data provided in the input fields 406a-412n.

Figure 9:
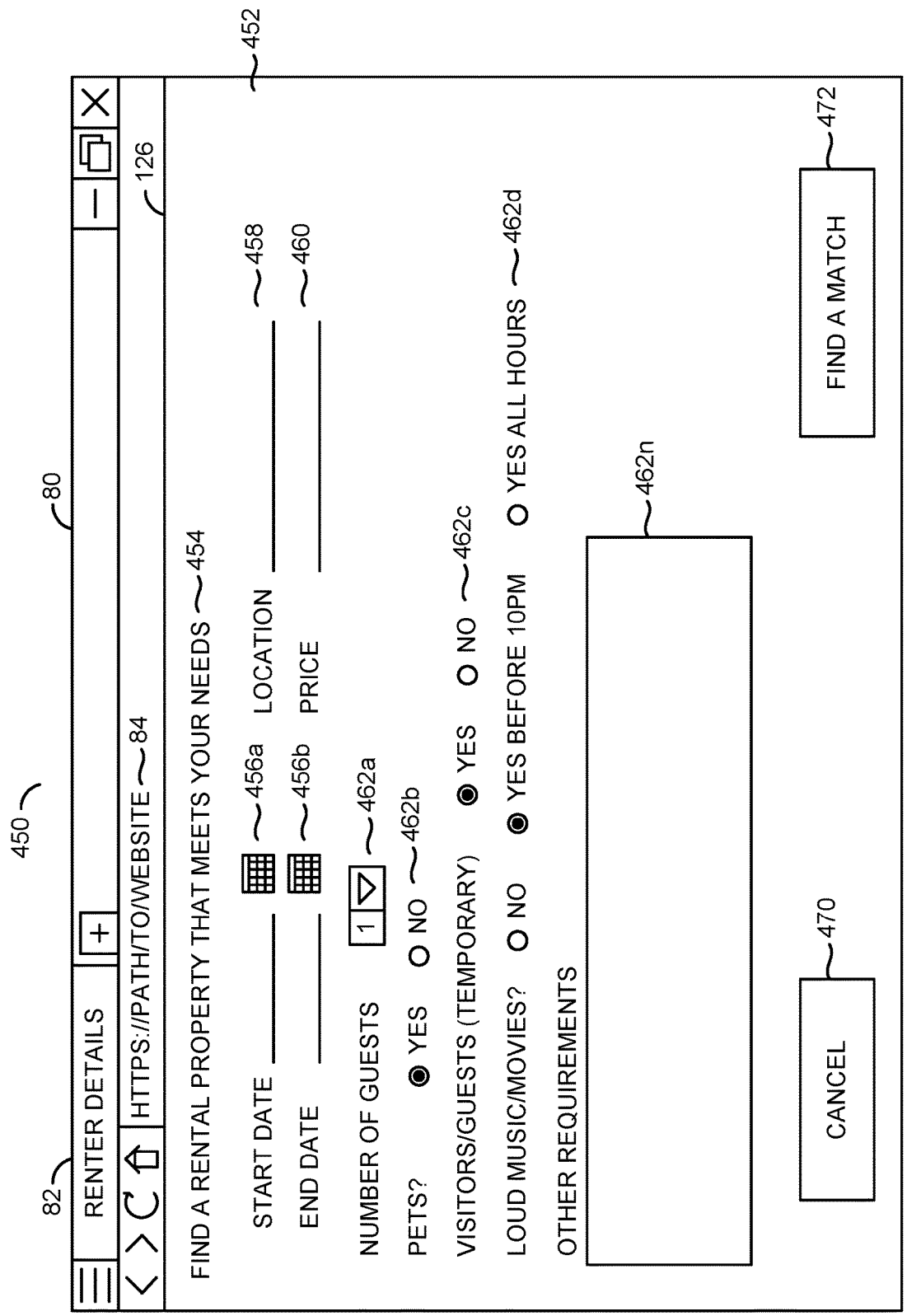
FIG. 9 is a diagram illustrating an example interface for a rental request.

Referring to FIG. 9, a diagram illustrating an example interface for a rental request is shown. An example scenario 450 is shown. The example scenario 450 may comprise a view of the web browser 80. Similar to the example scenario 400 shown in association with FIG. 8, the tab 82 and the URL 84 are shown. In the example scenario 450, the tab 82 may comprise a website title indicating Renter Details. The web page displayed by the browser 80 may be the web interface 126. In an example, the prospective renter user device 52b may access the servers 102a-102n using the web browser 80. The servers 102a-102n may generate the signal WEB to present the web interface 126 to the prospective renter user device 52b.

The web interface 126 generated by the servers 102a-102n shown may be a rental request form interface 452. For example, the data from the web interface 126 stored by the servers 102a-102n may be used to provide data that the browser 80 may use to output the rental request form interface 452. The rental request form interface 452 may be an example website shown to the prospective renter. The rental request form interface 452 may enable the prospective renter to search the listings 120 to find a suitable rental.

The rental request form interface 452 may provide various fields to accept input from the prospective renter. The fields may correspond to terms and/or conditions that may be used to create the rental agreement 122. In some embodiments, the fields may be generated in response to the listings 120 based on the data provided by the property owner in the signal RENTOFR. For example, the rental request form interface 452 may be available after the property owner has provided the signal RENTOFR to communicate information about the property 50 to be stored as the listings 120. When the prospective renter wants to search for a rental property, the servers 102a-102n may generate fields to enable a search of the property listing 122. The servers 102a-102n may search the listings 120 based on the information received based on the input of the rental request form interface 452.

The rental request form interface 452 may comprise a heading 454, date fields 456a-456b, a location field 458, a price field 460, a number of feature fields 462a-462n, a button 470 and/or a button 472. The heading 454 may indicate that the prospective renter may search the listings 120 based on the wants/needs of the renter using the rental request form interface 452. In one example, the various input fields 456a-462n may accept input from the user that may be converted to both the text version 252 and/or the machine readable version 254 of the rental agreement 122. In another example, the various input fields 456a-462n may accept input from the user that may be used by the servers 102a-102n to compare against the listings to return a closest match (or a number of the listings 120 that may be generally close to the input by the prospective renter). The rental request form interface 452 shown may be a representative example and the style, layout and/or available input fields may be varied according to the design criteria of a particular implementation.

The rental request form interface 452 may enable the prospective renter to enter criteria for a property to rent that may be listed in the listings 120. The web interface may provide the various fields 456a-462n to accept input from the user device 52b. The fields 456a-462n may accept input from the user that may be converted to search criteria that may be used to filter the available listings 120. The content available on the rental request form interface 452 for finding a rental property may be similar to the input fields 406a-412n used for the property listing form interface 402 shown in association with FIG. 8 to enable a comparison to the data of the listings 120.

The date input fields 456a-456b may comprise a desired start and end time for a desired rental (e.g., a time range for the rental request). For example, the date input fields 456a-456b may be used to compare to the listings 120 against the data entered in the date input fields 406a-406b. The location input field 458 may accept a location (e.g., an address, a general region, a city, etc.) for a desired rental. For example, the location input field 458 may be used to compare to the listings 120 against the data entered in the location input field 408. The price input field 460 may accept a desired price point for a desired rental. For example, the price input field 460 may be used to compare to the listings 120 against the data entered in the price input field 410.

The feature input fields 462a-462n may enable the prospective renter to define the terms of the rental agreement 122. In an example, the feature input fields 462a-462n may be used as data for the entries 370a-370n of the rental agreement 122 shown in association with FIG. 7. In another example, the feature input fields 462a-462n may be used to search the listings 120 by comparing against the similar data entered for the restriction input fields 412a-412n. For example, the prospective renter may want to search for a rental property in a particular location that allows loud music late in order to throw a party. By comparing against the data entered with the restriction fields 412a-412n, the server computers 102a-102n may filter out available properties that are outside the desired region and/or available properties that do not allow loud music.

The prospective renters use the rental request form web interface 452 to search for venues at particular locations, for particular dates, in a particular price range that may suit the desires of the renter. For example, if the prospective renter is planning a wedding for two hundred guests, by providing a guest number to the appropriate one of the feature input fields 462a-462n, the servers 102a-102n may filter out rental listings 120 that do not meet the criteria of the prospective renter. The number, type and/or format of the input used for the feature input fields 462a-462n may be varied according to the design criteria of a particular implementation.

In the example shown, the feature input field 462a may comprise a maximum number of guests requested. The requested number of guests may be compared against the listings 120 (e.g., the maximum number of guests defined from the restriction field 412a). In the example shown, the restriction input field 462b may be whether a property that allows pets is requested. The request for a pet may be compared against the listings 120 (e.g., the number and/or types of pets defined from the restriction field 412b). Similar to the restriction field 412b, the pet feature input 462b may provide options for number and/or types of pets. In some embodiments, the pet feature input 462b may request properties that have never had pets (e.g., for severe allergies).

In the example shown, the feature input field 462c may comprise whether social gatherings are requested. In the example shown, a binary choice is shown. In some embodiments, the feature input field 462c may provide further input details such as number of extra guests, the time of day that the extra guests may be present, etc. The requested number of guests and/or times for the extra guests may be compared against the listings 120 (e.g., against the number and/or times for social gatherings defined in the restriction input 412d). In the example shown, the feature input field 462d may comprise whether loud noises (e.g., music, movies, live performances, party guests, etc.) are requested. In the example shown, the feature input field 462d may comprise radio buttons for selecting particular times when loud noises may be requested. Similar to the noise restriction input field 412c, the loud noise feature input 462d may provide further options such as maximum noise level requested. The requested loud music/movies may be compared against the listings 120 (e.g., against the times and/or maximum noise level defined in the restriction input 412c).

In the example shown, the feature input field 462n may comprise a free-form text field. The feature input field 462n may enable the prospective renter to enter various other features requested, terms and/or conditions for renting a property from the listings 120. In some embodiments, the prospective renter may not define the terms and/or conditions of the rental agreement 122. In some embodiments, the prospective renter may be provided an additional web interface to negotiate one or more terms of the rental agreement 122.

The button 470 may provide a cancel function (e.g., to delete the data entered in the fields 456a-462n and/or to leave the rental request interface 452). The button 472 may provide a find a match button to enable the prospective renter to submit the data entered in the rental request interface 452 to the servers 102a-102n. For example, when the prospective renter interacts with the find a match button 472 (e.g., clicks, taps, etc.) the user device 52b may communicate the signal RENTREQ to the servers 102a-102n. The processors 110a-110n of the servers 102a-102n may search the listings 120 based on the data provided in the input fields 456a-462n. In some embodiments, the servers 102a-102n may provide a filtered list of suitable listings in response to the signal RENTREQ. In some embodiments, the servers 102a-102n may provide the rental agreement 122 in response to the signal RENTREQ (e.g., the property owner may list a property and automatically accept offers that fit the criteria of the listing 120). The processors 110a-110n may be configured to compare the data from the signal RENTOFR (e.g., stored in the listings 120) to the data from the signal RENTOFR to find data that matches and/or data that provides some degree of commonality. In some embodiments, the signal RENTOFR may comprise negotiation terms sent by the prospective renter (e.g., the prospective renter may find a listing 120 that is close to the desired property but may not allow enough people, the renter may negotiate by asking if more people may be allowed).

Figure 10:
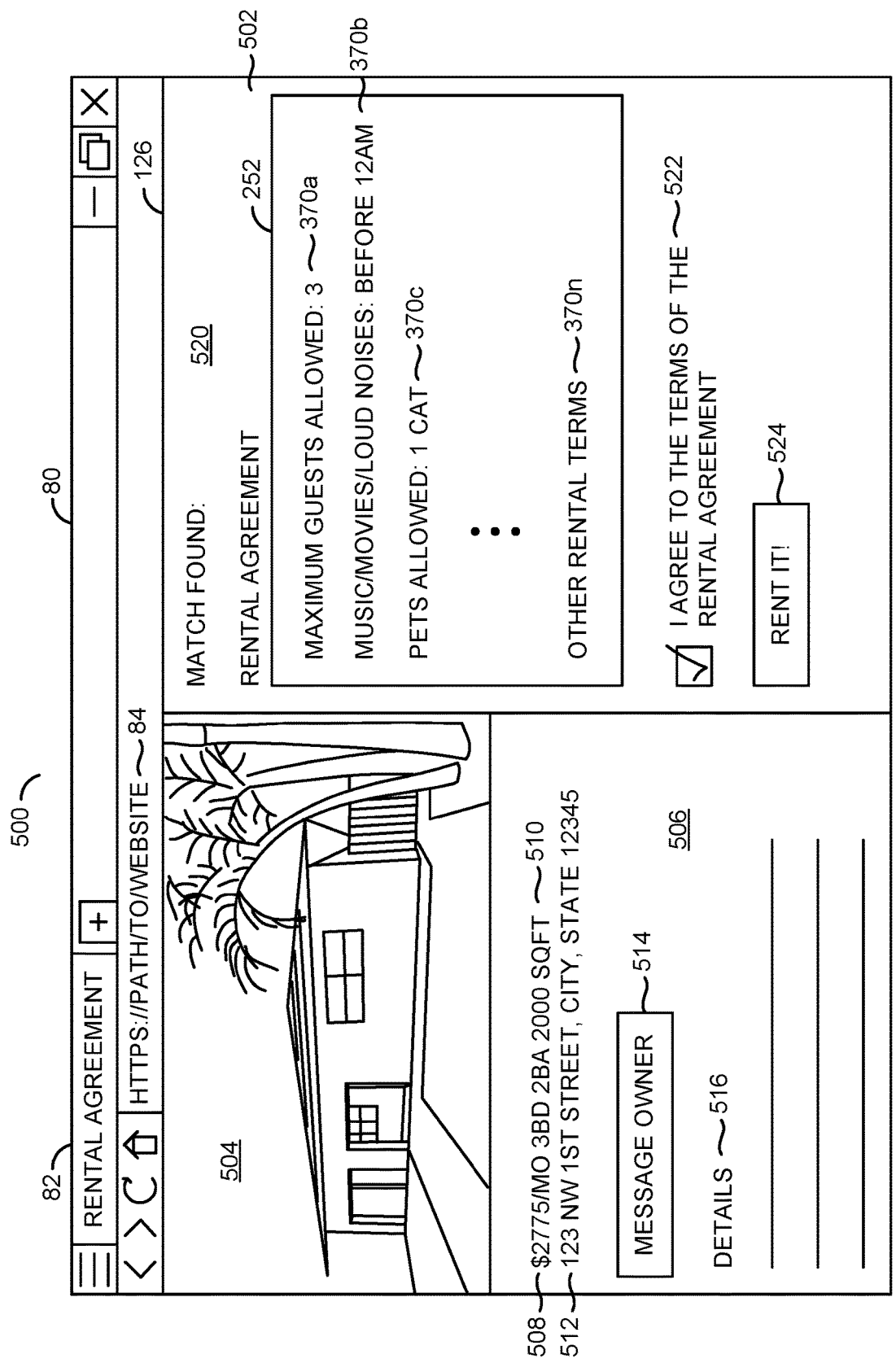
FIG. 10 is a diagram illustrating an example interface for a rental agreement.

Referring to FIG. 10, a diagram illustrating an example interface for a rental agreement is shown. An example scenario 500 is shown. The example scenario 500 may comprise a view of the web browser 80. Similar to the example scenario 400 shown in association with FIG. 8, the tab 82 and the URL 84 are shown. In the example scenario 500, the tab 82 may comprise a website title indicating Rental Agreement. The web page displayed by the browser 80 may be the web interface 126. In an example, the user devices 52a-52b may access the servers 102a-102n using the web browser 80. The servers 102a-102n may generate the signal RAGREE to present the web interface 126 to the user devices 52a-52b.

The web interface 126 generated by the servers 102a-102n shown may be a rental agreement form interface 502. For example, the data from the web interface 126, the listings 120 and/or the rental agreement 122 stored by the servers 102a-102n may be used to provide data that the browser 80 may use to output the rental agreement form interface 502. The rental agreement form interface 502 may be an example website shown to both the property owner and the prospective renter. In one example, the rental agreement form interface 502 may be presented to the prospective renter in response to the signal RENTREQ. The servers 102a-102n may present the rental agreement form interface 502 when the rental request from the prospective renter from the signal RENTREQ matches (or has commonalities with) the one or more of the listings 120. The rental agreement form interface 502 may enable the property owner and/or the prospective renter to agree to the rental agreement 122. The rental agreement form interface 502 shown may be a representative example and the style, layout and/or available input fields may be varied according to the design criteria of a particular implementation.

In the example shown, the rental agreement form interface 502 may be an example of a matched listing provided in response to the rental request RENTREQ. An image 504 is shown. The image 504 may be an image of the property 50 that corresponds to the matched listing. In an example, the image 504 may be submitted by the property owner with the signal RENTOFR. In some embodiments, the image 504 may be an image captured by one or more of the camera systems 104a-104n. In some embodiments, the image 504 may be an image selected by the property owner. The rental agreement form interface 502 may comprise a property description 506.

The property description 506 may comprise a list price 508. The list price 508 may be determined based on the data from the listings 120 (e.g., as defined by the price input 410). The property description 506 may comprise statistics 510. The statistics 510 may provide descriptive data about the location 50 (e.g., size, number of rooms, number of beds, amenities, etc.). The property description 506 may comprise a button 514 and/or additional details 516. The additional details 516 may provide further information about the location 50 (e.g., directions, nearby restaurants, how old the property is, etc.).

The button 514 may be a messaging button. In the example shown, the messaging button 514 may enable the prospective renter to directly contact the property owner. Similarly, the property owner may use the messaging button 514 to directly contact the prospective renter. The messaging button 514 may provide an interface for direct contact (e.g., email, text message, video link, etc.). The messaging button 514 may enable the parties to negotiate terms of the rental agreement 122.

In an example, one of the listings 120 may have a restriction of a maximum of five guests. The renter may use the messaging button 514 to send a request to the property owner to ask if the rental agreement 122 could be modified to allow seven guests. The property owner may have the option to agree to the modification, deny the modification and/or provide a counter offer. In an example, the property owner may counter by allowing up to six guests. In another example, the property owner may deny the modification and provide a reason (e.g., allowing more guests may be against the law). The messaging button 514 may enable negotiation and/or modification of the restrictions provided by the property owner in the signal RENTOFR.

The rental agreement form interface 502 may have a contract agreement section 520. In the example shown, the contract agreement section 520 may indicate that a match was found between the requests of the prospective renter and the listings 120. In the example, one match is shown. However, when the prospective renter provides the signal RENTREQ, the servers 102a-102n may return multiple properties from the listings 120 that generally fit the criteria of the signal RENTREQ. The contract agreement section 520 may comprise the text version 252 of the rental agreement 122, a checkbox 522 and a button 524. The checkbox 522 may be an agreement checkbox. The button 522 may be a confirmation button.

The rental agreement 122 displayed on the contract agreement section 520 may provide the text-based (e.g., human readable) version 252 listing of the terms and conditions 370a-370n of the rental agreement 122. In the example shown, the text version 252 of the rental agreement 122 may indicate the entry 370a for the maximum number of guests allowed on the rental property 50, the entry 370b for the times that loud noises are permitted, the entry 370c for the number and/or type of pets allowed, etc. Other terms and conditions 370a-370n may be listed (e.g., how loud the noise may be, the types of activities permitted, the type of noise permitted, etc.).

In some embodiments, the rental agreement 122 may comprise the terms and conditions 370a-370n as input by the property owner using the property listing form interface 402. For example, the servers 102a-102n may convert the data input in the restriction input fields 412a-412n received in the signal RENTOFR into the entries 370a-370n of the rental agreement 122. In the example shown, the rental agreement web interface 502 may be provided to the prospective renter. The renter may use the messaging button 514 to negotiate the terms 370a-370n. Similarly, the rental agreement interface 502 may be provided to the property owner to enable the property owner to agree to the terms 370a-370n of the rental agreement 122.

In the example shown, the terms 370a-370n may comprise restrictions that may be imposed on the renter if the rental agreement 122 is agreed to. In some embodiments, the rental agreement 122 may indicate various requirements and/or guidelines for the property owner. In an example, the terms 370a-370n may outline the types of amenities that the property owner may make available. For example, the rental agreement 122 may indicate how many beds are to be made available. In another example, the rental agreement 122 may indicate whether the property owner is charging for usage of utilities. In yet another example, the rental agreement 122 may indicate whether various conveniences may be provided (e.g., towels, silverware, etc.). The property owner may use the messaging button 514 to negotiate the amenities provided. For example, if the prospective renter asks for additional guests to be allowed, the property owner may counter-offer with a higher price.

The checkbox 522 may be configured to enable the users to agree to the rental agreement 122. Checking the checkbox 522 may enable the users to confirm and agree to the rental agreement 122. The checkbox 522 may be used as an indication that each user has read the text version 252, understands and agrees to the terms of the rental agreement 122. When the checkbox 522 is checked by the user, the rent it button 524 may become accessible. Interacting with the rent it button 524 may submit a confirmation of the rental agreement 122 to the servers 122a-122n. In an example, when the property owner uses the user device 52a to check the checkbox 522 and clicks on the rent it button 524, the user device 52a may communicate the confirmation signal CONFO to the servers 102a-102n. The signal CONFO may provide an indication that the property owner has agreed to the rental agreement 122. In another example, when the renter uses the user device 52b to check the checkbox 522 and clicks on the rent it button 524, the user device 52b may communicate the confirmation signal CONFR to the servers 102a-102n. The signal CONFR may provide an indication that the renter has agreed to the rental agreement 122.

When the servers 102a-102n receive both the confirmation signal CONFO and the confirmation signal CONFR, the rental agreement 122 may be considered agreed to. In response to receiving the confirmation signal CONFO and the confirmation signal CONFR, the memory 112a-112n may store the rental agreement 122. The rental agreement 122 may be parsed by the detection engine 124. The detection engine 124 may determine the feature set based on the entries 370a-370n of the rental agreement 122. The detection engine 124 may generate the machine readable version 254 of the rental agreement 122.

The machine readable version 254 may be generated based on data about the camera systems 104a-104n at the location 50 in the rental agreement 122 determined from the signal QUERY. The machine readable version 254 of the rental agreement 122 may be communicated to the camera systems 104a-104n as the signal FEAT_SET. The camera systems 104a-104n may generate the detection parameters of the rental agreement 122 based on the machine readable version 254. The camera systems 104a-104n may perform the computer vision and/or audio analysis of the location 50 when the rental time range 362a-362b is active.

In some embodiments, the restrictions provided by the rental offer interface 402, the terms and/or conditions that may be negotiated, and/or the entries 370a-370n that may be available for the rental agreement 122 may be limited. For example, the entries 370a-370n that may be generated by the servers 102a-102n may generally correspond to the types of detection that the camera systems 104a-104n may perform. In some embodiments, the entries 370a-370n may be pre-defined parameters. For example, an overly complicated system of negotiating the terms 370a-370n may be not desired by end users. For example, the entries 370a-370n may be entered using the restriction input fields 412a-412m. Additional terms and conditions may be entered in the restriction free-form input field 412n but the free-form data may not be used as the basis for generating the feature set for the camera systems 104a-104n (e.g., other portions of the rental agreement 122 that may not be used by the camera systems 104a-104n may be generated by the free-form data).

In some embodiments, the detection engine 124 may convert the entries 370a-370n to the feature set used for the computer vision by the camera systems 104a-104n. The entries 370a-370n may be used as a basis for comparison with the output from the object/person/pet detection (and recognition) performed by the camera systems 104a-104n using the neural network(s). In one example, the detection parameters used by the camera systems 104a-104n may comprise a single network capable of recognizing various objects, people and/or pets. In another example, the detection parameters used by the camera systems 104a-104n may comprise multiple neural networks running in parallel. In a scenario that there are multiple neural networks, some of the neural networks might not be loaded if not applicable to the entries 370a-370n. For example, a pet recognition neural network may not be loaded if the entries 370a-370n do not provide a policy regarding pets.

The detection parameters may comprise the criteria for determining a breach of the rental agreement 122. In an example, if one rental agreement 122 provides a limitation of five guests and another rental agreement 122 provides a limitation of six guests, the neural networks used for detecting people may be the same in each scenario. The criteria used on the output of the neural networks (e.g., the extracted data 170a-170n) may be different. For example, the neural network may detect six people and the output (e.g., the extracted data 170a-107n that indicates six people were detected) may be compared to the detection parameters that indicate a criteria of five people, which may indicate a breach of the rental agreement 122. While the type of detection (e.g., people detection and counting) may be the same, the criteria used to determine a breach of the rental agreement 122 may be different. The entries 370a-370n generated by agreeing to the rental agreement 122 using the rental agreement interface 502 may be used by the detection engine 124 to determine the feature set to provide to the camera systems 104a-104n. The feature set may comprise the neural networks to detect the objects and/or the criteria for comparing against the extracted data 170a-170n.

Figure 11:
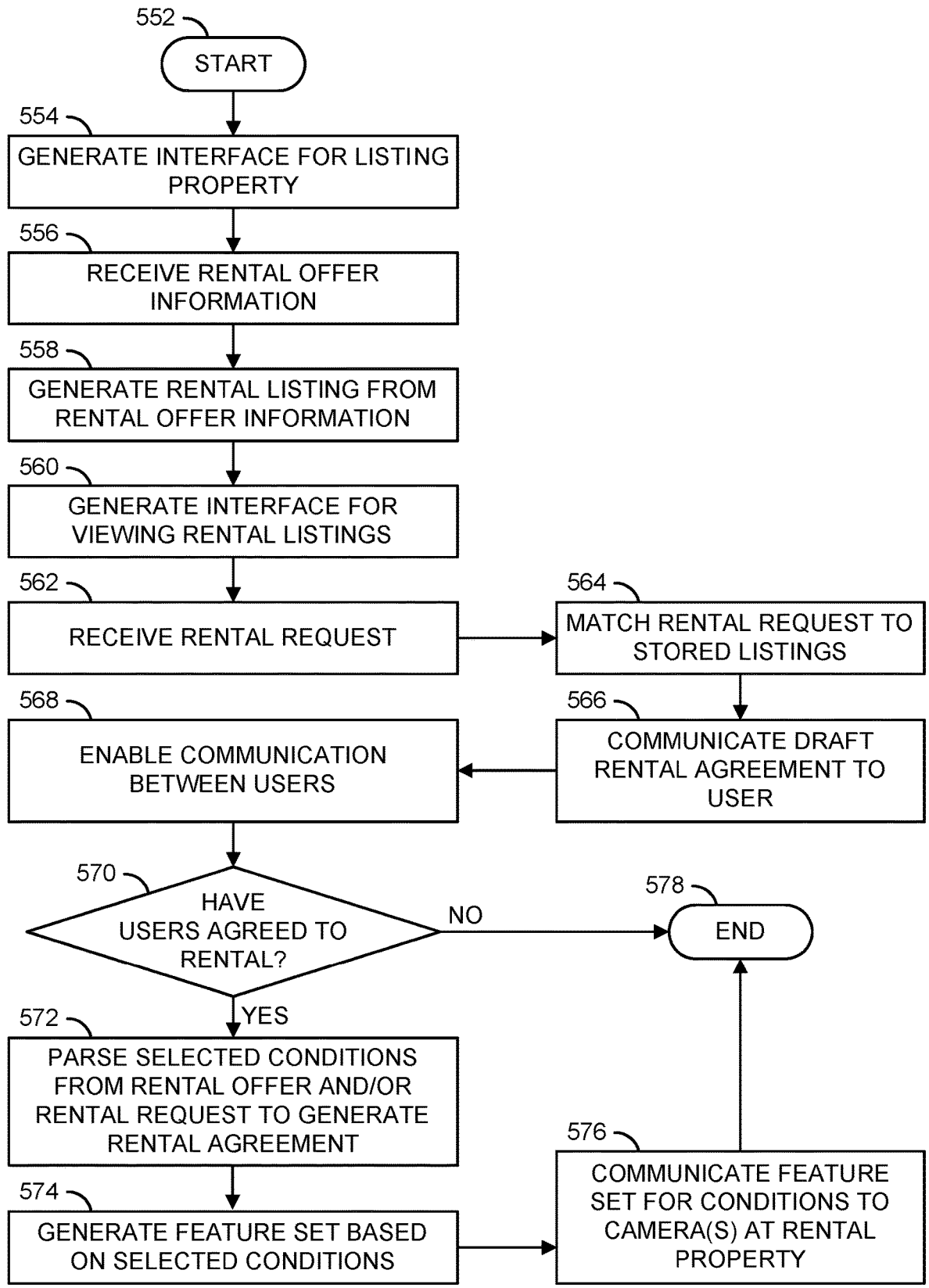
FIG. 11 is a flowchart illustrating a method for generating a rental agreement from user input.

Referring to FIG. 11, a method (or process) 550 is shown. The method 550 may generate a rental agreement from user input. The method 550 generally comprises a step (or state) 552, a step (or state) 554, a step (or state) 556, a step (or state) 558, a step (or state) 560, a step (or state) 562, a step (or state) 564, a step (or state) 566, a step (or state) 568, a decision step (or state) 570, a step (or state) 572, a step (or state) 574, a step (or state) 576 and a step (or state) 578.

The step 552 may start the method 550. In the step 554, the servers 102a-102n may enable the property listing form interface 402 to be generated for listing the location 50 for rent. In an example, data for the property listing form interface 402 may be stored in the web interface data 126. The servers 102a-102n may communicate the data to the user device 52a via the signal WEB. The browser 80 of the user device 52a may interpret the data to generate the property listing form interface 402. Next, in the step 556, the servers 102a-102n may receive the rental offer information. For example, the property owner may use the property listing form interface 402 to input data into the fields 406a-412n. The property owner may submit the data to the servers 102a-102n as the signal RENTOFR. In the step 558, the processors 110a-110n may receive the information in the signal RENTOFR and generate listing information. The listing information may be stored in the memory 112a-112n as the listings 120. Next, the method 550 may move to the step 560.

In the step 560, the servers 102a-102n may enable the rental request interface 452 to be generated for viewing the stored rental listings 120. In an example, data for the rental request interface 452 may be stored in the web interface data 126. The servers 102a-102n may communicate the data to the user device 52b via the signal WEB. The browser 80 of the user device 52b may interpret the data to generate the rental request interface 452. Next, in the step 562, the servers 102a-102n may receive the rental request information. For example, the renter may use the rental request interface 452 to input data into the fields 456a-462n. The renter may submit the data to the servers 102a-102n as the signal RENTREQ. Next, the method 550 may move to the step 564.

In the step 564, the servers 102a-102n may match the data from the signal RENTREQ to the stored listings 120. In one example, the servers 102a-102n may receive the signal RENTREQ, compare the rental request information to the listings 120, and find an exact match. In another example, the servers 102a-102n may perform the comparison and return a number of the listings 120 that may generally correspond to the data in the signal RENTREQ (e.g., based on proximity to the location of the property and the request, based on the price range, based on the requested features and requested restrictions, etc.). The prospective renter may receive one match and/or select a desired choice from a subset of the listings 120 selected by the servers 102a-102n in response to the signal RENTREQ. Next, the method 550 may move to the step 566.

In the step 566, the servers 102a-102n may communicate the signal RAGREE to the user devices 52a-52b (e.g., to both the renter and the property owner). In an example, the users may agree to the rental agreement 122. Next, in the step 568, the servers 102a-102n may enable communication between the users (e.g., the renter and the property owner). In one example, the servers 102a-102n may enable the users to communicate to negotiate the entries 370a-370n of the rental agreement 122. In another example, the servers 102a-102n may not allow the renter to negotiate the terms 370a-370n (e.g., the property owner may indicate that the terms are non-negotiable). Generally, the rental agreement interface 502 may enable the users to negotiate and/or agree to the terms of the rental agreement 122. Next, the method 550 may move to the decision step 570.

In the decision step 570, the servers 102a-102n may determine whether the users have agreed to the rental agreement 122. For example, the property owner may submit an acceptance using the rental agreement interface 502 and the user device 52a may communicate the signal CONFO. Similarly, the renter may submit an acceptance using the rental agreement interface 502 and the user device 52b may communicate the signal CONFR. The rental agreement 122 may be agreed to when the servers 102a-102n receive both the signal CONFO and the signal CONFR. If the rental agreement has not been agreed to, the method 550 may move to the step 578. For example, the rental agreement 122 may not be formed. If the rental agreement 122 is agreed to, the method 550 may move to the step 572.

In the step 572, the processors 110a-110n may parse the terms and conditions of the rental agreement 122 submitted and/or agreed to in the signal RENTREQ and the signal RENTOFR to generate and store the rental agreement 122. Next, in the step 574, the detection engine 124 may generate the machine readable version 254 of the rental agreement 122. The machine readable version 254 may be generated based on the entries 370a-370n of the rental agreement 122. The machine readable version 254 may be the feature set for the camera systems 104a-104n. In the step 576, the servers 102a-102n may communicate the feature set for the conditions generated by the detection engine 124 to the camera systems 104a-104n of the rental property 50. In an example, the feature set may be communicated as the signal FEAT_SET. Next, the method 550 may move to the step 578. The step 578 may end the method 550.

Figure 12:
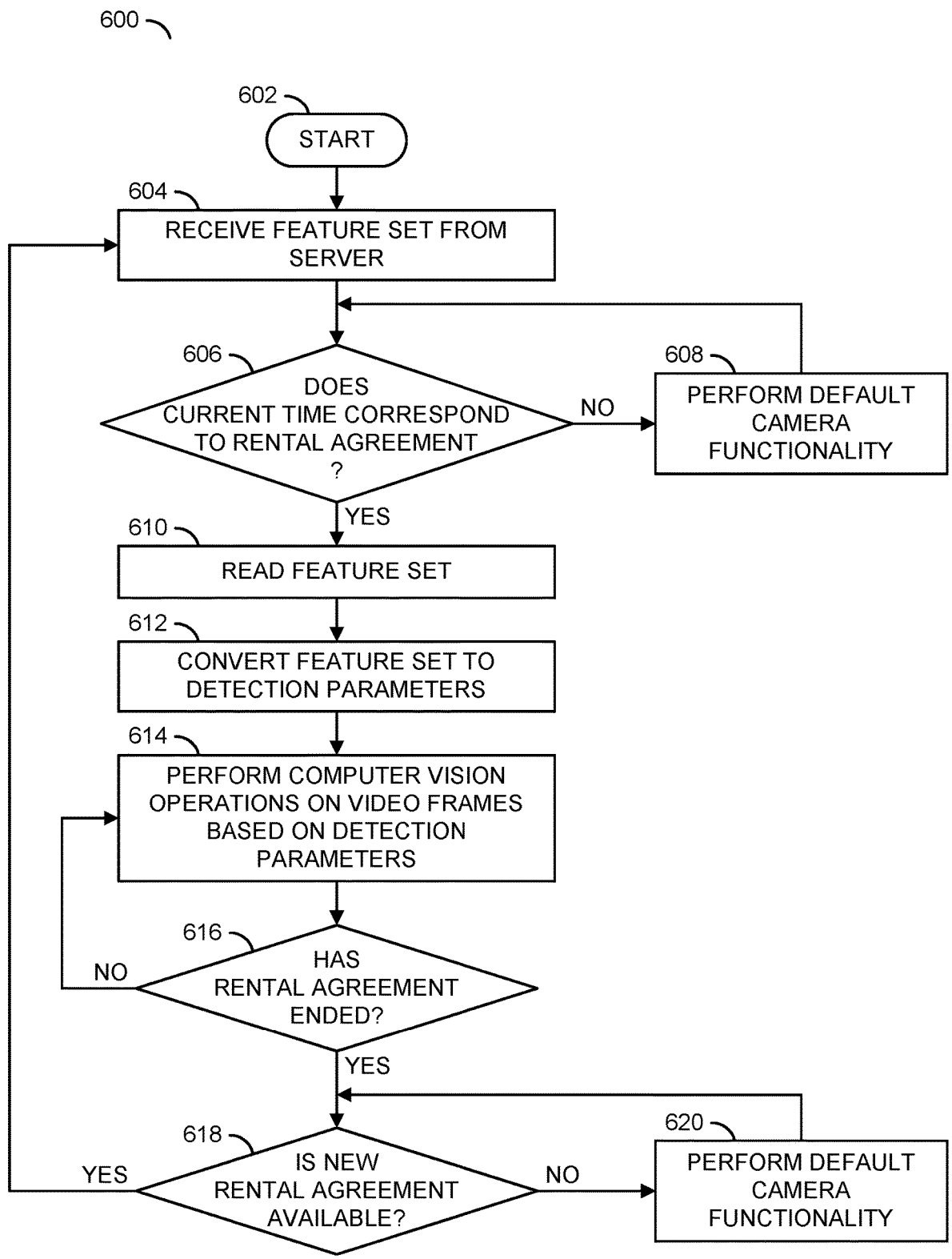
FIG. 12 is a flowchart illustrating a method for loading a feature set to the camera system when the rental agreement is active.

Referring to FIG. 12, a method (or process) 600 is shown. The method 600 may load a feature set to the camera system when the rental agreement is active. The method 600 generally comprises a step (or state) 602, a step (or state) 604, a decision step (or state) 606, a step (or state) 608, a step (or state) 610, a step (or state) 612, a step (or state) 614, a decision step (or state) 616, a decision step (or state) 618, and a step (or state) 620.

The step 602 may start the method 600. In the step 604, the camera systems 104a-104n may receive the feature set from the servers 102a-102n. In an example, the camera systems 104a-104n may receive the signal FEAT_SET comprising the machine readable version 254 of the rental agreement 122. Next, the method 600 may move to the decision step 606.

In the decision step 606, the processor 130 may determine whether the current time corresponds to the rental agreement 122. In an example, the processor 130 may compare the current time to rental time range 362a-362b to determine whether the rental agreement 122 is currently in force. If the current time does not correspond to the rental time range 362a-362b, then the method 600 may move to the step 608. In the step 608, the camera systems 104a-104n may perform default camera functionality. For example, when the rental agreement 122 is not in force, the camera systems 104a-104n may operate according to various parameters to perform general functionality (e.g., general surveillance, video recording, video streaming, video encoding, etc.). Next, the method 600 may return to the decision step 606. In the decision step 606, if the current time does correspond to the rental time range 362a-362n, then the method 600 may move to the step 610.

In the step 610, the processor 130 may read the feature set of the machine readable version 254 of the rental agreement 122. Next, in the step 612, the processor 130 may convert the feature set to detection parameters. In an example, the dedicated hardware modules 240a-240n may generate and/or store the directed acyclic graph, and/or configure the various hardware modules 240a-240n to efficiently perform the computer vision operations specific to the machine readable version 254 of the rental agreement 122. In the step 614, the camera systems 104a-104n may perform the computer vision operations on the video frames 270a-270n based on the detection parameters. Next, the method 600 may move to the decision step 616.

In the decision step 616, the processor 130 may determine whether the rental agreement 122 has ended. For example, the processor 130 may compare to the current time to the rental end time value 362b. If the rental agreement 122 has not ended, then the method 600 may return to the step 614. If the rental agreement has ended, then the method 600 may move to the decision step 618.

In the decision step 618, the camera systems 104a-104n may determine whether a new rental agreement is available. For example, a new rental agreement 122 may be communicated by the servers 102a-102n and/or the camera systems 104a-104n may store multiple rental agreements that may be active at different times. If no new rental agreement 122 is available, then the method 600 may move to the step 620. In the step 620, the camera systems 104a-104n may perform the default camera functionality. Next, the method 600 may return to the decision step 618. For example, the camera systems 104a-104n may operate according to the default camera functionality until a new rental agreement 122 becomes available. In the decision step 618, if a new rental agreement 122 is available, then the method 600 may return to the step 604 to receive the new feature set (or return to the decision step 606 if the new rental agreement 122 is already stored by the camera system 104a-104n).

Figure 13:
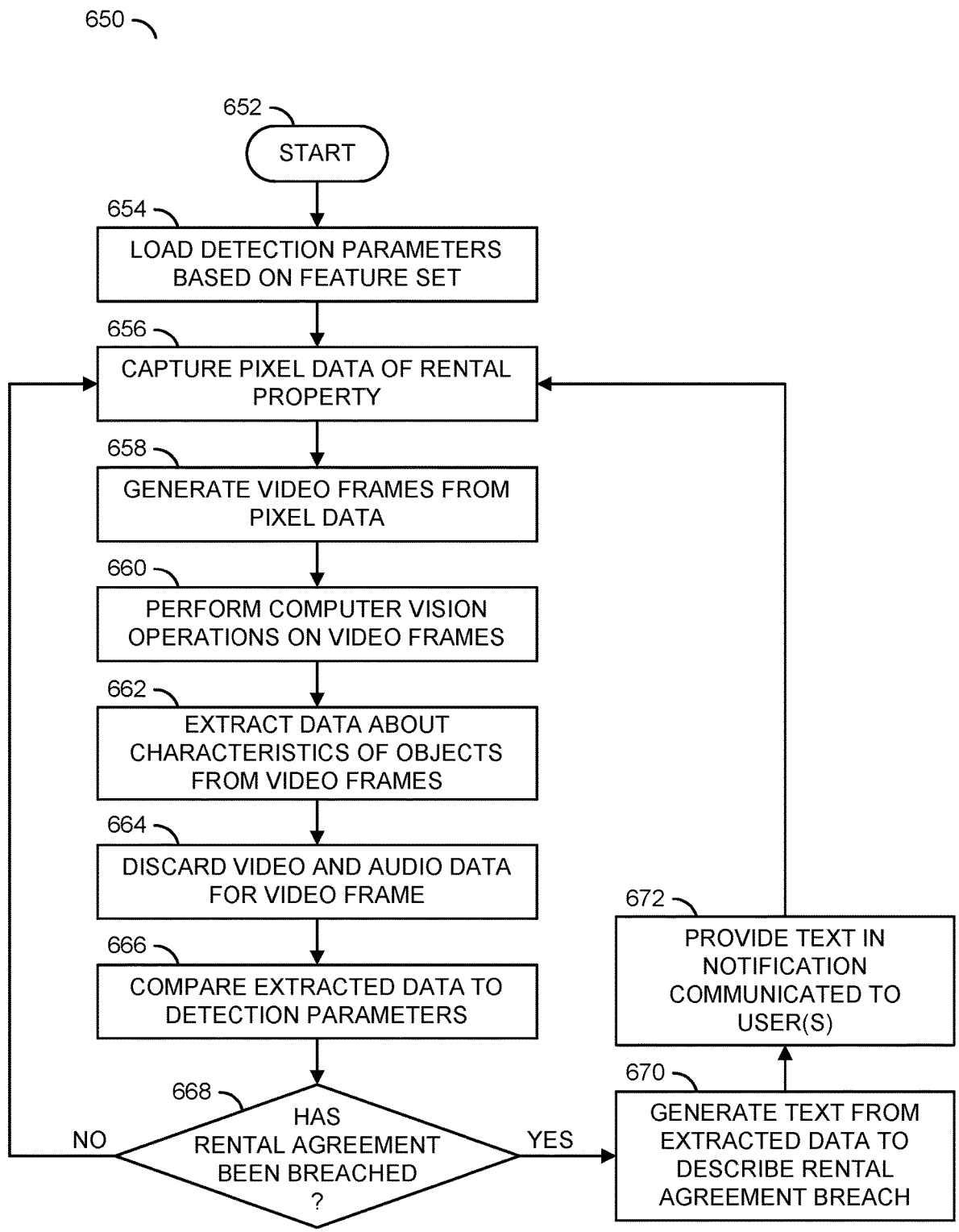
FIG. 13 is a flowchart illustrating a method for performing the computer vision analysis of the video frames to detect a breach of the rental agreement.

Referring to FIG. 13, a method (or process) 650 is shown. The method 650 may perform the computer vision analysis of the video frames to detect a breach of the rental agreement. The method 650 generally comprises a step (or state) 652, a step (or state) 654, a step (or state) 656, a step (or state) 658, a step (or state) 660, a step (or state) 662, a step (or state) 664, a step (or state) 666, a decision step (or state) 668, a step (or state) 670, and a step (or state) 672.

The step 652 may start the method 650. In the step 654, the processor 130 may load the detection parameters based on the feature set in the machine readable version 254 of the rental agreement 122. For example, the processor 130 may configure the dedicated hardware modules 240a-240n based on the signal FEAT_SET. Next, in the step 656, the capture devices 202a-202n may capture pixel data of the rental property 50. For example, the image sensors 230a-230n may generate the signals PIXELD_A-PIXELD_N in response to the light received by the lenses 200a-200n. In the step 658, the processor 130 may generate the video frames 270a-270n in response to the pixel data PIXELD_A-PIXELD_N. Next, the method 650 may move to the step 660.

In the step 660, the processor 130 may perform the computer vision operations on the video frames 270a-270n. For example, the computer vision modules 260 may perform the computer vision operations on the video frames 270a-270n using the dedicated hardware modules 240a-240n. Next, in the step 662, the computer vision modules 260 may generate the extracted data 170 about the characteristics 162 of the objects 160a-160n detected in the video frames 270a-270n. Next, in the step 664, after all the extracted data 170 (e.g., video and audio data) has been extracted from one of the video frames 270a-270n, the video and audio corresponding to the video frame may be discarded. For example, the video frames 270a-270n may be analyzed for data extraction and then, after the data extraction has been completed, sent to the discard function 262 to discard the data. Discarding the video frames 270a-270n and the audio data corresponding to the video frames 270a-270n after the data has been extracted may preserve the privacy of the people 70a-70n, while still enabling the processor 130 to have sufficient data to detect a breach of the rental agreement 122. In the step 666, the processor 130 may compare the extracted data 170 to the detection parameters of the machine readable version 254 of the rental agreement 122. Next, the method 650 may move to the decision step 668.

In the decision step 668, the processor 130 may determine whether the rental agreement 122 has been breached. For example, the processor 130 may compare the extracted data 170 (e.g., the detection 354a-354d shown in association with FIG. 7) to the detection parameters derived from the entries 370a-370n. If the processor 130 determines that the rental agreement 122 has not been breached, then the method 650 may return to the step 656. If the processor 130 determines that the rental agreement has been breached, then the method 650 may move to the step 670.

In the step 670, the processor 130 may generate text from the extracted data 170 to describe the detected breach of the rental agreement 122. In one example, if the breach corresponds to detecting music above the maximum audio level, the processor 130 may generate the message 310 (e.g., "a breach has been detected, please lower the volume"), with the detection 314 (e.g., "75 dB audio detected"), the condition 316 (e.g., "the maximum audio level is 70 dB") and the timestamp 318 (e.g., "time of detection 3 AM"). Next, in the step 672, the communication device 204 may communicate the notification (e.g., the signal NTF) to the users. For example, the notification signal NTF may be communicated to the property owner user device 52a, the renter user device 52b and/or the user devices 52a-52n of other parties of interest to the rental agreement 122. Next, the method 650 may return to the step 656.

Figure 14:
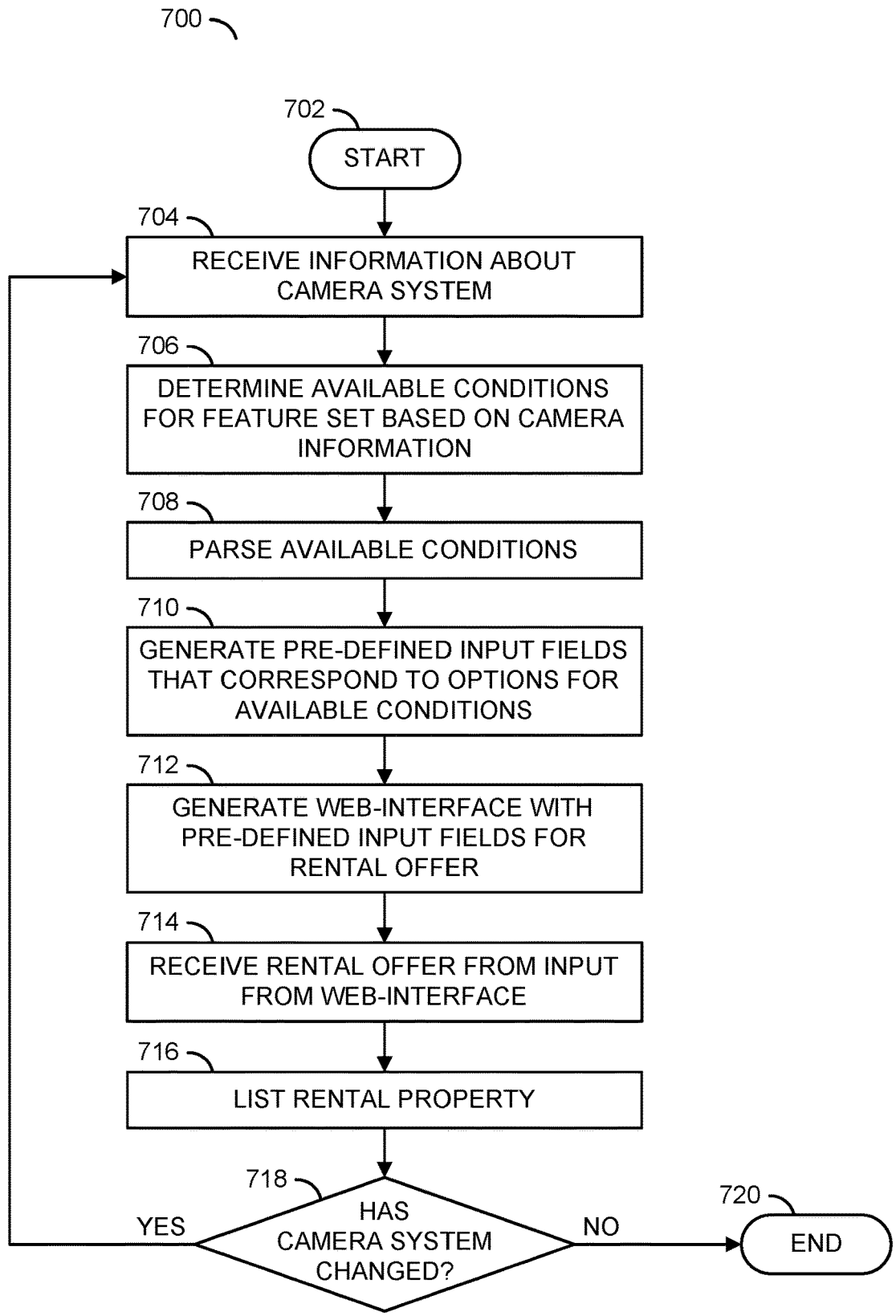
FIG. 14 is a flowchart illustrating a method for generating a web-interface based on available features of the camera system.

Referring to FIG. 14, a method (or process) 700 is shown. The method 700 may generate a web-interface based on available features of the camera system. The method 700 generally comprises a step (or state) 702, a step (or state) 704, a step (or state) 706, a step (or state) 708, a step (or state) 710, a step (or state) 712, a step (or state) 714, a step (or state) 716, a decision step (or state) 718, and a step (or state) 720.

The step 702 may start the method 700. In the step 704, the servers 102a-102n may receive information about the camera systems 104a-104n. For example, the servers 102a-102n may communicate the signal QUERY to the camera systems 104a-104n at the location 50 owned by the property owner. The signal QUERY may request specifications about the capabilities of the camera systems 104a-104n. The camera systems 104a-104n may communicate the signal QUERY in return to provide the requested specifications and/or capabilities. Next, in the step 706, the detection engine 124 may determine the available conditions (e.g., available parameters) for a feature set based on the information about the specifications/capabilities of the camera systems 104a-104n. For example, the detection engine 124 may determine what the camera systems 104a-104n are capable of detecting (e.g., one camera system may be capable of only detecting people but not pets, another camera may be configured to count people but not capable of detecting various characteristics about the people detected, etc.). Next, the method 700 may move to the step 708.

In the step 708, the processors 110a-110n may parse the available conditions. The processors 110a-110n may parse the available conditions based on the type of objects and/or characteristics that may be detected by the camera systems 104a-104n (e.g., convert the limitations and/or features of the camera systems 104a-104n into conditions that may be used as the entries 370a-370n of the rental agreement 122). Next, in the step 710, the processors 110a-110n may generate the pre-defined restriction input fields 412a-412n that correspond to the conditions available based on the capabilities/features of the camera systems 104a-104n. Next, the method 700 may move to the step 712.

In the step 712, the processors 110a-110n may generate the web-interface 126 with the pre-defined restriction input fields 412a-412n for the rental offer. For example, the servers 102a-102n may communicate the signal WEB to the property owner user device 52a to provide the rental offer interface 402. Next, in the step 714, the servers 102a-102n may receive the rental offer from the user device 52a (e.g., the signal RENTOFR). In the step 716, the servers 102a-102n may store the rental offer as one of the listings 120 and provide the listings 120 to prospective renters. Next, the method 700 may move to the decision step 718.

In the decision step 718, the servers 102a-102n may determine whether the camera systems 104a-104n at the location 50 have changed. In one example, the servers 102a-102n may periodically query the camera systems 104a-104n to determine whether the capabilities/features have changed. In another example, when a new one of the camera systems 104a-104n is installed at the location 50, the camera systems 104a-104n may update the capabilities/features of the camera systems 104a-104n at the location 50. If one or more of the camera systems 104a-104n have changed, then the method 700 may return to the step 704. If one or more of the camera systems 104a-104n have not changed, then the method 700 may move to the step 720. The step 720 may end the method 700.

Figure 15:
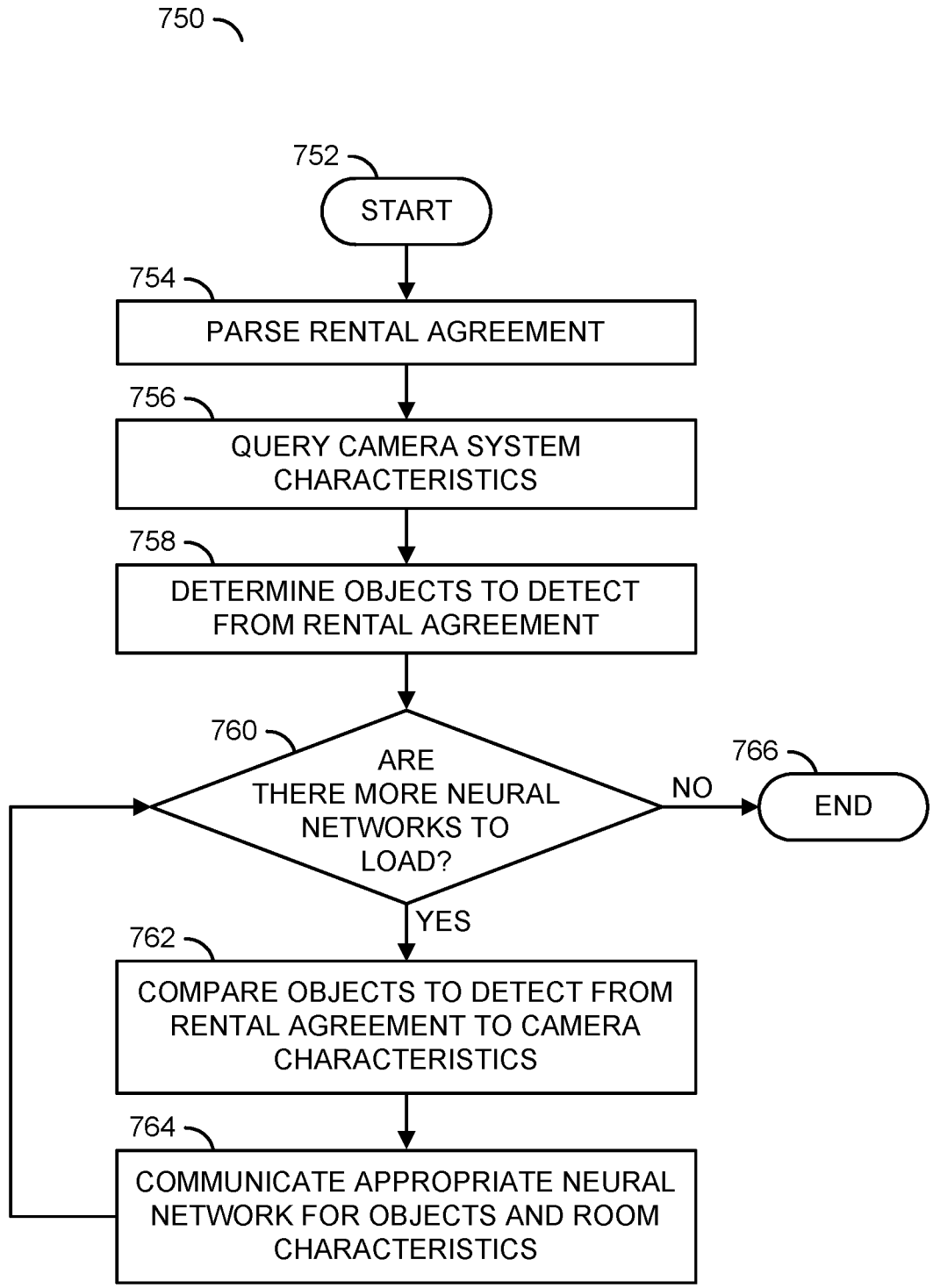
FIG. 15 is a flowchart illustrating a method for communicating pre-defined sets of neural networks to the camera systems based on the position of the camera systems and/or the terms of the rental agreement.

Referring to FIG. 15, a method (or process) 750 is shown. The method 750 may communicate pre-defined sets of neural networks to the camera systems based on the position of the camera systems and/or the terms of the rental agreement. The method 750 generally comprises a step (or state) 752, a step (or state) 754, a step (or state) 756, a step (or state) 758, a decision step (or state) 760, a step (or state) 762, a step (or state) 764, and a step (or state) 766.

The step 752 may start the method 750. In the step 754, the detection engine 124 may parse the rental agreement 122. Next, in the step 756, the detection engine 124 may query the characteristics of the camera systems 104a-104n. In an example, the detection engine 124 may communicate the signal QUERY to the camera systems 104a-104n that correspond to the rental agreement 122. The camera systems 104a-104n may return the signal QUERY to provide the characteristics of the camera systems 104a-104n. In the step 758, the detection engine 124 may determine the objects to detect from the rental agreement 122 (e.g., detecting pets, people, types of items, etc.). Next, the method 750 may move to the decision step 760.

In the decision step 760, the detection engine 124 may determine whether there are more neural networks to load for the feature set for the camera systems 104a-104n. The neural networks to be loaded may be determined based on the entries 370a-370n of the rental agreement 122. More than one neural network may be loaded (e.g., one neural network for detecting people, one neural network for detecting pets, one neural network for detecting inanimate objects, etc.). If there are more neural networks to load, then the method 750 may move to the step 762. In the step 762, the detection engine 124 may compare the objects to detect from the rental agreement 122 to the camera characteristics determined from the signal QUERY. Next, in the step 764, the detection engine 124 may communicate an appropriate one of the neural networks for the objects of the rental agreement 122 and the room characteristics of the camera systems 104a-104n. For example, if the rental agreement 122 comprises entries 370a-370n for detecting people and the room characteristics for one of the camera systems 104a-104n is that the camera is mounted from above, a neural network that comprises feature set libraries for detecting people from above may be selected. In another example, if the rental agreement 122 comprises entries 370a-370n for detecting people and the room characteristics for one of the camera systems 104a-104n is that the camera is mounted at a level that captures a side-view of people (e.g., as shown in association with FIG. 2), a neural network that comprises feature set libraries for detecting people from body height level may be selected. Next, the method 750 may return to the decision step 760.

In the decision step 760, if there are no more neural networks to load, then the method 750 may move to the step 766. In an example, there may be no additional neural networks to load when the camera systems 104a-104n have received neural networks that correspond to detecting the criteria of each of the entries 370a-370n in the rental agreement 122. The step 766 may end the method 750.

The characteristics of the camera systems 104a-104n may comprise technical specifications about the camera systems 104a-104n (e.g., resolution, shutter speed, focal length, zoom settings, frame rate, etc.). The characteristics of the camera systems 104a-104n may further comprise information about the environment that the camera systems 104a-104n are located (e.g., room characteristics). For example, the characteristics of the camera systems 104a-104n may comprise information about where the camera systems 104a-104n are mounted (e.g., how high up, how large the room is, the lighting in the room, expected distance from objects, etc.). For example, the detection parameters for detecting objects from different distances and/or in different lighting environments may be different.

The objects to detect from the rental agreement 122 may be determined based on the entries 370a-370n. For example, the detection parameters may be different for detecting different types of objects. In one example, the entries 370a-370n may comprise multiple entries for detecting people (e.g., number of people, number of visitors, activities of the visitors, etc.). To detect people, one neural network may be communicated to the camera systems 104a-104n. In another example, the entries 370a-370n may comprise entries for detecting pets. To detect pets, another neural network may be communicated to the camera systems 104a-104n. In some embodiments, different types of pets may each be detected based on separate neural networks (e.g., one neural network for detecting cats, another neural network for detecting dogs, another neural network for detecting lizards, etc.). In yet another example, the entries 370a-370n may comprise entries for detecting items and/or the conditions of items. Additional neural networks may be communicated to the camera systems 104a-104n for detecting items (e.g., detecting TVs, detecting types of damage to TVs, detecting a pool, detecting the usage of a pool, etc.).

The types of objects detected may be combined with the location characteristics (e.g., room characteristics) of the camera systems 104a-104n. For example, one neural network may be implemented for detecting people from above and another neural network may be implemented for detecting people from ground level. In some embodiments, the detection engine 124 may not communicate neural networks that do not apply to the entries 370a-370n of the rental agreement 122. For example, if none of the entries 370a-370n of the rental agreement 122 applies to pets (e.g., all pets are allowed), then the detection engine 124 may not communicate the neural networks that correspond to detecting animals to the camera systems 104a-104n. The number and/or types of neural networks that may be communicated as the feature set may be varied according to the design criteria of a particular implementation.

Since the camera systems 104a-104n may not store the video frames 270a-270n or communicate the video frames 270a-270n, the video frames 270a-270n may not be sent back to the servers 102a-102n for ongoing training of neural networks. The memory 112a-112n may store pre-defined sets of data (e.g., neural networks) that may be downloaded into the camera systems 104a-104n. The neural networks stored by the servers 102a-102n may be trained using training data acquired from sources other than the camera systems 104a-104n while the rental agreements 122 are active. The neural networks stored by the servers 102a-102n selected for the camera systems 104a-104n may be selected based on the position of the camera systems 104a-104n in the room and/or the size of the room at the location 50. For example, some of the neural networks may be trained for small rooms and other neural networks may be trained for large rooms In another example, some of the neural networks may be trained for various heights of the camera systems 104a-104n in the rooms at the location 50 and/or the lighting in the room at the location 50. For example, during installation and/or a set up time of the camera systems 104a-104n, the camera systems 104a-104n may detect the physical parameters of the room and communicate the physical parameters (e.g., room characteristics) back to the servers 102a-102n. The servers 102a-102n may select the neural network parameters optimized for a room according to the room characteristics.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store computer readable instructions; and
a processor configured to execute said computer readable instructions, said computer readable instructions configured to (a) receive a rental offer for a location from a first user, (b) receive a rental request for said location from a second user, (c) generate a rental agreement comprising conditions in response to said rental offer and said rental request and (d) generate a feature set based on said conditions, if said first user and said second user agree to said rental agreement, wherein
(a) said feature set is presented to a camera system implemented at said location,
(b) said feature set is configured to be usable by said camera system to detect a breach of said conditions using computer vision operations,
(c) said camera system is configured to (i) send a notification externally from said camera system in response to detecting said breach of said conditions, and (ii) discard video frames captured after performing said computer vision operations and before detecting said breach of said conditions, and
(d) detecting said breach of said conditions is performed internal to said camera system.

2. The apparatus according to claim 1, wherein said camera system is further configured to (i) convert said feature set to detection parameters for detecting said breach of said conditions, (ii) generate a plurality of said video frames of said location, (iii) perform said computer vision operations to detect objects in said video frames, (iv) extract data about said objects based on characteristics of said objects determined using said computer vision operations, (v) compare said data to said detection parameters, and (vi) generate said notification in response to said data matching said detection parameters.

3. The apparatus according to claim 1, wherein said notification comprises an amount of time for said second user to resolve said breach of said conditions.

4. The apparatus according to claim 1, wherein said feature set comprises a configuration for a plurality of hardware modules implemented by said camera system to load libraries that enable said computer vision operations to detect objects specific to said conditions.

5. The apparatus according to claim 1, wherein (i) said rental offer is received using an app implemented on a first device, (ii) said rental request is received using said app implemented on a second device, (iii) said rental agreement is generated anonymously using said app without in person contact between said first user and said second user.

6. The apparatus according to claim 1, wherein said computer vision operations performed by said camera system are configured to ignore objects that do not correspond with said feature set.

7. The apparatus according to claim 1, further comprising a detection engine configured to parse said conditions of said rental agreement from input provided by said first user and said second user into a machine readable version of said rental agreement to enable said processor to generate said feature set.

8. The apparatus according to claim 1, wherein (i) said processor is further configured to generate a query for said camera system, (ii) said query is configured to determine detection capabilities of said camera system implemented at said location, and (iii) said conditions available for said rental agreement are determined based on said detection capabilities of said camera system received in response to said query.

9. The apparatus according to claim 1, wherein said rental agreement comprises human-readable text generated by said processor based on said rental offer.

10. A method for generating notifications for a rental agreement comprising the steps of:
storing computer readable instructions in a memory;
executing said computer readable instructions using a processor to
(a) receive a rental offer for a location from a first user;
(b) receive a rental request for said location from a second user, (c) generate a rental agreement comprising conditions in response to said rental offer and said rental request, and
(d) generate a feature set based on said conditions, if said first user and said second user agree to said rental agreement;

presenting said feature set to a camera system implemented at said location; and detecting a breach of said conditions internal to said camera system, wherein
(a) said feature set is configured to be usable by said camera system to detect said breach of said conditions using computer vision operations, and
(b) said camera system is configured to (i) send a notification externally from said camera system in response to detecting said breach of said conditions, and (ii) discard video frames captured after performing said computer vision operations and before detecting said breach of said conditions.

11. The method according to claim 10, wherein said camera system is further configured to (i) convert said feature set to detection parameters for detecting said breach of said conditions, (ii) generate a plurality of said video frames of said location, (iii) perform said computer vision operations to detect objects in said video frames, (iv) extract data about said objects based on characteristics of said objects determined using said computer vision operations, (v) compare said data to said detection parameters, and (vi) generate said notification in response to said data matching said detection parameters.

12. The method according to claim 10, wherein said notification comprises an amount of time for said second user to resolve said breach of said conditions.

13. The method according to claim 10, wherein said feature set comprises a configuration for a plurality of hardware modules implemented by said camera system to load libraries that enable said computer vision operations to detect objects specific to said conditions.

14. The method according to claim 10, further comprising the steps of:
receiving said rental offer using an app implemented on a first device; and
receiving said rental request using said app implemented on a second device, wherein said rental agreement is generated anonymously using said app without in person contact between said first user and said second user.

15. The method according to claim 10, wherein said computer vision operations performed by said camera system are configured to ignore objects that do not correspond with said feature set.

16. The method according to claim 10, further comprising the step of:
parsing said conditions of said rental agreement from input provided by said first user and said second user into a machine readable version of said rental agreement to enable said processor to generate said feature set, using a detection engine.

17. The method according to claim 10, further comprising the step of:
generating a query for said camera system using said processor, wherein (i) said query is configured to determine detection capabilities of said camera system implemented at said location, and (ii) said conditions available for said rental agreement are determined based on said detection capabilities of said camera system received in response to said query.

18. The method according to claim 10, wherein said rental agreement comprises human-readable text generated by said processor based on said rental offer.

* * * * *